US012075541B2

(12) United States Patent
Igarashi et al.

(10) Patent No.: US 12,075,541 B2
(45) Date of Patent: Aug. 27, 2024

(54) LIGHT EMITTING DEVICE, CONTROL METHOD THEREOF, PHOTOELECTRIC CONVERSION DEVICE, ELECTRONIC APPARATUS, ILLUMINATION DEVICE, AND MOVING BODY

(71) Applicant: CANON KABUSHIKI KAISHA, Tokyo (JP)

(72) Inventors: Shinya Igarashi, Kanagawa (JP); Hiromasa Tsuboi, Tokyo (JP); Masahiko Mizoguchi, Kanagawa (JP); Tetsuro Yamamoto, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 145 days.

(21) Appl. No.: 17/876,723

(22) Filed: Jul. 29, 2022

(65) Prior Publication Data

US 2023/0043411 A1 Feb. 9, 2023

(30) Foreign Application Priority Data

Aug. 3, 2021 (JP) ................................ 2021-127730

(51) Int. Cl.
*G09G 3/3233* (2016.01)
*F21S 43/145* (2018.01)
*H05B 45/60* (2022.01)

(52) U.S. Cl.
CPC ............ *H05B 45/60* (2020.01); *F21S 43/145* (2018.01); *G09G 3/3233* (2013.01); *G09G 2300/0814* (2013.01); *G09G 2300/0842* (2013.01); *G09G 2300/0852* (2013.01); *G09G 2300/0861* (2013.01); *G09G 2310/08* (2013.01); *G09G 2320/0233* (2013.01); *G09G 2320/0242* (2013.01); *G09G 2330/10* (2013.01)

(58) Field of Classification Search
CPC ..................... G09G 3/3233; G09G 2300/0814
See application file for complete search history.

(56) References Cited

U.S. PATENT DOCUMENTS 5,046,826 A 9/1991 Iwamoto et al.
5,774,105 A 6/1998 Yamamoto et al.
6,067,645 A 5/2000 Yamamoto et al.
6,188,378 B1 2/2001 Yamamoto et al.
(Continued)

FOREIGN PATENT DOCUMENTS

JP 2010-101926 A 5/2010
JP 6783866 B2 11/2020
WO 2017/142613 A 8/2017

*Primary Examiner* — Kevin M Nguyen
(74) *Attorney, Agent, or Firm* — Venable LLP

(57) ABSTRACT

A light emitting device includes pixel circuits arranged to form rows and columns and each including a light emitting element, signal lines each extending in a column direction and configured to supply a pixel signal to the pixel circuits, row selection lines each extending in a row direction and configured to supply a row selection signal to the pixel circuits, and column selection lines each extending in the column direction and configured to supply a column selection signal to the pixel circuits. At least one of the pixel circuits includes a light emission control circuit configured to allow the light emitting element of a pixel circuit indicated by the row selection signal and the column selection signal to emit light in a brightness according to the pixel signal that is being supplied to the pixel circuit.

19 Claims, 41 Drawing Sheets

(56) References Cited

U.S. PATENT DOCUMENTS

| | | | | |
|---|---|---|---|---|
| 6,216,989 | B1 | 4/2001 | Shioya et al. | |
| 6,348,910 | B1 | 2/2002 | Yamamoto et al. | |
| 10,475,370 | B2 | 11/2019 | Spitzer et al. | |
| 10,818,232 | B2 | 10/2020 | Tsuboi et al. | |
| 10,867,561 | B2 | 12/2020 | Ota et al. | |
| 10,998,392 | B2 | 5/2021 | Tsuboi | |
| 11,087,680 | B2 | 8/2021 | Tsuboi et al. | |
| 11,282,453 | B2 | 3/2022 | Tsuboi et al. | |
| 11,393,430 | B2 | 7/2022 | Nagasaki et al. | |
| 11,621,252 | B2 * | 4/2023 | Kang | H01L 25/0657<br>257/76 |
| 2002/0158855 | A1 * | 10/2002 | Matsueda | G09G 3/3258<br>345/204 |
| 2007/0075627 | A1 * | 4/2007 | Kimura | H10K 59/351<br>313/506 |
| 2015/0169011 | A1 * | 6/2015 | Bibl | G06F 1/1652<br>345/175 |
| 2017/0236466 | A1 | 4/2017 | Spitzer et al. | |
| 2021/0111227 | A1 | 4/2021 | Tsuboi | |
| 2021/0384280 | A1 | 12/2021 | Akiyama et al. | |
| 2022/0223120 | A1 | 7/2022 | Tsuboi et al. | |
| 2022/0230585 | A1 | 7/2022 | Komazawa et al. | |

* cited by examiner

| | | | |
|---|---|---|---|
| D (5,3) | D (6,3) | D (7,3) | D (8,3) |
| D (5,4) | D (6,4) | D (7,4) | D (8,4) |
| D (5,5) | D (6,5) | D (7,5) | D (8,5) |
| D (5,6) | D (6,6) | D (7,6) | D (8,6) |

FIG. 7A

| | | | | | |
|---|---|---|---|---|---|
| D (1,1) | D (3,1) | D (5,1) | D (7,1) | D (9,1) | D (11,1) |
| D (1,3) | D (3,3) | D (5,3) | D (7,3) | D (9,3) | D (11,3) |
| D (1,5) | D (3,5) | D (5,5) | D (7,5) | D (9,5) | D (11,5) |
| D (1,7) | D (3,7) | D (5,7) | D (7,7) | D (9,7) | D (11,7) |

LIGHT EMITTING DEVICE, CONTROL METHOD THEREOF, PHOTOELECTRIC CONVERSION DEVICE, ELECTRONIC APPARATUS, ILLUMINATION DEVICE, AND MOVING BODY

BACKGROUND OF THE INVENTION

Field of the Invention

The present disclosure relates to a light emitting device, a control method thereof, a photoelectric conversion device, an electronic apparatus, an illumination device, and a moving body.

Description of the Related Art

Various techniques for performing desired display on a light emitting device have been proposed. WO2017/142613 describes a technique for displaying, on one surface, an image formed by compositing a high-resolution image and a low-resolution image. In this technique, a region of a displayed image, which should be displayed in a high resolution, is rendered at a high resolution, a region which should be displayed in a low resolution is rendered in a low resolution, and an image obtained by compositing the results is displayed on a light emitting device. Japanese Patent Laid-Open No. 2010-101926 describes a technique of correcting a signal voltage corresponding to a defective pixel in a display image to make the defective pixel generated in the manufacturing process unnoticeable.

In all the above-described techniques, an external device that supplies an image signal to the light emitting device adjusts a pixel signal, and the load on the external device is heavy. This is because in the conventional light emitting device, the same drive is performed for all pixel circuits included in a pixel row driven at the same timing by row scanning.

SUMMARY OF THE INVENTION

An aspect of the present disclosure provides a technique for enabling control of the light emission states of a plurality of pixel circuits of a light emitting device at a fine granularity.

According to some embodiments, there is provided a light emitting device comprising: a plurality of pixel circuits arranged to form a plurality of rows and a plurality of columns and each including a light emitting element; a plurality of signal lines each extending in a column direction and configured to supply a pixel signal to the plurality of pixel circuits; a plurality of row selection lines each extending in a row direction and configured to supply a row selection signal to the plurality of pixel circuits, the row selection signal indicating a row selected from the plurality of rows; and a plurality of column selection lines each extending in the column direction and configured to supply a column selection signal to the plurality of pixel circuits, the column selection signal indicating a column selected from the plurality of columns. At least one of the plurality of pixel circuits includes a light emission control circuit configured to allow the light emitting element of a pixel circuit, in the plurality of pixel circuits, located on the row indicated by the row selection signal and on the column indicated by the column selection signal to emit light in a brightness according to the pixel signal that is being supplied to the pixel circuit.

Further features of the present invention will become apparent from the following description of exemplary embodiments (with reference to the attached drawings).

BRIEF DESCRIPTION OF THE DRAWINGS

FIGS. 7A and 7B are views for explaining a low-resolution image displayed in foveated rendering;

DESCRIPTION OF THE EMBODIMENTS

Figure 1:
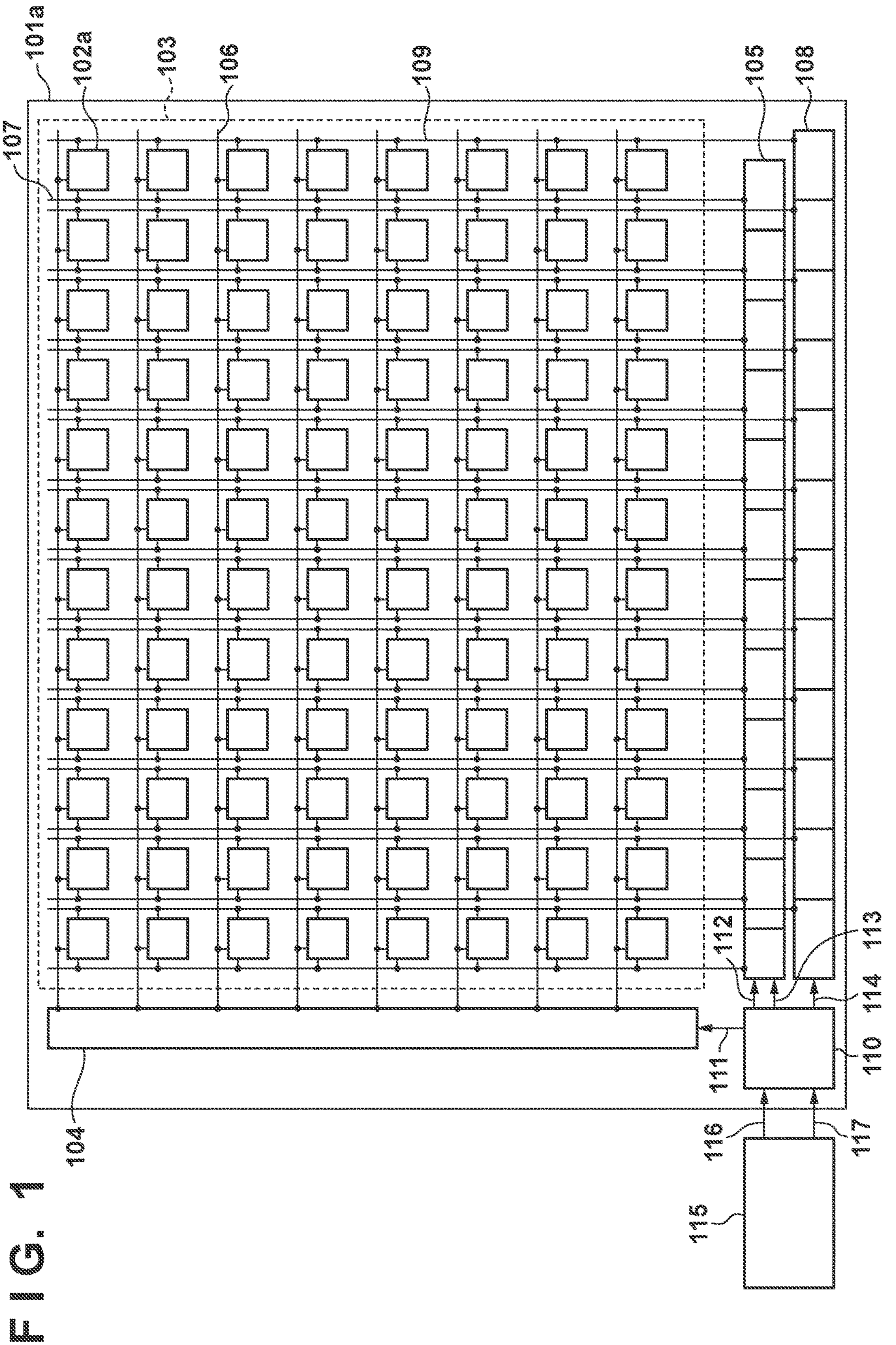
FIG. 1 is a schematic view showing an example of the configuration of a light emitting device according to a first embodiment.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

First Embodiment

A light emitting device 101*a* according to a first embodiment will be described with reference to FIGS. 1 to 7B. FIG. 1 is a schematic view showing the outline of an example of the light emitting device 101*a*. As shown in FIG. 1, the light emitting device 101*a* includes a control circuit 110, a pixel array 103, a vertical scanning circuit 104, a signal output circuit 105, and a column control circuit 108. The light emitting device 101*a* receives, from an external system 115, signals used to drive the light emitting device 101*a*. More specifically, the control circuit 110 receives an external image data signal 116 and an external control signal 117 from the external system 115. The external image data signal 116 is a signal representing image data to be displayed on the light emitting device 101*a*. The external control signal 117 is a signal that instructs an operation of the light emitting device 101*a* (for example, the start or stop of a light emitting operation).

Based on the signals received from the external system 115, the control circuit 110 generates various signals for driving the light emitting device 101*a* and supplies these signals to the components of the light emitting device 101*a*. More specifically, the control circuit 110 supplies a vertical scanning control signal 111 to the vertical scanning circuit 104, supplies a signal output control signal 112 and an image data signal 113 to the signal output circuit 105, and supplies a column control signal 114 to the column control circuit 108. The vertical scanning control signal 111 is a signal that instructs a first write control signal that the vertical scanning circuit 104 supplies to the pixel array 103. The signal output control signal 112 is a signal that instructs to store the image data signal 113 in a buffer. The image data signal 113 is a signal representing the brightness of each pixel. The column control signal 114 is a signal that instructs a second write control signal that the column control circuit 108 supplies to the pixel array 103.

The light emitting device 101*a* further includes a plurality of first row selection lines 106 each extending in a row direction (the left-and-right direction of the drawing), a plurality of signal lines 107 each extending in a column direction (the up-and-down direction of the drawing), and a plurality of column selection lines 109 each extending in the column direction. All the plurality of first row selection lines 106 are connected to the vertical scanning circuit 104. All the plurality of signal lines 107 are connected to the signal output circuit 105. All the plurality of column selection lines 109 are connected to the column control circuit 108.

The vertical scanning circuit 104 supplies the first write control signal to each first row selection line 106 in accordance with the vertical scanning control signal 111. The first write control signal functions as a row selection signal indicating a pixel row selected from a plurality of pixel rows. The signal output circuit 105 includes a buffer for each pixel column. The signal output circuit 105 stores the sequentially supplied image data signal 113 in the buffer of each column in accordance with the signal output control signal 112. The signal output circuit 105 D/A-converts the image data signal 113 of each pixel column row to generate a voltage according to the value of the pixel signal of the image data signal 113, and supplies the voltage to the signal line 107 of each pixel column. The voltage supplied to each pixel circuit 102*a* via a corresponding signal line 107 will be referred to as a signal voltage Vsig hereinafter.

The pixel circuit 102*a* is arranged at each of the intersections between the plurality of first row selection lines 106 and the plurality of signal lines 107. The first row selection lines 106 and the signal lines 107 are connected to the pixel circuits 102*a* located at the intersections. The region where the plurality of pixel circuits 102*a* are two-dimensionally arranged is called the pixel array 103. As described above, in the pixel array 103, the plurality of pixel circuits 102*a* are arranged to form a plurality of pixel rows and a plurality of pixel columns. The pixel circuit 102*a* receives the voltage Vsig and emits light in a brightness according to the value of the voltage Vsig. FIG. 1 shows the pixel array 103 of 8 rows×12 columns. However, the size of the pixel array 103 is not limited to this. In embodiments to be described later as well, the size of the pixel array 103 is not limited to that shown in FIG. 1.

The column control circuit 108 supplies the second write control signal to the column selection lines 109 in accordance with the column control signal 114. The column selection line 109 is arranged for each column on which a light emission control circuit 206*a* (to be described later with reference to FIG. 2) exists, and is connected to the light emission control circuit 206*a*. Since FIG. 1 shows an example in which the light emission control circuits 206*a* are arranged in all pixel circuits 102*a*, the column selection line 109 is provided for each of the pixel columns.

Figure 2:
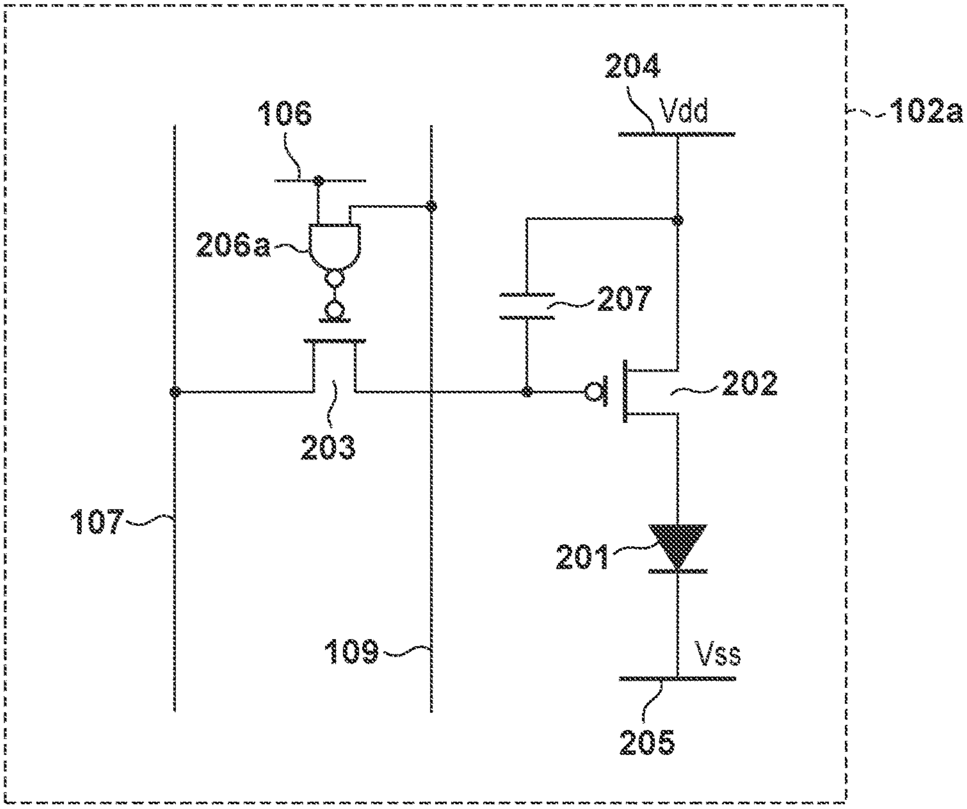
FIG. 2 is an equivalent circuit diagram showing an example of the configuration of a pixel circuit according to the first embodiment.

FIG. 2 shows an example of the circuit diagram of the pixel circuit 102*a*. As shown in FIG. 2, the pixel circuit 102*a* includes a light emitting element 201, a drive transistor 202, a write transistor 203, the light emission control circuit 206*a*, and a holding capacitor 207. The holding capacitor 207 may be the parasitic capacitance of the drive transistor 202, or may be a Metal Insulator Metal (MIM) capacitor. If the light emitting element 201 includes an organic layer including a light emitting layer between an anode and a cathode, the light emitting device 101*a* can also be called an organic electroluminescent (Organic EL) display device. In addition to the light emitting layer, the organic layer may include at least one of a hole injection layer, a hole transport layer, an electron injection layer, or an electron transport layer. A case in which the drive transistor 202 is connected to the anode of the light emitting element 201, and all transistors in the pixel circuit 102*a* are p-type transistors will be described below. A voltage equal to a voltage Vdd supplied to a first power supply terminal 204 is supplied to the back gates of all transistors. However, the light emitting device according to the present disclosure is not limited to this, and all the polarities and conductivity types may be reversed. In addition, the drive transistor 202 may be a p-type transistor, and the remaining transistors may be n-type transistors. In this case, connection and supplied potentials are changed in accordance with the conductivity types and polarities.

One of the source and the drain (the drain in this embodiment) of the drive transistor 202 is connected to the first electrode (the anode in this embodiment) of the light emitting element 201. The other of the source and the drain (the source in this embodiment) of the drive transistor 202 is connected to the first power supply terminal 204. The voltage Vdd is supplied from the power supply circuit (not shown) of the light emitting device 101*a* to the first power supply terminal 204. The second electrode (the cathode in this embodiment) of the light emitting element 201 is connected to a second power supply terminal 205. A voltage Vss is supplied from the power supply circuit (not shown) of the light emitting device 101*a* to the second power supply terminal 205.

The drive transistor 202 supplies a current from the first power supply terminal 204 to the light emitting element 201, thereby causing the light emitting element 201 to emit light. More specifically, the drive transistor 202 supplies, to the light emitting element 201, a current according to the signal voltage Vsig supplied to the signal line 107. When the current drives the light emitting element 201, the light emitting element 201 emits light.

Figure 3:
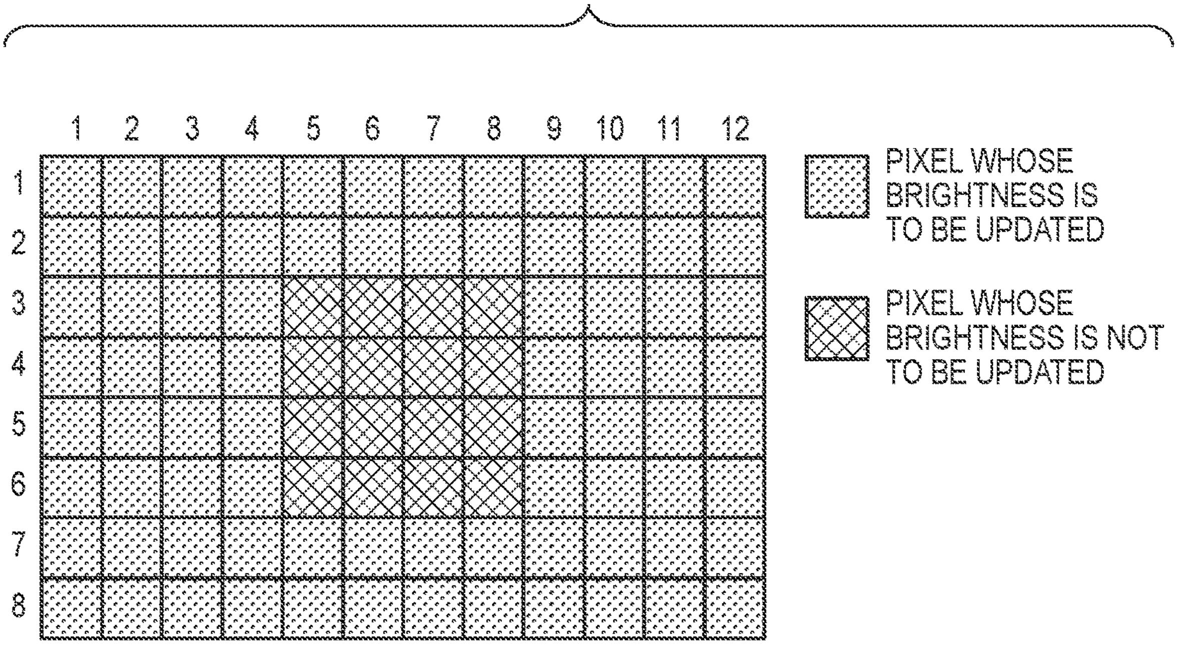
FIG. 3 is a view for explaining an example of an image displayed in foveated rendering.

One of the source and the drain of the write transistor 203 is connected to the gate of the drive transistor 202. The other of the source and the drain of the write transistor 203 is connected to the signal line 107. By such connection, the write transistor 203 controls the conductive state of a signal path configured to supply a pixel signal from the signal line 107 to the light emitting element 201. The gate of the write transistor 203 is connected to the output terminal of the light emission control circuit 206*a*. The gate of the write transistor 203 is an example of the control terminal of the write transistor 203. The light emission control circuit 206*a* receives, as input signal, the first write control signal supplied from the first row selection line 106 and the second write control signal supplied from the column selection line 109. The light emission control circuit 206*a* generates an output based on the logic operation on the levels of these input signals. The output is supplied to the gate of the write transistor 203. The second write control signal functions as a column selection signal indicating a pixel column selected from the plurality of pixel columns. FIG. 2 shows an example in which the light emission control circuit 206*a* is formed by a NAND logic gate. Instead, the light emission control circuit 206*a* may be formed by another logic circuit. In FIG. 3 to be described later, the signal levels of the first write control signal and the second write control signal are changed in accordance with the employed logic circuit. The column selection line 109 may be arranged to overlap the light emitting region of the pixel circuit 102*a* in a planar view of the light emitting surface of the light emitting device 101*a*.

The write transistor 203 changes to a conductive state in response to a signal applied to the gate by the light emission control circuit 206*a*. In the conductive state, the write transistor 203 writes, in the pixel circuit 102*a*, a voltage (for example, the signal voltage Vsig) supplied from the signal output circuit 105 via the signal line 107. The written signal voltage Vsig is applied to the gate of the drive transistor 202. The amount of a current flowing to the drive transistor 202 changes in accordance with the signal voltage Vsig. Accordingly, the capacitor between the first electrode (for example, the anode) and the second electrode (for example, the cathode) of the light emitting element 201 is charged, and a current according to the potential difference flows to the light emitting element 201. The light emitting element 201 emits light in a brightness according to the flowing current.

In FIG. 2, the light emission control circuit 206*a* exists in each of the plurality of pixel circuits 102*a* in the pixel array 103. Instead, one light emission control circuit 206*a* may be shared by two or more pixel circuits 102*a*. For example, one light emission control circuit 206*a* may be shared by two or more pixel circuits 102*a* arranged in the row direction, two or more pixel circuits 102*a* arranged in the column direction, or pixel circuits 102*a* of 2 rows×2 columns or more. If the light emission control circuit 206*a* is shared, the output terminal of the light emission control circuit 206*a* is connected to the gates of the write transistors 203 of the two or more pixel circuits 102*a*. Sharing of the light emission control circuit 206*a* also applies to the following other embodiments.

An example of drive of the light emitting device 101*a* using the above-described circuit configuration will be described with reference to FIG. 3. FIG. 3 is a display image diagram for explaining a frame including pixels whose brightness is to be updated and pixels whose brightness is not to be updated. This frame has a size of 8 rows×12 columns corresponding to the pixel array 103. The pixels are numbered sequentially from the upper left pixel of the frame in the row direction and the column direction, and a pixel located on the Xth column and the Yth row of the frame is expressed as (X, Y). When emitting light for the frame shown in FIG. 3, the light emitting device 101*a* does not update the brightness of the pixel circuits 102*a* corresponding to the pixels in a rectangle with vertices on pixels (5, 3), (5, 6), (8, 3), and (8, 6) and updates the brightness of the remaining pixel circuits 102*a*. The pixel circuit 102*a* corresponding to the pixel (X, Y) of the frame shown in FIG. 3 is expressed as a pixel circuit (X, Y). In the following description, the pixel circuit 102*a* corresponding to a pixel whose brightness is to be updated will be referred to as an updating pixel circuit, and the pixel circuit 102*a* corresponding to a pixel whose brightness is not to be updated will be referred to as a non-updating pixel circuit.

Figure 4A:
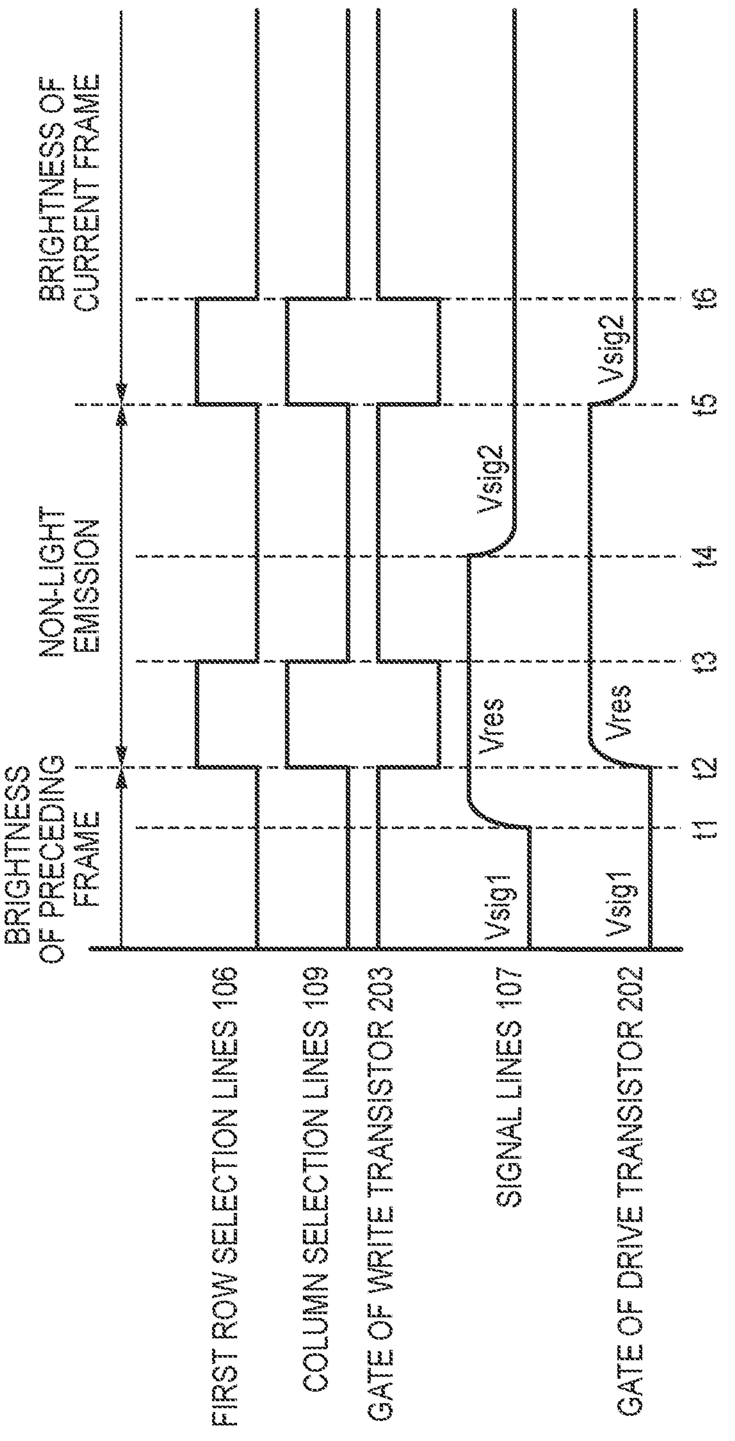
FIGS. 4A and 4B are schematic views showing an example of drive of the light emitting device according to the first embodiment.
Figure 4B:
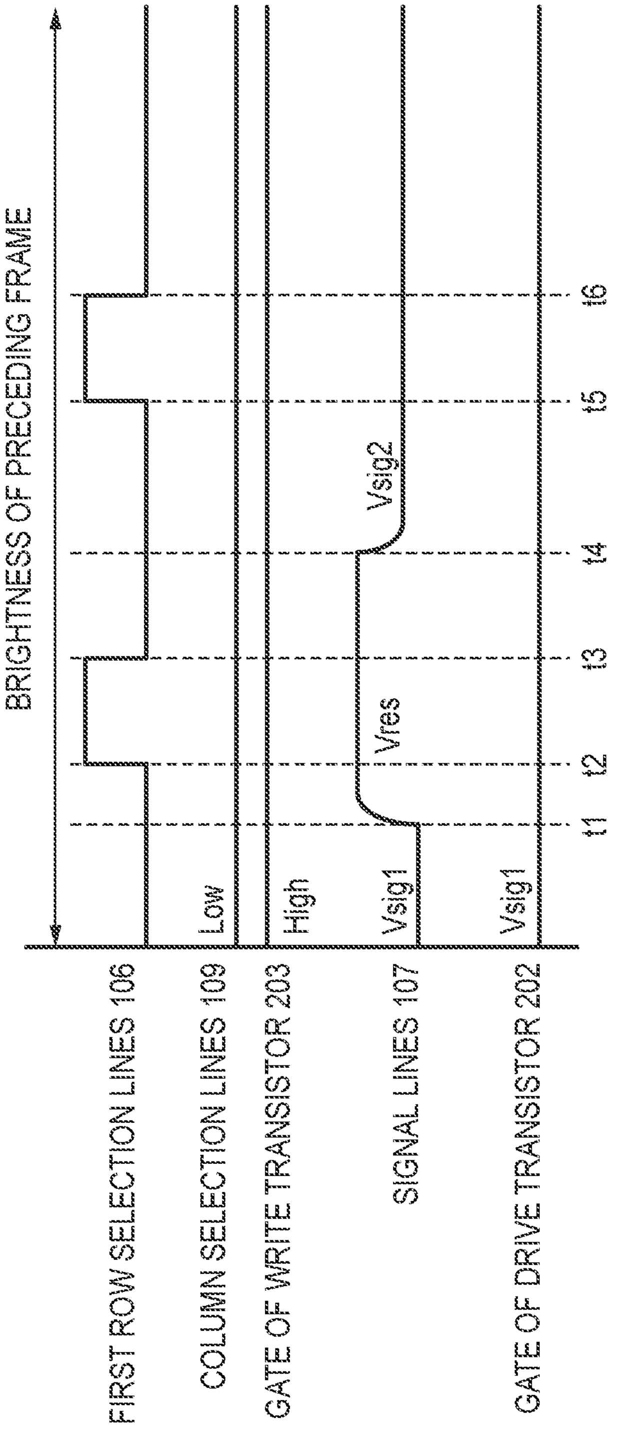

FIGS. 4A and 4B are timing charts showing an example of drive of an updating pixel circuit and a non-updating pixel circuit included in the same pixel row. Each waveform in FIGS. 4A and 4B shows the change of the voltage of a target wiring or terminal. FIG. 4A shows drive of the updating pixel circuit, and FIG. 4B shows drive of the non-updating pixel circuit.

Referring to FIGS. 4A and 4B, the period before time t1 is the light emission period of the light emitting element 201 to display the preceding frame. During this light emission period, the write transistor 203 is in a nonconductive state, and the light emitting element 201 emits light in a brightness according to the voltage held by the holding capacitor 207.

From time t1, drive of the pixel circuits 102*a* included in one pixel row is started. At time t1, the signal output circuit 105 makes the voltage of the signal lines 107 transition from a signal voltage Vsig1 in the preceding frame to a reset voltage Vres.

At time t2, the vertical scanning circuit 104 makes the first write control signal of the first row selection line 106 transition from low to high. Since the first row selection line 106 is shared by a plurality of pixels included in one pixel row, the first write control signal transitions to high for both the updating pixel circuit and the non-updating pixel circuit.

Similarly, at time t2, the column control circuit 108 makes the second write control signal supplied to the column selection line 109 connected to the updating pixel circuit transition from low to high (FIG. 4A). Accordingly, in the updating pixel circuit, since the signal supplied to the gate of the write transistor 203 transitions from high to low, the write transistor 203 changes to the conductive state. According to this, the reset voltage Vres of the signal line 107 is written in the gate of the drive transistor 202, and the drive transistor 202 changes to the nonconductive state. As a result, since current supply from the drive transistor 202 to the light emitting element 201 stops, the light emitting element 201 changes to a non-light emission state.

On the other hand, at time t2, the column control circuit 108 maintains the second write control signal supplied to the column selection line 109 connected to the non-updating pixel circuit at low level (FIG. 4B). Accordingly, since the signal supplied to the gate of the write transistor 203 remains high, the reset voltage Vres of the signal line 107 is not written in the gate of the drive transistor 202. As a result, the light emitting element 201 maintains the light emission state in the preceding frame.

At time t3, the vertical scanning circuit 104 makes the first write control signal of the first row selection line 106 transition from high to low. Similarly, at time t3, the column control circuit 108 makes the second write control signal supplied to the column selection line 109 connected to each updating pixel circuit transition from high to low. This changes the write transistor 203 to the nonconductive state. The second write control signal supplied to the column selection line 109 connected to each non-updating pixel circuit remains low even at time t3.

At time t4, the signal output circuit 105 makes the voltage of the signal lines 107 transition to the signal voltage Vsig2 of the current frame. At times t5 and t6, the pixel circuits 102*a* are driven in the same way as at times t2 and t3. As a result, the signal voltage Vsig2 is written in the gate of the drive transistor 202 of the updating pixel circuit, and the light emitting element 201 emits light in a brightness according to the signal voltage Vsig2. Since the signal voltage is written in the gate of the drive transistor 202 during the period from time t5 to time t6, this period may be called a signal write period. By the drive shown in FIG. 4A, the light emitting element 201 of the updating pixel circuit is updated from the brightness according to the signal voltage Vsig1 of the preceding frame to the brightness according to the signal voltage Vsig2 of the current frame. On the other hand, by the drive shown in FIG. 4B, the light emitting element 201 of the non-updating pixel circuit maintains the brightness according to the signal voltage Vsig1 of the preceding frame.

Figures 5, 6A:
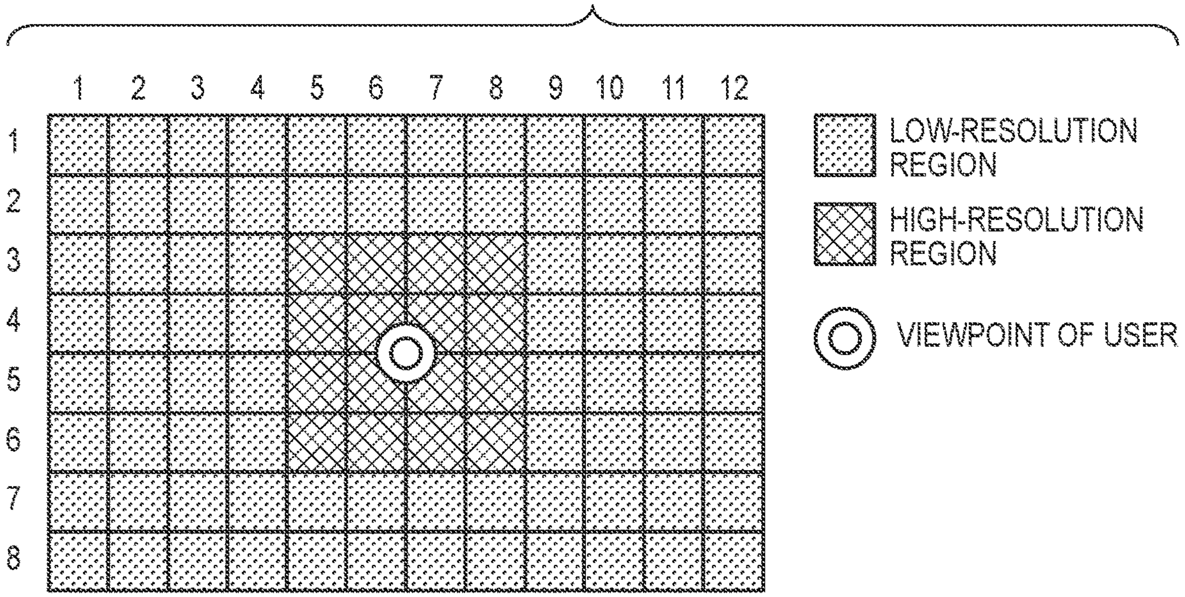
FIG. 5 is a view for explaining an example of regions of an image displayed in foveated rendering.
FIGS. 6A and 6B are views for explaining a high-resolution image displayed in foveated rendering.

A case in which the light emitting device 101*a* is used for foveated rendering will be described with reference to FIG. 5. As shown in FIG. 5, if the light emitting device 101*a* is used in foveated rendering, the light emitting device 101*a* displays a high-resolution image in a region of the pixel array 103, which is relatively close to the viewpoint of the user of the light emitting device 101*a*. The region of the pixel array 103 where the high-resolution image is displayed will be referred to as a high-resolution region. The light emitting device 101*a* displays a low-resolution image in a region of the pixel array 103 other than the high-resolution region. The region of the pixel array 103 where the low-resolution image is displayed will be referred to as a low-resolution region. In the example shown in FIG. 5, the viewpoint of the user is located at the center of the pixel array 103, the rectangular region with vertices on pixels (5, 3), (5, 6), (8, 3), and (8, 6) is the high-resolution region, and the region other than that is the low-resolution region. This is merely an example, and each region can arbitrarily be set.

Pixels displayed by the pixel circuits 102*a* will be described with reference to FIGS. 6A to 7B. If the light emitting device 101*a* is used in foveated rendering, the light emitting device 101*a* alternately receives a frame of a high-resolution image and a frame of a low-resolution image as the external image data signal 116 from the external system 115.

Figure 6B:
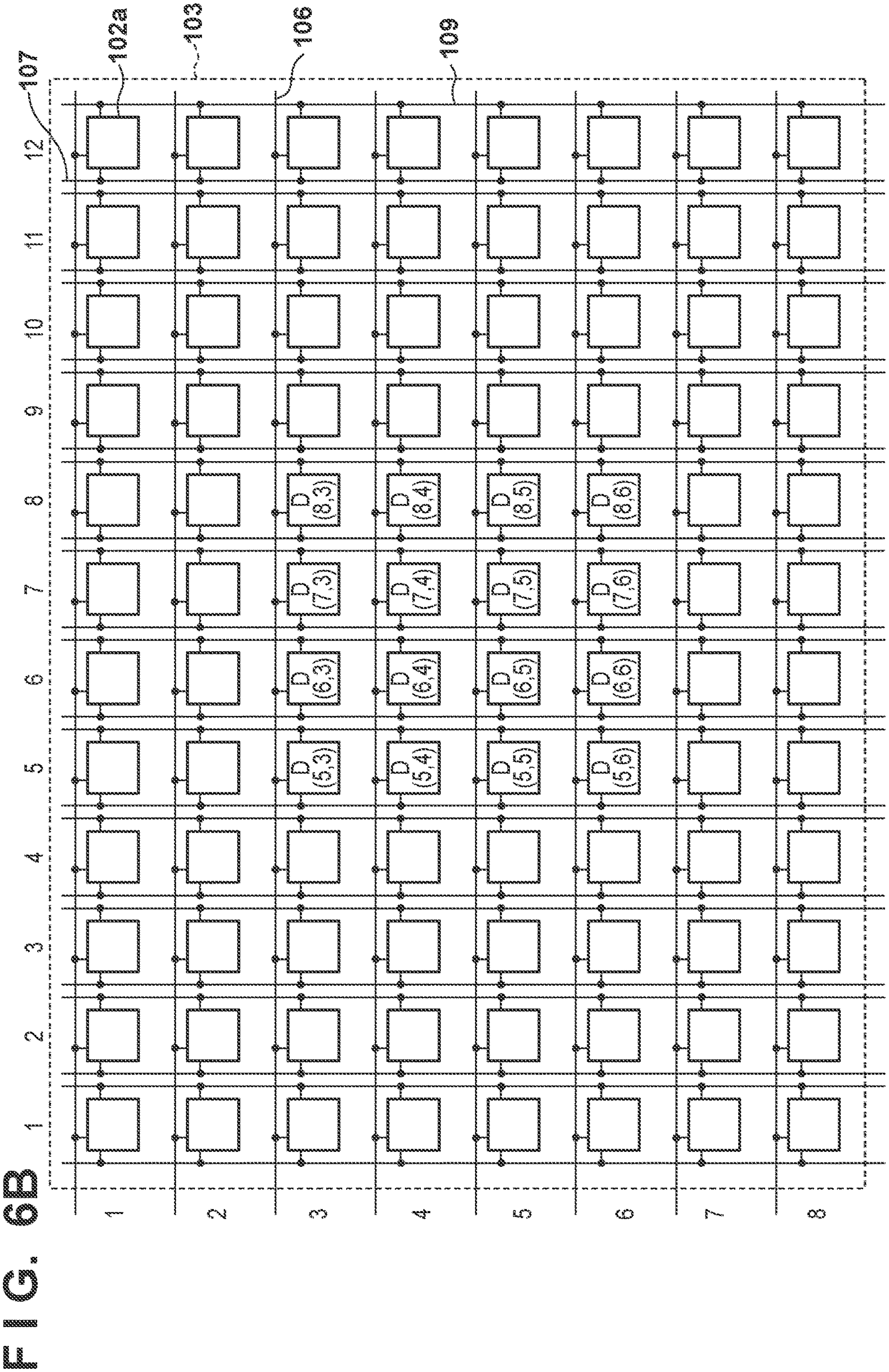

FIGS. 6A and 6B explain pixel circuits used to display the high-resolution image. The light emitting device 101*a* receives image data of 4 rows×4 columns as shown in FIG. 6A from the external system 115 and displays this in the high-resolution region of the pixel array 103, as shown in FIG. 6B. "D(X, Y)" in FIG. 6A indicates each pixel of the high-resolution image, and "D(X, Y)" in FIG. 6B indicates the pixel circuit 102*a* used to display each pixel of the high-resolution image. Thus, the light emitting device 101*a* displays one pixel of the high-resolution image using one pixel circuit 102*a*.

When displaying the high-resolution image, the light emitting device 101*a* does not update the display of the pixel circuits 102*a* in the low-resolution region (that is, maintains the display of the preceding frame (low-resolution image)). Accordingly, the light emitting device 101*a* displays the high-resolution image and the low-resolution image on one surface. In display of the high-resolution image, the pixel circuits 102*a* included in the high-resolution region are updating pixel circuits, and the pixel circuits 102*a* included in the low-resolution region are non-updating pixel circuits. A designation of the high-resolution region and the low-resolution region may be supplied by the external control signal 117 from the external system 115 to the control circuit 110.

A driving method of the pixel array 103 to display the high-resolution image will be described next. The control circuit 110 scans the pixel array 103 on a pixel row basis. The control circuit 110 does not select pixel rows (in FIG. 6B, the first, second, seventh, and eighth rows) that do not include updating pixel circuits, and maintains the first write control signal supplied to the first row selection lines 106 corresponding to these pixel rows at low level. On the other hand, the control circuit 110 sequentially selects pixel rows (in FIG. 6B, the third to sixth rows) including updating pixel circuits, and makes the first write control signal supplied to the first row selection lines 106 corresponding to these pixel rows transition to high at the timing shown in FIGS. 4A and 4B.

While the first write control signal supplied to the first row selection lines 106 is set at high level, the control circuit 110 changes the second write control signal supplied to the column selection lines 109 corresponding to the pixel columns (in FIG. 6B, the fifth to eighth columns) including the updating pixel circuits to high level. On the other hand, while the first write control signal supplied to the first row selection lines 106 is set at high level, the control circuit 110 changes the second write control signal supplied to the column selection lines 109 corresponding to the pixel columns (in FIG. 6B, the first to fourth and the ninth to 12th columns) that do not include the updating pixel circuits to low level. Accordingly, light emission of the light emitting elements 201 is updated only in the updating pixel circuits included in the selected pixel columns.

Figure 7B:
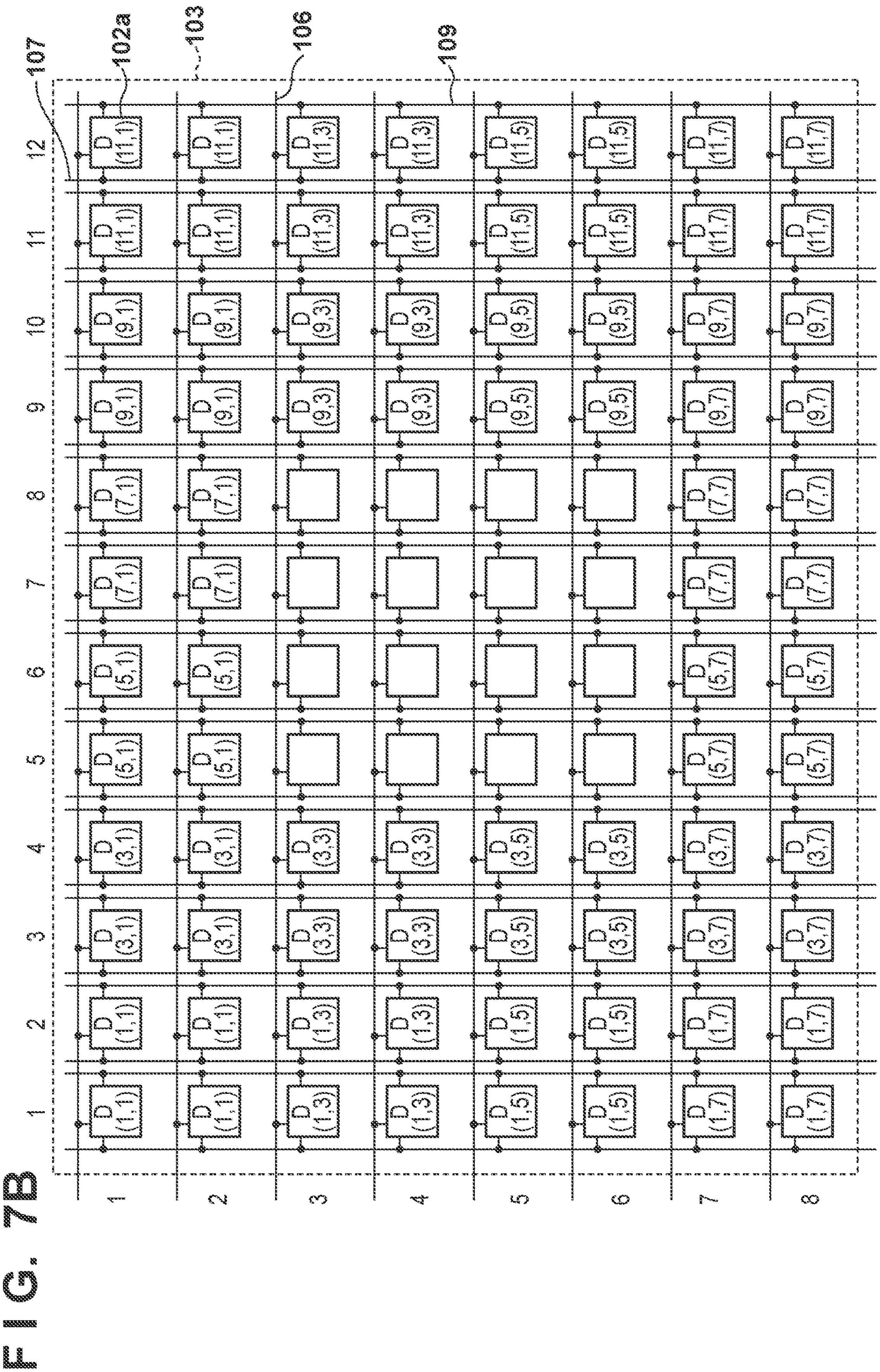

FIGS. 7A and 7B explain pixel circuits used to display the low-resolution image. The light emitting device 101*a* receives image data of 4 rows×6 columns as shown in FIG. 7A from the external system 115 and displays this in the low-resolution region of the pixel array 103, as shown in FIG. 7B. "D(X, Y)" in FIG. 7A indicates each pixel of the low-resolution image, and "D(X, Y)" in FIG. 7B indicates the pixel circuit 102*a* used to display each pixel of the low-resolution image. Thus, the light emitting device 101*a* displays one pixel of the low-resolution image using four pixel circuits 102*a*. The pixels D(5, 3), D(5, 5), D(7, 3) and D(7, 5) are located at positions corresponding to the high-resolution region and are not displayed.

When displaying the low-resolution image, the light emitting device 101*a* does not update the display of the pixel circuits 102*a* in the high-resolution region (that is, maintains the display of the preceding frame (high-resolution image)). Accordingly, the light emitting device 101*a* displays the high-resolution image and the low-resolution image on one surface. In display of the low-resolution image, the pixel circuits 102*a* included in the low-resolution region are updating pixel circuits, and the pixel circuits 102*a* included in the high-resolution region are non-updating pixel circuits.

A driving method of the pixel array 103 to display the low-resolution image will be described next. Since a single pixel is expressed by the pixel circuits 102*a* of 2 rows×2 columns, the control circuit 110 scans the pixel array 103 every two pixel rows. In the example shown in FIG. 7B, since all pixel rows include updating pixel circuits, the control circuit 110 scans every two pixel rows in all pixel rows. For example, the control circuit 110 selects the first and second rows at once, and makes the first write control signal supplied to the first row selection lines 106 corresponding to these pixel rows transition to high at the timing shown in FIGS. 4A and 4B. Next, the control circuit 110 selects the third and fourth rows at once.

While the first write control signal supplied to the first row selection lines 106 is set at high level, the control circuit 110 changes the second write control signal supplied to the column selection lines 109 corresponding to the pixel columns including the updating pixel circuits to high level. On the other hand, while the first write control signal supplied to the first row selection lines 106 is set at high level, the control circuit 110 changes the second write control signal supplied to the column selection lines 109 corresponding to the pixel columns that do not include the updating pixel circuits to low level. The pixel columns including updating pixel circuits change depending on the pixel rows under selection. For example, if the first and second rows are selected, all pixel columns include updating pixel circuits. If the third and fourth rows are selected, the first to fourth and the ninth to 12th pixel columns include updating pixel circuits, and the remaining pixel columns do not include updating pixel circuits. Accordingly, light emission of the light emitting elements 201 is updated only in the updating pixel circuits included in the selected pixel columns.

The light emitting device 101*a* according to the first embodiment performs different pixel control processes (here, updating/non-updating of brightness) in the pixel rows controlled at the same timing. More specifically, the pixel circuit 102*a* located on a pixel row indicated by the first write control signal supplied via the first row selection line 106 and on a pixel column indicated by the second write control signal supplied via the column selection line 109 is an updating pixel circuit. The light emitting element 201 of the updating pixel circuit can emit light in a brightness according to the pixel signal supplied to the updating pixel circuit. On the other hand, the pixel circuit 102*a* located on a pixel row indicated by the first write control signal supplied via the first row selection line 106 and on a pixel column that is not indicated by the second write control signal supplied via the column selection line 109 is a non-updating pixel circuit. The light emitting element 201 of the non-updating pixel circuit emits light in a brightness according to the pixel signal supplied before the pixel signal supplied to the non-updating pixel circuit. Hence, if a high-resolution image and a low-resolution image are alternately transmitted, like foveated rendering, the images can be displayed on one surface in corresponding display regions. Since composition processing for generating an image for one surface from the high-resolution image and the low-resolution image need not be performed in the external system 115, the processing load on the external system 115 can be reduced. Also, the external system 115 does not need a frame memory used to composite the images, and as a result, a frame delay can be suppressed.

Second Embodiment

A light emitting device according to a second embodiment will be described with reference to FIGS. 8 to 9B. The second embodiment is different from the first embodiment in that a pixel circuit 102*b* is provided in place of the pixel circuit 102*a*, and may be the same in the remaining points. The differences from the first embodiment will mainly be described below.

Figure 8:
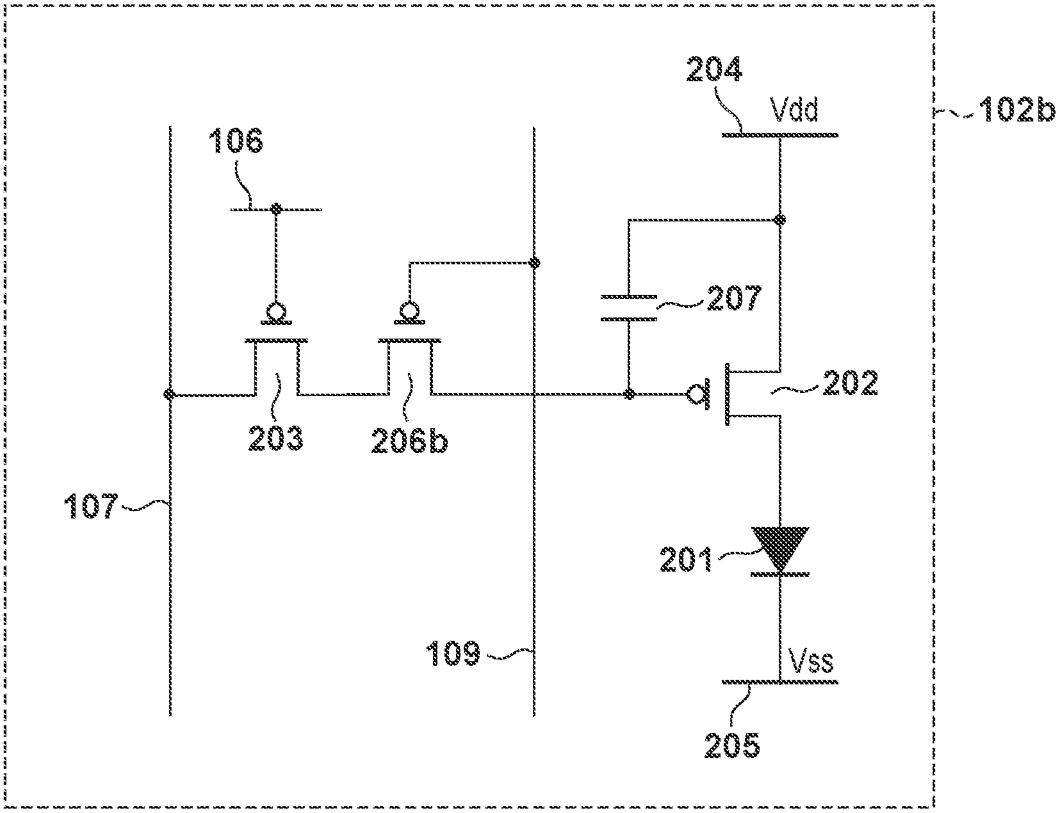
FIG. 8 is an equivalent circuit diagram showing an example of the configuration of a pixel circuit according to a second embodiment.
Figure 9A:
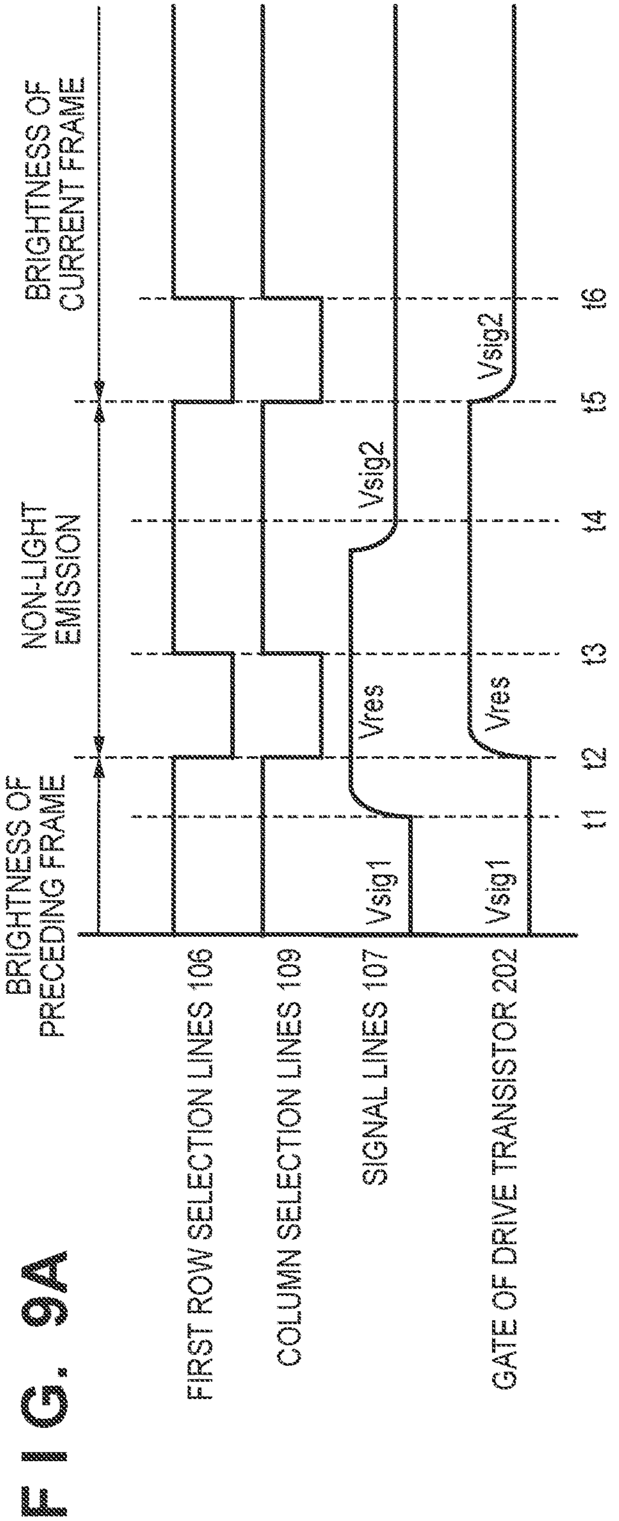
FIGS. 9A and 9B are timing charts showing an example of drive of a light emitting device according to the second embodiment.

FIG. 8 is a circuit diagram showing an example of the pixel circuit 102*b*. The pixel circuit 102*b* is different from the pixel circuit 102*a* in that a light emission control circuit 206*b* is provided in place of the light emission control circuit 206*a*, and may be the same in the remaining points. In the example shown in FIG. 8, the light emission control circuit 206*b* is formed by one p-type transistor. A column selection line 109 is connected to the gate of the light emission control circuit 206*b*. This transistor may be an n-type transistor. In this case, the polarity of a second write control signal to be described later with reference to FIGS. 9A and 9B is reversed. The light emission control circuit 206*b* is connected between the drain of a write transistor 203 and the gate of a drive transistor 202. Instead, the light emission control circuit 206*b* may be connected between the source of the write transistor 203 and a signal line 107. As described above, the light emission control circuit 206*b* is arranged in a signal path configured to supply a pixel signal from the signal line 107 to a light emitting element 201. The gate of the write transistor 203 is connected to a first row selection line 106.

Figure 9B:
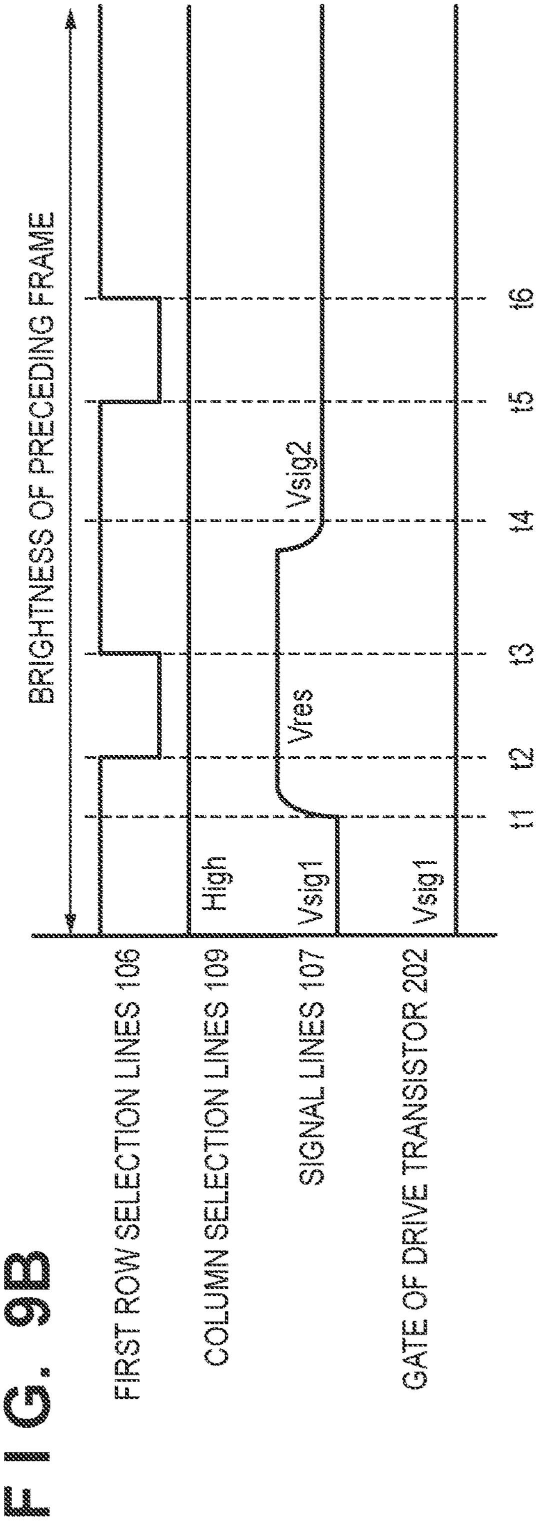

FIGS. 9A and 9B are timing charts showing an example of drive of an updating pixel circuit and a non-updating pixel circuit included in the same pixel row. Each waveform in FIGS. 9A and 9B shows the change of the voltage of a target wiring or terminal. FIG. 9A shows drive of the updating pixel circuit, and FIG. 9B shows drive of the non-updating pixel circuit.

As compared to the timing charts according to the first embodiment described with reference to FIGS. 4A and 4B, the polarities of the first write control signal that the first row selection line 106 supplies and the second write control signal that the column selection line 109 supplies are reverse to the polarities shown in FIGS. 4A and 4B. In the updating pixel circuit, since both the write transistor 203 and the light emission control circuit 206*b* change to the conductive state from time t2 to t3, the voltage of the signal line 107 is written in the gate of the drive transistor 202. On the other hand, in the non-updating pixel circuit, from time t2 to t3, the write transistor 203 changes to the conductive state, but the light emission control circuit 206*b* is in the nonconductive state. For this reason, the voltage of the signal line 107 is not written in the gate of the drive transistor 202.

The light emitting device according to the second embodiment can also be used in foveated rendering, as in the first embodiment. According to the second embodiment, it is possible to obtain the same effect as in the first embodiment using elements in a number smaller than the first embodiment.

Third Embodiment

A light emitting device 101*c* according to a third embodiment will be described with reference to FIGS. 10 to 13B. The third embodiment is different from the first embodiment in that a pixel circuit 102*c* is provided in place of the pixel circuit 102*a*, and a second row selection line 1001 and a row control line 1002 are further provided, and may be the same in the remaining points. The differences from the first embodiment will mainly be described below.

Figure 10:
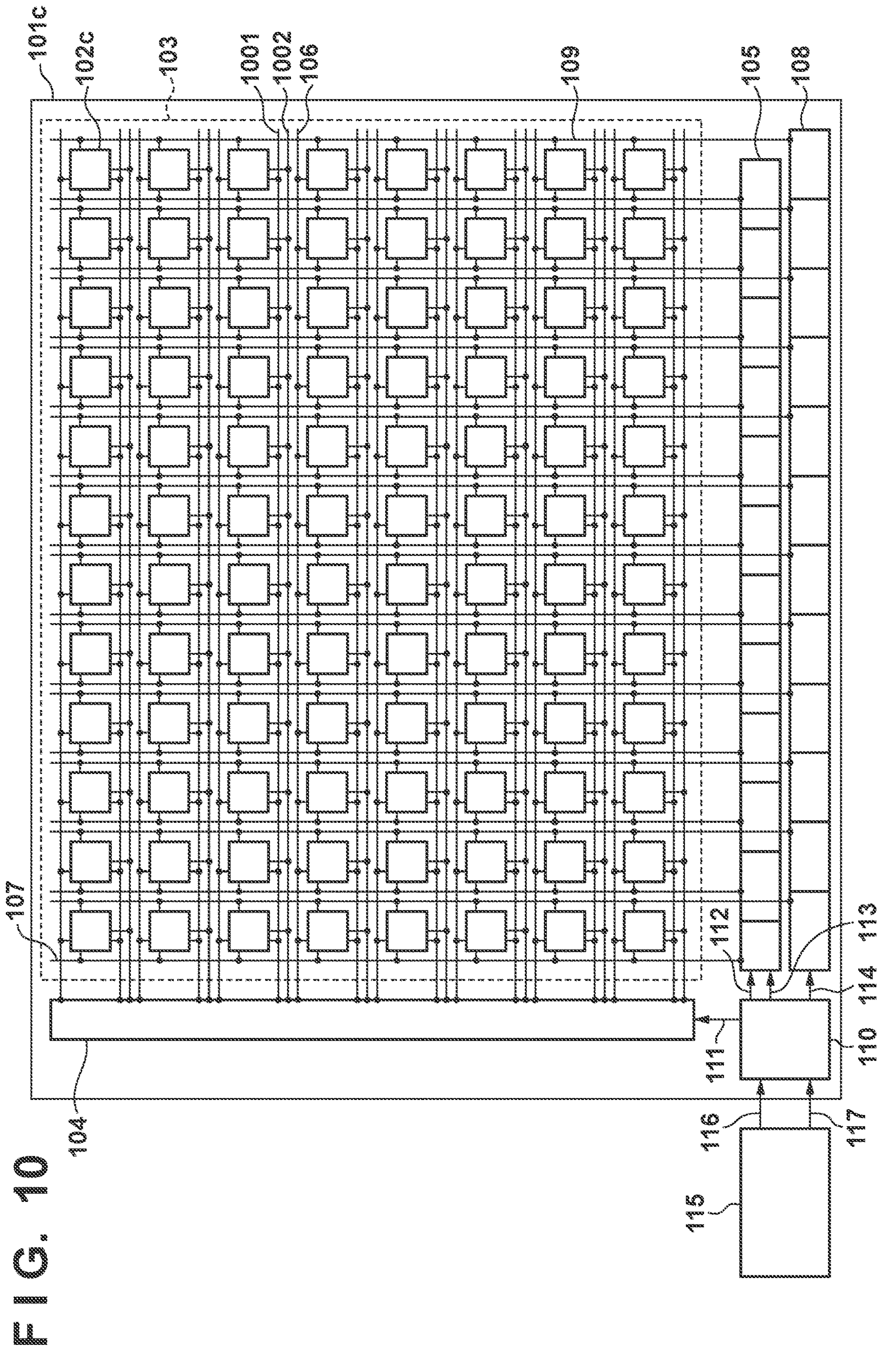
FIG. 10 is a schematic view showing an example of the configuration of a light emitting device according to a third embodiment.

FIG. 10 is a schematic view showing the outline of an example of the light emitting device 101*c*. The light emitting device 101*c* further includes a plurality of second row selection lines 1001 each extending in a row direction, and a plurality of row control lines 1002 each extending in the row direction. The plurality of second row selection lines 1001 and the plurality of row control lines 1002 are connected to a vertical scanning circuit 104. The vertical scanning circuit 104 supplies a first light emission control signal to each second row selection line 1001 in accordance with a vertical scanning control signal 111. The first light emission control signal functions as a row selection signal indicating a pixel row selected from a plurality of pixel rows. Also, the vertical scanning circuit 104 supplies a control signal to each row control line 1002 in accordance with the vertical scanning control signal 111.

Figure 11:
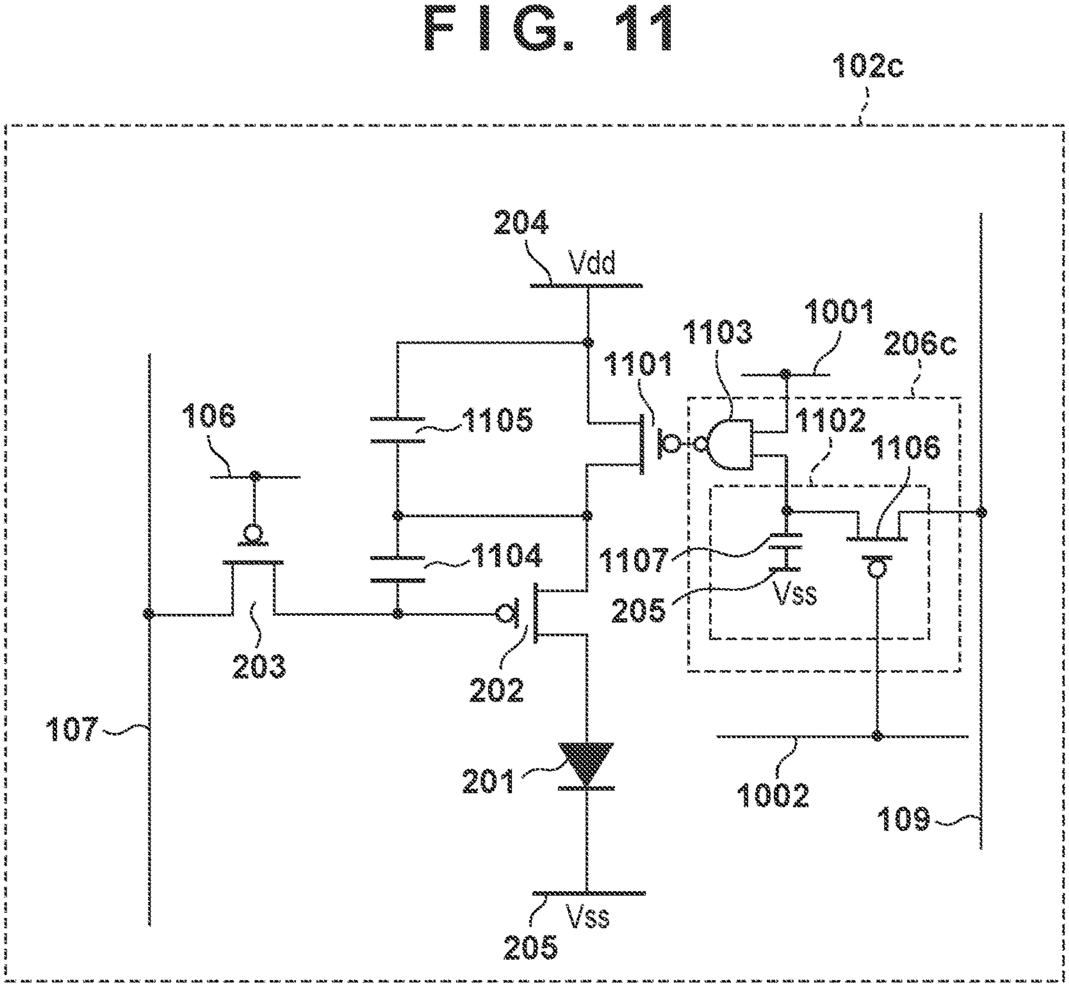
FIG. 11 is an equivalent circuit diagram showing an example of the configuration of a pixel circuit according to the third embodiment.

FIG. 11 is a circuit diagram showing an example of the pixel circuit 102*c*. Differences from the pixel circuit 102*a* will mainly be described below. One of the source and the drain (the drain in this embodiment) of a light emission control transistor 1101 is connected to one of the source and the drain (the source in this embodiment) of a drive transistor 202. The other of the source and the drain (the source in this embodiment) of the light emission control transistor 1101 is connected to a first power supply terminal 204. When connected in this way, the light emission control transistor 1101 controls the conductive state of a power feed path configured to supply operating power to a light emitting element 201. The gate of a write transistor 203 is connected to a first row selection line 106. A first capacitive element 1104 is connected between the gate and the source of the drive transistor 202. A second capacitive element 1105 is connected between the source of the drive transistor 202 and the first power supply terminal 204. The first capacitive element 1104 and the second capacitive element 1105 have a function of holding the voltage between the drain and the gate of the drive transistor 202. Each of the first capacitive element 1104 and the second capacitive element 1105 may be a parasitic capacitance, or may be an MIM capacitor.

The gate of the light emission control transistor 1101 is connected to the output terminal of a light emission control circuit 206*c*. The light emission control circuit 206*c* includes a memory cell 1102 having a capacity of at least 1 bit, and a logic circuit 1103. The memory cell 1102 supplies a second light emission control signal to the first input terminal of the logic circuit 1103. The second row selection line 1001 is connected to the second input terminal of the logic circuit 1103, and the first light emission control signal is supplied from the second row selection line 1001. The logic circuit 1103 generates an output based on the logic operation on the levels of the input signals. The example in FIG. 11 shows a case in which the logic circuit 1103 is a NAND logic gate. However, the logic circuit 1103 may be another logic circuit. If another logic circuit is used, the levels of the first light emission control signal and the control signal supplied by the row control line 1002 are appropriately changed in FIGS. 13A and 13B to be described later.

A column selection line 109 and the row control line 1002 are connected to the memory cell 1102. The memory cell 1102 can hold a specific value. More specifically, the memory cell 1102 stores the level of a column selection signal supplied from the column selection line 109. In the example shown in FIG. 11, the memory cell 1102 includes one transistor 1106 and one capacitor 1107. The memory cell 1102 is not limited to this, and may be another memory cell having a capacity of at least 1 bit.

One of the source and the drain (the source in this embodiment) of the transistor 1106 is connected to the column selection line 109, and the other of the source and the drain of the transistor 1106 is connected to the capacitor 1107. The signal that the transistor 1106 supplies to the capacitor 1107 is the second light emission control signal. The other terminal of the capacitor 1107 is connected to a second power supply terminal 205.

The light emission control transistor 1101 changes to the conductive state in response to the first light emission control signal and the second light emission control signal, thereby enabling current supply from the first power supply terminal 204 to the drive transistor 202. This current supply enables light emission of the light emitting element 201 by the drive transistor 202. That is, the light emission control transistor 1101 functions as a circuit that controls light emission/non-light emission of the light emitting element 201.

According to the above-described configuration, if the value held by the memory cell 1102 is low, the light emission control transistor 1101 is always in the nonconductive state (the pixel circuit 102*c* is in the non-light emission state) independently of the level of the first light emission control signal. In the third embodiment, the light emission control circuit 206*c* exists in each pixel circuit 102*c*. Instead, one light emission control circuit 206*c* may be shared by a plurality of pixel circuits 102*c*. In this case, the output terminal of the light emission control circuit 206*c* is connected to the gates of the light emission control transistors 1101 of two or more pixel circuits 102*c*.

Figure 12:
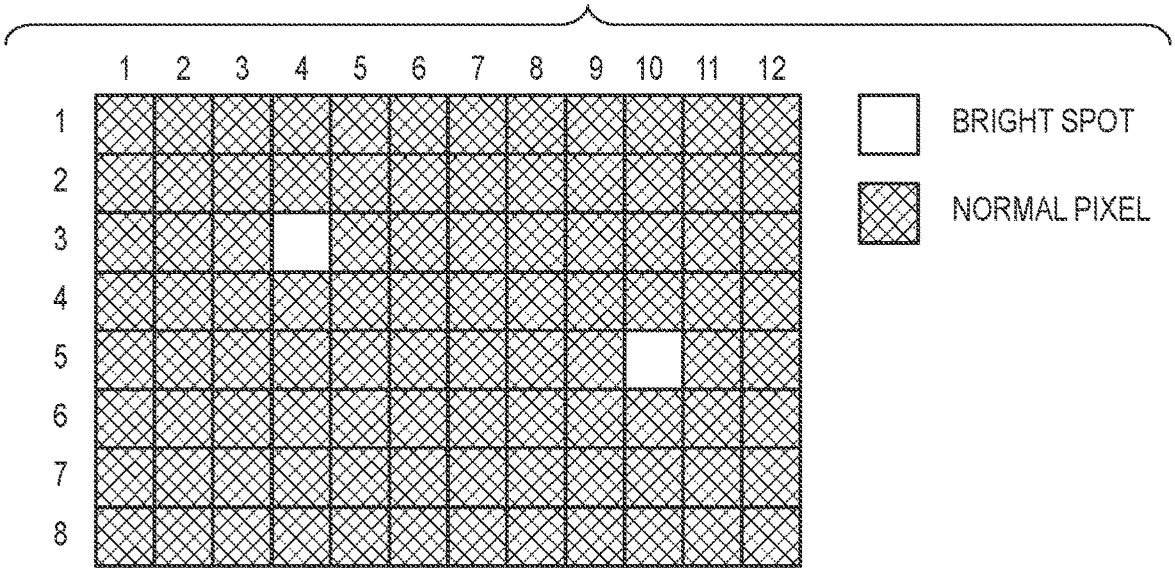
FIG. 12 is a view for explaining an image displayed on a light emitting device including bright spots.

FIG. 12 shows an example of a light emitting device including a pixel circuit that always emits light independently of the value of a signal voltage. A pixel circuit having such a defect that the pixel circuit always emits light independently of the value of a signal voltage will be referred to as a bright spot. In FIG. 12, a pixel circuit (4, 3) and a pixel circuit (10, 5) are bright spots. A bright spot may be generated during a manufacturing process and is one of causes for lowering the manufacturing yield of light emitting devices. One of causes for generating a bright spot is a failure that the source and the drain of the drive transistor 202 are electrically short-circuited. In this state, the drive transistor 202 is always in the conductive state. For this reason, if the light emission control transistor 1101 is in the conductive state, the light emitting element 201 always emits light independently of the value of a signal voltage Vsig. Even if the brightness is originally low, the bright spot emits light of high brightness. Hence, the light emitting device 101*c* according to this embodiment controls to always set the bright spot in the non-light emission state, thereby making the defect unnoticeable.

A pixel circuit that is always as in the non-light emission state (that is, off) independently of the value of the signal voltage will be referred to as a dark spot. In the following description, the pixel circuit 102*c* that is caused to emit light in a brightness according to the signal voltage will be referred to as a light emitting pixel circuit, and the pixel circuit 102*c* that is set in the non-light emission state independently of the signal voltage will be referred to as a non-light emitting pixel circuit. In the above-described example, a pixel circuit at a bright spot is a non-light emission pixel circuit, and a normal pixel circuit (that is, other than bright spots) is a light emission pixel circuit.

Figure 13A:
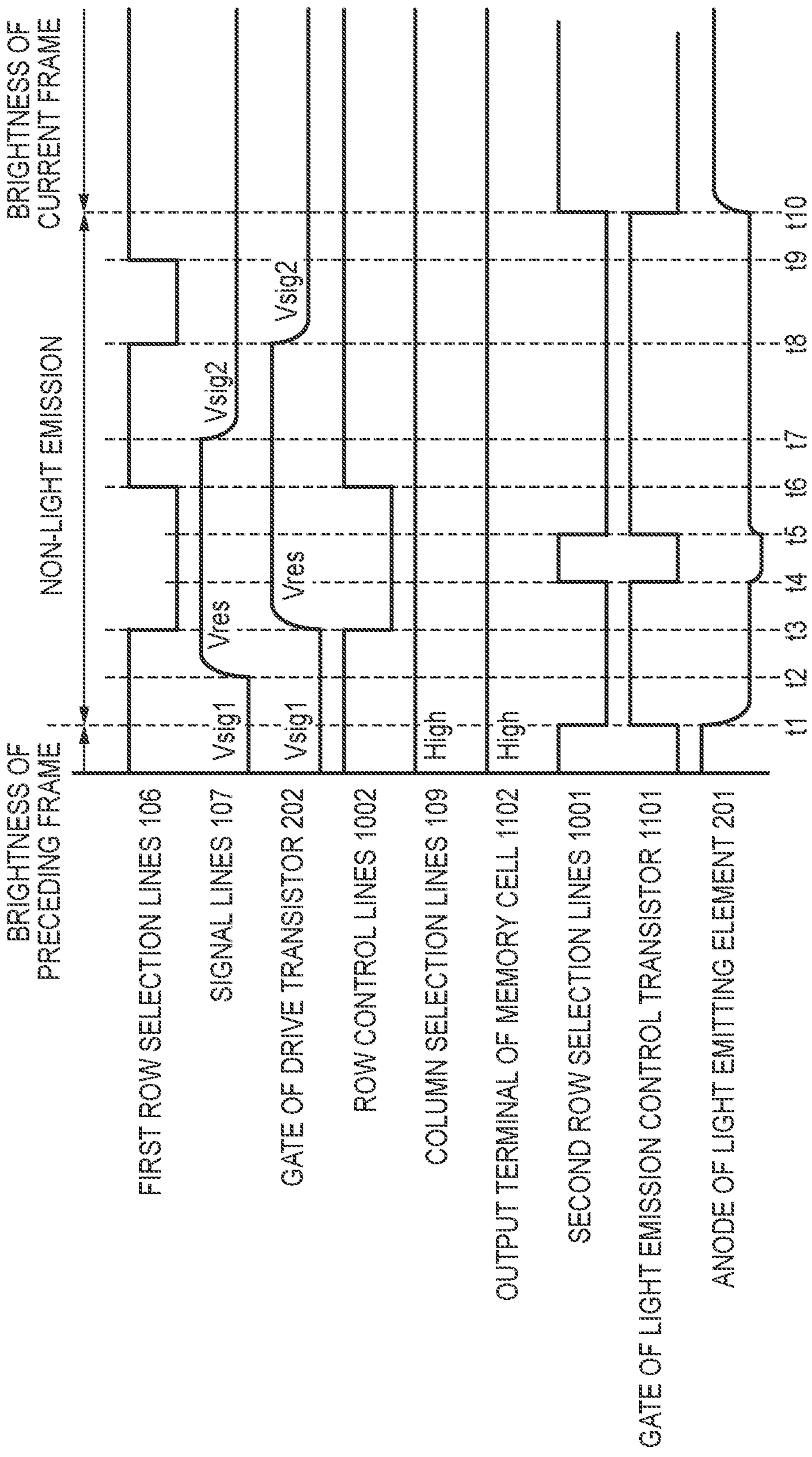
FIGS. 13A and 13B are timing charts showing an example of drive of the light emitting device according to the third embodiment.
Figure 13B:
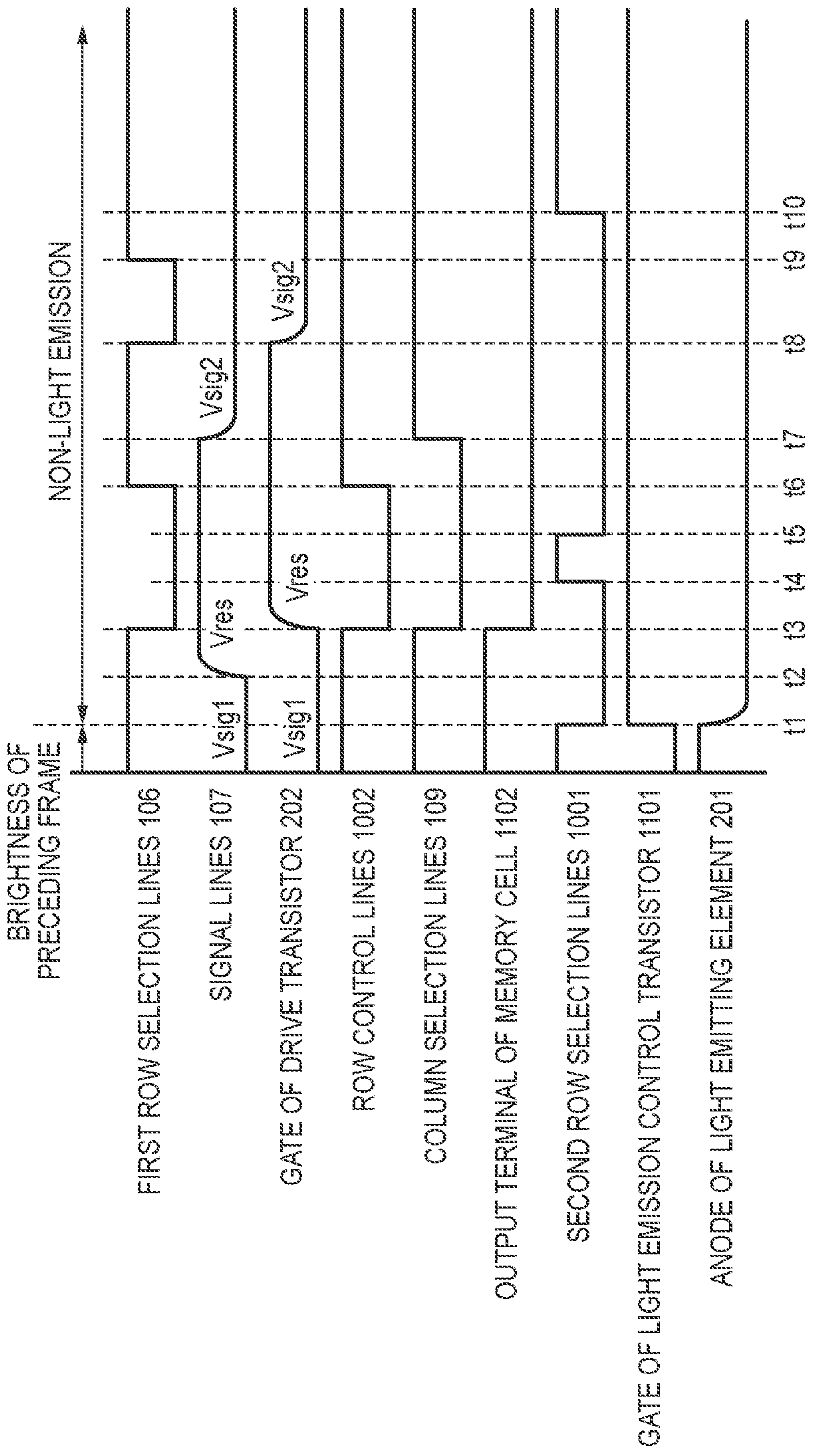

FIGS. 13A and 13B are timing charts showing an example of drive of a light emission pixel circuit and a non-light emission pixel circuit included in the same pixel row. Each waveform in FIGS. 13A and 13B shows the change of the voltage of a target wiring or terminal. FIG. 13A shows drive of the light emission pixel circuit, and FIG. 13B shows drive of the non-light emission pixel circuit.

Referring to FIGS. 13A and 13B, the period before time t1 is the light emission period of the light emitting element 201 for the preceding frame. During this light emission period, the write transistor 203 is in a nonconductive state, and the light emitting element 201 emits light in a brightness according to the voltage held by the first capacitive element 1104 and the second capacitive element 1105.

From time t1, drive of the pixel circuits 102*c* included in one pixel row is started. At time t1, the vertical scanning circuit 104 makes the first light emission control signal supplied to the second row selection line 1001 transition from high to low. Since this changes the gate voltage of the light emission control transistor 1101 to high level, the light emission control transistor 1101 changes to the nonconductive state, and the light emitting element 201 changes to the non-light emission state.

At time t2, the signal output circuit 105 makes the voltage of the signal lines 107 transition from the signal voltage Vsig1 of the preceding frame to the reset voltage Vres. At time t3, the vertical scanning circuit 104 makes the first write control signal of the first row selection line 106 transition from high to low, thereby setting the write transistor 203 in the conductive state. Accordingly, the reset voltage Vres of the signal line 107 is written in the gate of the drive transistor 202, and the drive transistor 202 changes to the nonconductive state.

Similarly, at time t3, the vertical scanning circuit 104 makes the control signal supplied to the row control line 1002 transition from high to low, thereby setting the transistor 1106 in the conductive state. Thus, a state in which a value can be written in the memory cell 1102 is obtained.

As shown in FIG. 13A, a column control circuit 108 maintains the column selection signal supplied to the column selection line 109 connected to the light emission pixel circuit at high level. Accordingly, the signal of high level is written in the capacitor 1107 of the memory cell 1102, and the memory cell 1102 supplies the second light emission control signal of high level to the logic circuit 1103. On the other hand, as shown in FIG. 13B, at time t3, the column control circuit 108 makes the control signal supplied to the column selection line 109 connected to the non-light emission pixel circuit transition from high to low. Accordingly, the signal of low level is written in the capacitor 1107, and the memory cell 1102 supplies the second light emission control signal of low level to the logic circuit 1103.

At time t4, the vertical scanning circuit 104 makes the first light emission control signal supplied to the second row selection line 1001 transition from low to high. Accordingly, as shown in FIG. 13A, in the light emission pixel circuit, since the light emission control transistor 1101 changes to the conductive state, a power supply voltage Vdd is supplied to the source of the drive transistor 202. As a result, the voltage of the anode of the light emitting element 201 is reset to a voltage according to the reset voltage Vres. On the other hand, as shown in FIG. 13B, in the non-light emission pixel circuit, since the light emission control transistor 1101 does not change to the conductive state, the power supply voltage Vdd is not supplied to the source of the drive transistor 202.

At time t5, the vertical scanning circuit 104 makes the first light emission control signal supplied to the second row selection line 1001 transition from high to low. At time t6, the light emission control circuit 206*c* makes the first write control signal supplied to the first row selection line 106 transition from low to high. Similarly, at time t6, the vertical scanning circuit 104 makes the control signal supplied to the row control line 1002 transition from low to high.

At time t7, the signal output circuit 105 makes the voltage of the signal lines 107 transition to a signal voltage Vsig2 of the current frame. Similarly, at time t7, the column control circuit 108 makes the second write control signal supplied to the column selection line 109 connected to the non-light emission pixel circuit transition from low to high.

At time t8, the vertical scanning circuit 104 makes the first write control signal of the first row selection line 106 transition from high to low, thereby setting the write transistor 203 in the conductive state. Accordingly, the signal voltage Vsig2 of the signal line 107 is written in the gate of the drive transistor 202, and the drive transistor 202 changes to the conductive state. At time t9, the light emission control circuit 206*c* makes the first write control signal supplied to the first row selection line 106 transition from low to high.

At time t10, the vertical scanning circuit 104 makes the first light emission control signal supplied to the second row selection line 1001 transition from low to high. Accordingly, as shown in FIG. 13A, in the light emission pixel circuit, since the light emission control transistor 1101 changes to the conductive state, the power supply voltage Vdd is supplied to the source of the drive transistor 202. As a result, the voltage of the anode of the light emitting element 201 transitions to a voltage according to the signal voltage Vsig2, and the light emitting element 201 emits light in a brightness according to the voltage. On the other hand, as shown in FIG. 13B, in the non-light emission pixel circuit, since the light emission control transistor 1101 does not change to the conductive state, the power supply voltage Vdd is not supplied to the source of the drive transistor 202. As a result, the light emitting element 201 remains in the non-light emission state.

In the above description, the row control line 1002 may be replaced with the first row selection line 106. In this case, in FIGS. 13A and 13B, the voltage of the row control line 1002 changes to low at time t8 and high at time t9. Hence, in the non-light emission pixel, the timing of making the column selection line 109 transition from high to low is changed from time t7 to time t10.

As described above, when the light emission control circuit 206*c* including the memory cell 1102 always sets the light emission control transistor 1101 in the nonconductive state, the pixel circuit 102*c* becomes a dark spot that is always in the non-light emission state. If the memory cell 1102 is formed using a memory that does not need a refresh operation, drive for holding a value in the memory cell during the period from time t3 to time t6 is performed only once after activation of the light emitting device 101*c*. An example of the memory that does not need a refresh operation is an SRAM (Static Random Access Memory).

The light emitting device 101*c* according to the third embodiment performs different pixel control processes (here, light emission/non-light emission) in the pixel rows controlled at the same timing. More specifically, the pixel circuit 102*c* located on a pixel row indicated by the first light emission control signal supplied via the second row selection line 1001 and on a pixel column indicated by the column selection signal supplied via the column selection line 109 is a light emission pixel circuit. The light emitting element 201 of the light emission pixel circuit can emit light in a brightness according to the pixel signal supplied to the light emission pixel circuit. On the other hand, the pixel circuit 102*c* located on a pixel row indicated by the first write control signal supplied via the first row selection line 106 and on a pixel column that is not indicated by the second write control signal supplied via the column selection line 109 is a non-light emission pixel circuit. The light emitting element 201 of the non-light emission pixel circuit is inhibited from emitting light. Hence, when a bright spot is driven as a dark spot, a defect derived from a short circuit between the source and the drain of the drive transistor 202 can be made unnoticeable.

Fourth Embodiment

A light emitting device according to a fourth embodiment will be described with reference to FIGS. 14 to 15B. The fourth embodiment is different from the third embodiment in that a pixel circuit 102*d* is provided in place of the pixel circuit 102*c*, and may be the same in the remaining points. The differences from the third embodiment will mainly be described below.

Figure 14:
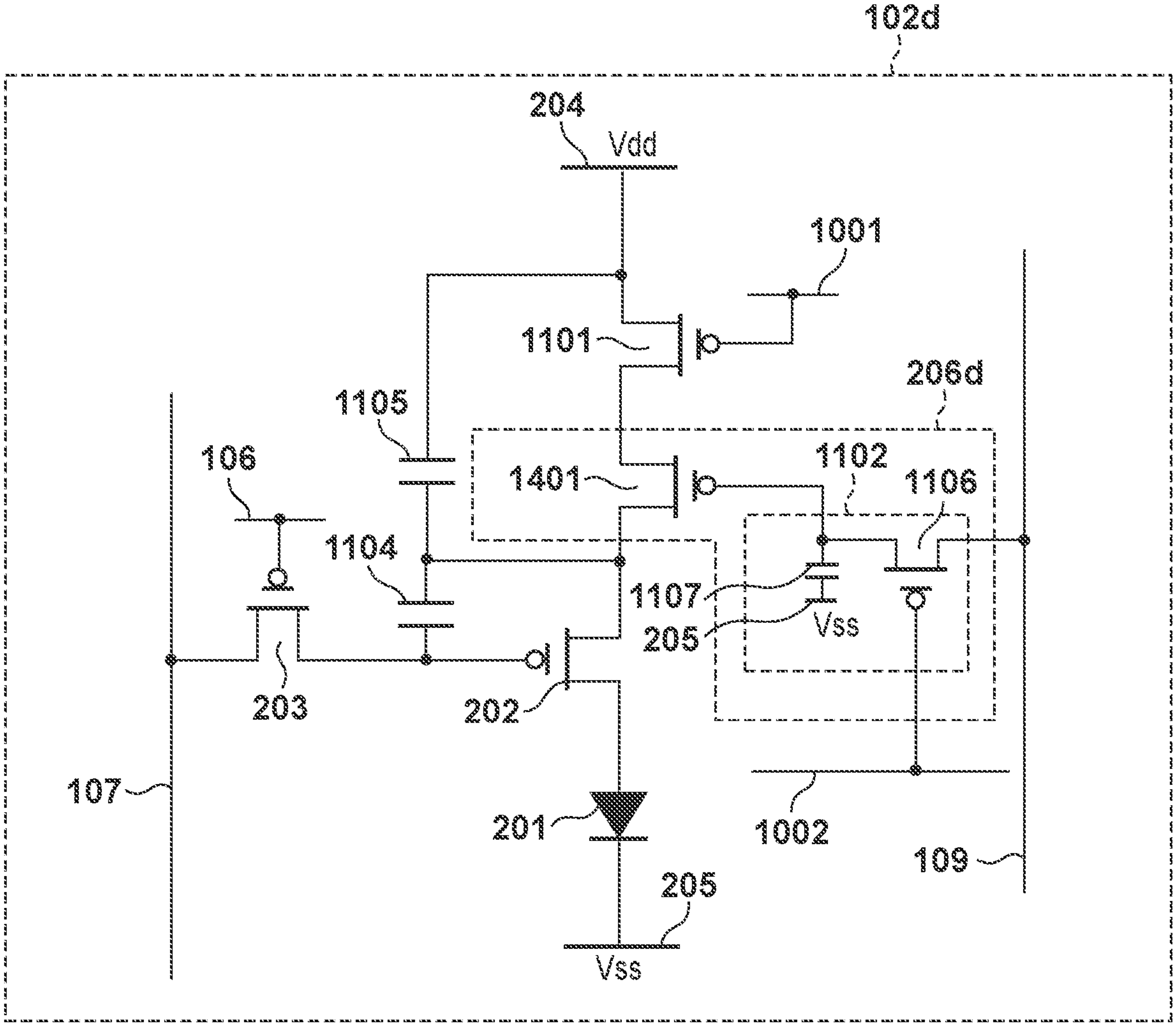
FIG. 14 is an equivalent circuit diagram showing an example of the configuration of a pixel circuit according to a fourth embodiment.

FIG. 14 is a circuit diagram showing an example of the pixel circuit 102*d*. The pixel circuit 102*d* is different from the pixel circuit 102*c* in that a light emission control circuit 206*d* is provided in place of the light emission control circuit 206*c*, and may be the same in the remaining points. In the example shown in FIG. 14, the light emission control circuit 206*d* is formed by one p-type transistor 1401 and a memory cell 1102. The p-type transistor 1401 may be an n-type transistor. In this case, the polarity of a second light emission control signal to be described later with reference to FIGS. 15A and 15B is reversed.

The light emission control circuit 206*d* is connected between the drain of a light emission control transistor 1101 and the source of a drive transistor 202. Instead, the light emission control circuit 206*d* may be connected between the source of the light emission control transistor 1101 and a first power supply terminal 204. Thus, the light emission control circuit 206*d* is arranged on a power feed path configured to supply operating power to a light emitting element 201. A second row selection line 1001 is connected to the gate of the light emission control transistor 1101.

Figure 15A:
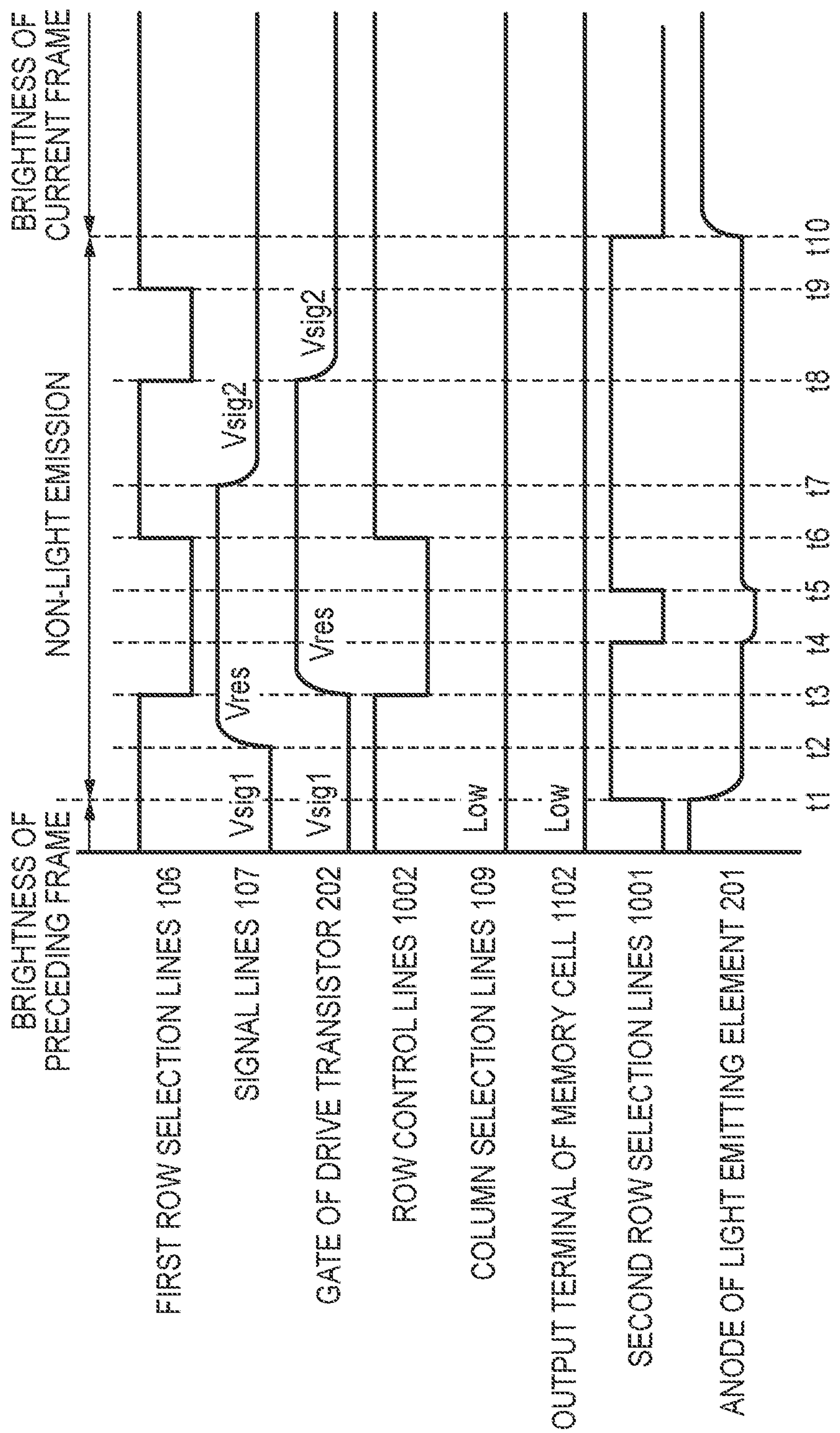
FIGS. 15A and 15B are timing charts showing an example of drive of a light emitting device according to the fourth embodiment.
Figure 15B:
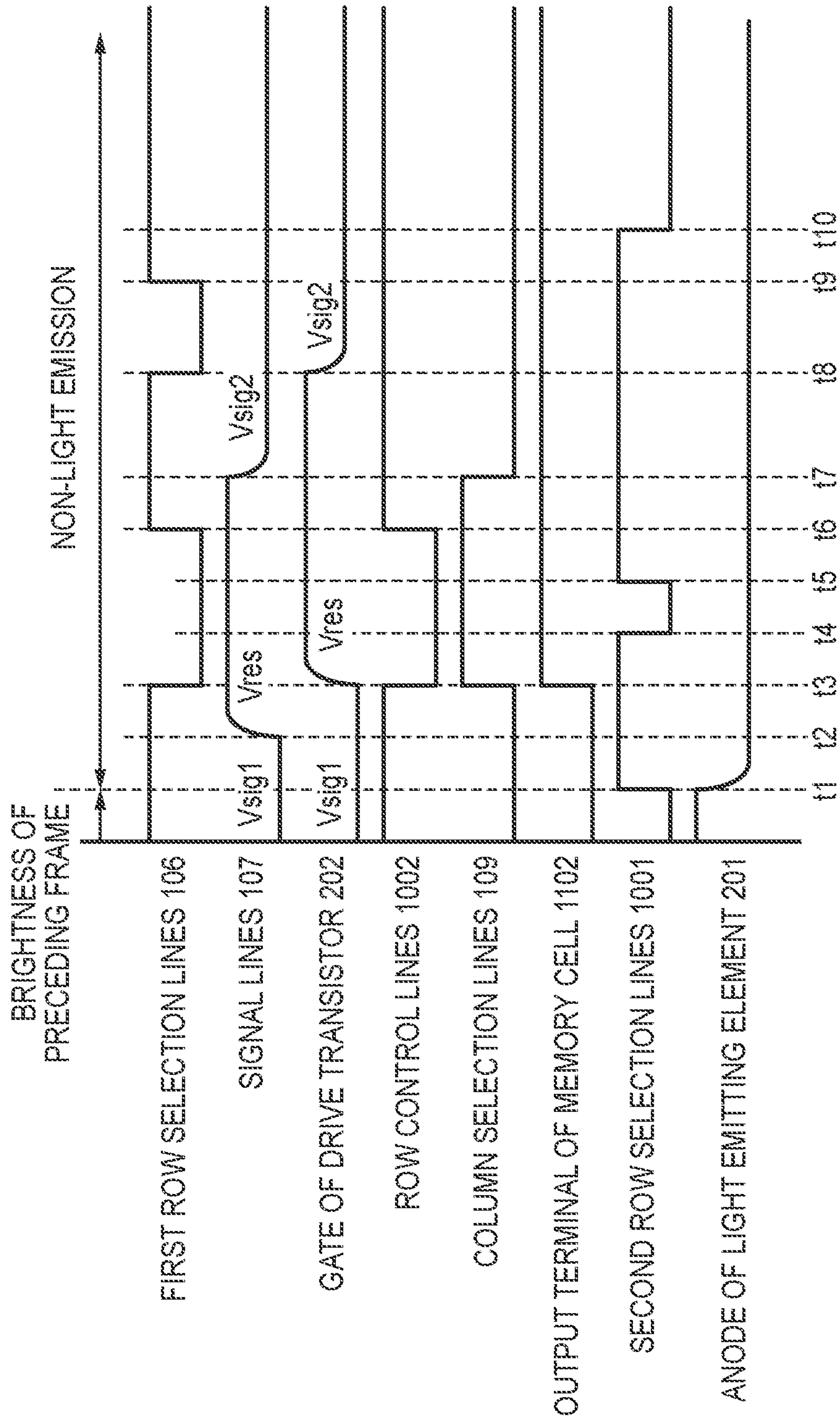

FIGS. 15A and 15B are timing charts showing an example of drive of a light emission pixel circuit and a non-light emission pixel circuit included in the same pixel row. Each waveform in FIGS. 15A and 15B shows the change of the voltage of a target wiring or terminal. FIG. 15A shows drive of the light emission pixel circuit, and FIG. 15B shows drive of the non-light emission pixel circuit.

As compared to the timing charts according to the third embodiment described with reference to FIGS. 13A and 13B, the polarity of the column selection signal of a column selection line 109 is reversed, and the polarity of a first light emission control signal supplied by the second row selection line 1001 is reversed.

According to the fourth embodiment, it is possible to obtain the same effect as in the third embodiment using elements in a number smaller than the third embodiment.

Fifth Embodiment

A light emitting device 101*e* according to a fifth embodiment will be described with reference to FIGS. 16 to 17B. The fifth embodiment is different from the third embodiment in that a pixel circuit 102*e* is provided in place of the pixel circuit 102*c*, and a vertical scanning circuit 104 supplies a first reset signal to a second row selection line 1001, and may be the same in the remaining points. The differences from the third embodiment will mainly be described below. The first reset signal functions as a row selection signal indicating a pixel row selected from a plurality of pixel rows.

Figure 16:
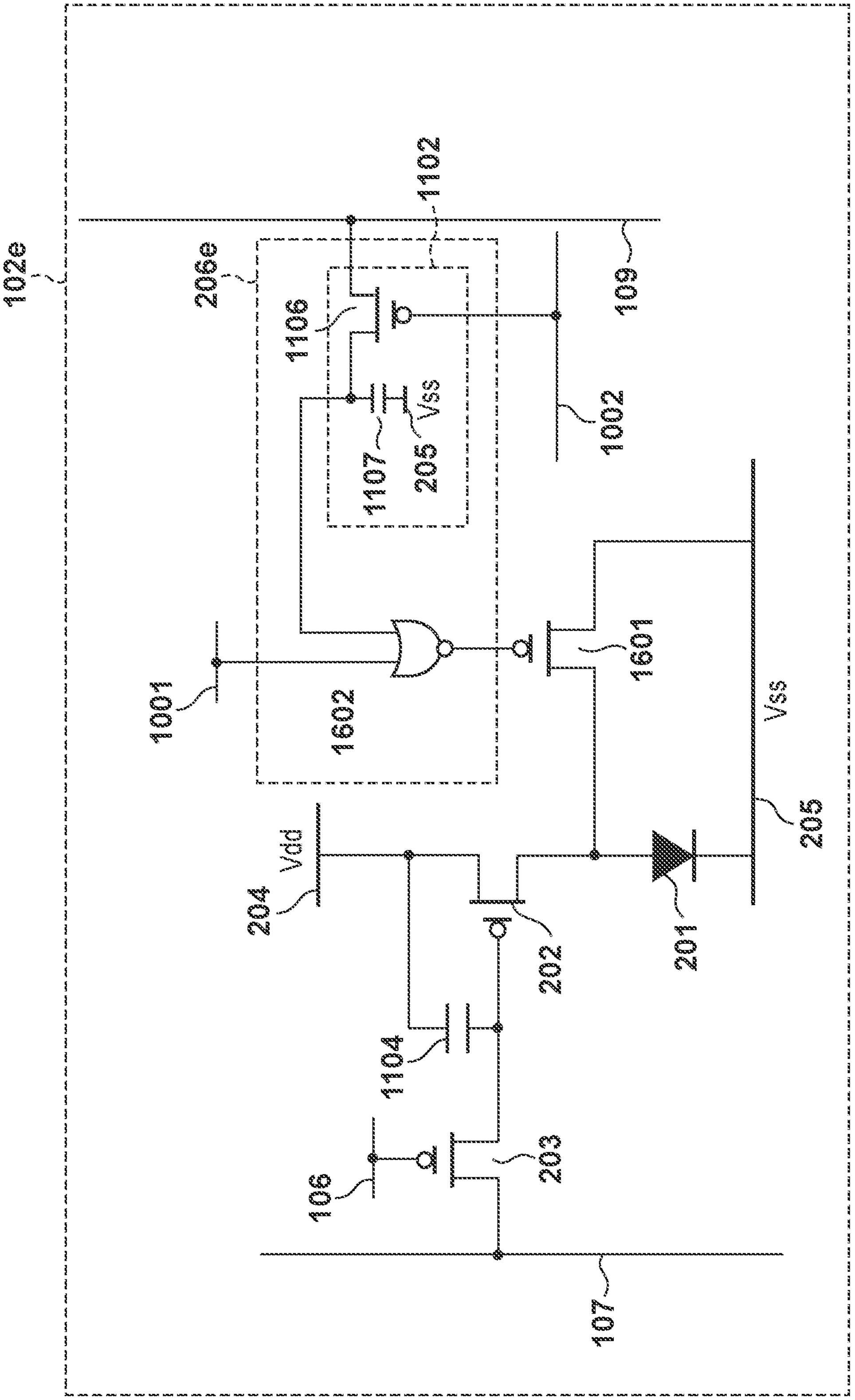
FIG. 16 is an equivalent circuit diagram showing an example of the configuration of a pixel circuit according to a fifth embodiment.

FIG. 16 is a circuit diagram showing an example of the pixel circuit 102*e*. The pixel circuit 102*e* is different from the pixel circuit 102*c* in that a light emission control circuit 206*e* is provided in place of the light emission control circuit 206*c*, a reset transistor 1601 is further provided, and a second capacitive element 1105 is not included, and may be the same in the remaining points. In the example shown in FIG. 16, the light emission control circuit 206*e* is formed by a logic circuit 1602 and a memory cell 1102.

One of the source and the drain (the source in this embodiment) of the reset transistor 1601 is connected to one of the source and the drain (the drain in this embodiment) of a drive transistor 202. The other of the source and the drain of the reset transistor 1601 is connected to a second power supply terminal 205. The gate of the reset transistor 1601 is connected to the output terminal of the light emission control circuit 206*e*. Thus, the reset transistor 1601 resets the voltage applied to a light emitting element 201 in accordance with the voltage supplied to the gate.

In the light emission control circuit 206*e*, the memory cell 1102 supplies a second reset signal to the first input terminal of the logic circuit 1602. The first reset signal is supplied to the second input terminal of the logic circuit 1602 via the second row selection line 1001. The logic circuit 1602 generates an output based on the logic operation on the levels of these input signals. The example in FIG. 16 shows a case in which the logic circuit 1602 is an NOR logic gate. However, the logic circuit 1602 may be another logic circuit. Also, the memory cell 1102 includes one transistor 1106 and one capacitor 1107. The memory cell 1102 is not limited to the above-described configuration, and may be another memory cell having a capacity of at least 1 bit.

The reset transistor 1601 changes to a conductive state in response to the output signal of the light emission control circuit 206*e*, thereby making the voltage of the anode of the light emitting element 201 equal to a voltage Vss. Thus, the reset transistor 1601 functions as a circuit that controls light emission/non-light emission of the light emitting element 201.

According to the above-described configuration, if the value held by the memory cell 1102 is at high level, the reset transistor 1601 is always in the conductive state (the pixel circuit 102*e* is in the non-light emission state) independently of the level of the first reset signal. The light emission control circuit 206*e* may exist in each pixel circuit 102*e*, or one light emission control circuit 206*e* may be shared by a plurality of pixel circuits 102*e*. In the latter case, the output terminal of one light emission control circuit 206*e* is connected to the gates of the reset transistors 1601 of the plurality of pixel circuits 102*e*.

Figure 17A:
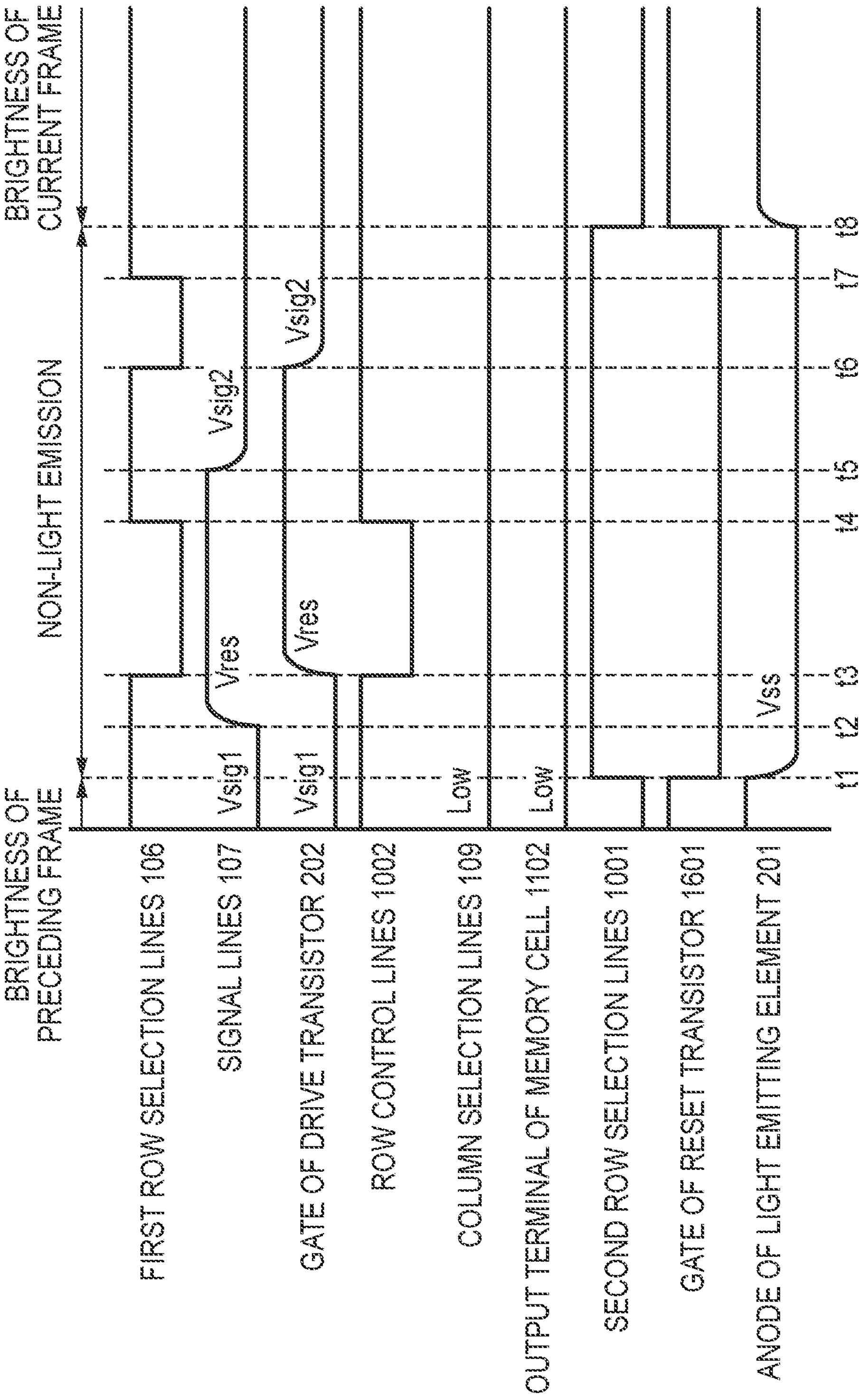
FIGS. 17A and 17B are timing charts showing an example of drive of a light emitting device according to the fifth embodiment.
Figure 17B:
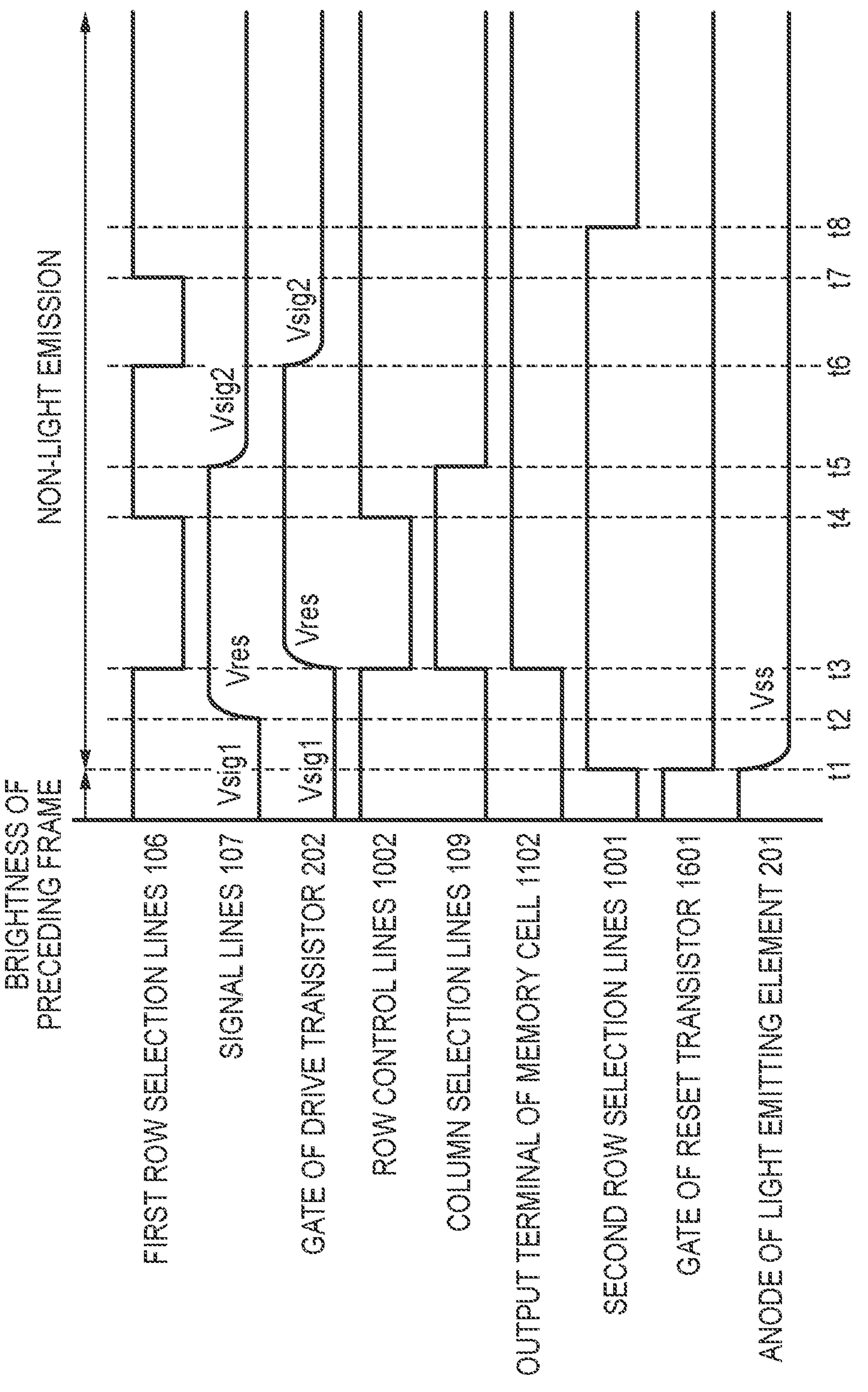

FIGS. 17A and 17B are timing charts showing an example of drive of a light emission pixel circuit and a non-light emission pixel circuit included in the same pixel row. Each waveform in FIGS. 17A and 17B shows the change of the voltage of a target wiring or terminal. FIG. 17A shows drive of the light emission pixel circuit, and FIG. 17B shows drive of the non-light emission pixel circuit.

Referring to FIGS. 17A and 17B, the period before time t1 is the light emission period of the light emitting element 201 for the preceding frame. During this light emission period, the write transistor 203 is in a nonconductive state, and the light emitting element 201 emits light in a brightness according to the voltage held by a first capacitive element 1104.

From time t1, drive of the pixel circuits 102*e* included in one pixel row is started. At time t1, the vertical scanning circuit 104 makes the first reset signal supplied to the second row selection line 1001 transition from low to high. Since this changes the gate voltage of the reset transistor 1601 to low level, the reset transistor 1601 changes to the conductive state, and the light emitting element 201 changes to the non-light emission state.

At time t2, a signal output circuit 105 makes the voltage of signal lines 107 transition from a signal voltage Vsig1 of the preceding frame to a reset voltage Vres. At time t3, the vertical scanning circuit 104 makes the first write control signal of a first row selection line 106 transition from high to low, thereby setting a write transistor 203 in the conductive state. Accordingly, the reset voltage Vres of the signal line 107 is written in the gate of the drive transistor 202, and the drive transistor 202 changes to the nonconductive state.

Similarly, at time t3, the vertical scanning circuit 104 makes the control signal supplied to a row control line 1002 transition from high to low, thereby setting the transistor 1106 in the conductive state. Thus, a state in which a value can be written in the memory cell 1102 is obtained.

As shown in FIG. 17A, a column control circuit 108 maintains the column selection signal supplied to a column selection line 109 connected to the light emission pixel circuit at low level. Accordingly, the signal of low level is written in the capacitor 1107 of the memory cell 1102, and the memory cell 1102 supplies the second reset signal of low level to the logic circuit 1602. On the other hand, as shown in FIG. 17B, at time t3, the column control circuit 108 makes the control signal supplied to the column selection line 109 connected to the non-light emission pixel circuit transition from low to high. Accordingly, the signal of high level is written in the capacitor 1107, and the memory cell 1102 supplies the second reset signal of high level to the logic circuit 1602.

At time t4, the light emission control circuit 206*e* makes the first write control signal supplied to the first row selection line 106 transition from low to high. Similarly, at time t4, the vertical scanning circuit 104 makes the control signal supplied to the row control line 1002 transition from low to high. At time t5, the signal output circuit 105 makes the voltage of the signal lines 107 transition to a signal voltage Vsig2 of the current frame.

At time t6, the vertical scanning circuit 104 makes the first write control signal of the first row selection line 106 transition from high to low, thereby setting the write transistor 203 in the conductive state. Accordingly, the signal voltage Vsig2 of the signal line 107 is written in the gate of the drive transistor 202, and the drive transistor 202 changes to the conductive state. At time t7, the light emission control circuit 206*e* makes the first write control signal supplied to the first row selection line 106 transition from low to high.

At time t8, the vertical scanning circuit 104 makes the first reset signal supplied to the second row selection line 1001 transition from low to high. Accordingly, as shown in FIG. 17A, in the light emission pixel circuit, the reset transistor 1601 changes to the nonconductive state. As a result, the voltage of the anode of the light emitting element 201 transitions to a voltage according to the signal voltage Vsig2, and the light emitting element 201 emits light in a brightness according to the voltage. On the other hand, as shown in FIG. 17B, in the non-light emission pixel circuit, the reset transistor 1601 remains in the conductive state. As a result, the light emitting element 201 remains in the non-light emission state.

In the above description, the row control line 1002 may be replaced with the first row selection line 106. In this case, in FIGS. 17A and 17B, the voltage of the row control line 1002 changes to low at time t6 and high at time t7. Hence, in the non-light emission pixel, the timing of making the column selection line 109 transition from high to low is changed from time t5 to time t8.

As described above, when the light emission control circuit 206*e* including the memory cell 1102 controls the nonconductive state of the reset transistor 1601, the pixel circuit 102*e* can be changed to a dark spot that is always in the non-light emission state. If the memory cell 1102 is formed using a memory that does not need a refresh operation, for example, an SRAM, drive for holding a value in the memory cell, which is performed during the period from time t3 to time t4, is performed only once after activation of the light emitting device 101*e*.

According to the fifth embodiment, not only a bright spot derived from a short circuit between the source and the drain of the drive transistor 202 but also a bright spot derived from a short circuit between the anode of the light emitting element 201 and the first power supply terminal 204 can be driven as a dark spot.

Sixth Embodiment

A light emitting device according to a sixth embodiment will be described with reference to FIGS. 18 to 19B. The sixth embodiment is different from the fifth embodiment in that a pixel circuit 102*f* is provided in place of the pixel circuit 102*e*, and may be the same in the remaining points. The differences from the fifth embodiment will mainly be described below.

Figure 18:
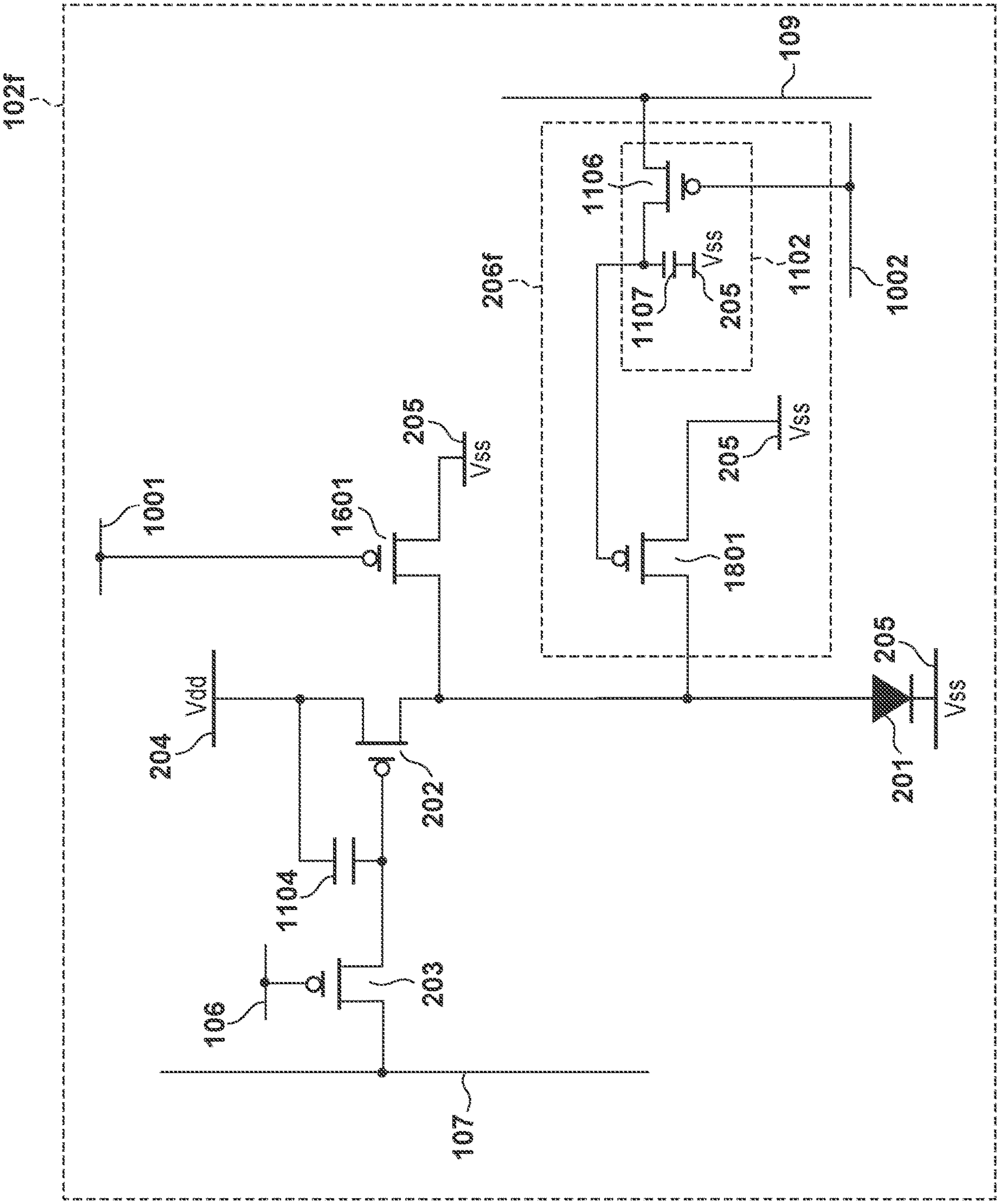
FIG. 18 is an equivalent circuit diagram showing an example of the configuration of a pixel circuit according to a sixth embodiment.

FIG. 18 is a circuit diagram showing an example of the pixel circuit 102*f*. Differences from the pixel circuit 102*e* will mainly be described below. The pixel circuit 102*f* is different from the pixel circuit 102*e* in that a light emission control circuit 206*f* is provided in place of the light emission control circuit 206*e*, and may be the same in the remaining points. In the example shown in FIG. 18, the light emission control circuit 206*f* is formed by one p-type transistor 1801 and a memory cell 1102. The p-type transistor 1801 may be an n-type transistor. In this case, the polarity of a first reset signal to be described later with reference to FIGS. 19A and 19B is reversed.

The p-type transistor 1801 of the light emission control circuit 206*f* is connected between the anode of a light emitting element 201 and the source of a reset transistor 1601. Instead, the light emission control circuit 206*f* may be connected between the drain of a drive transistor 202 and the source of the reset transistor 1601. In addition, a second row selection line 1001 is connected to the gate of the reset transistor 1601. Thus, the p-type transistor 1801 resets the voltage applied to the light emitting element 201 in accordance with the voltage supplied to the gate.

Figure 19A:
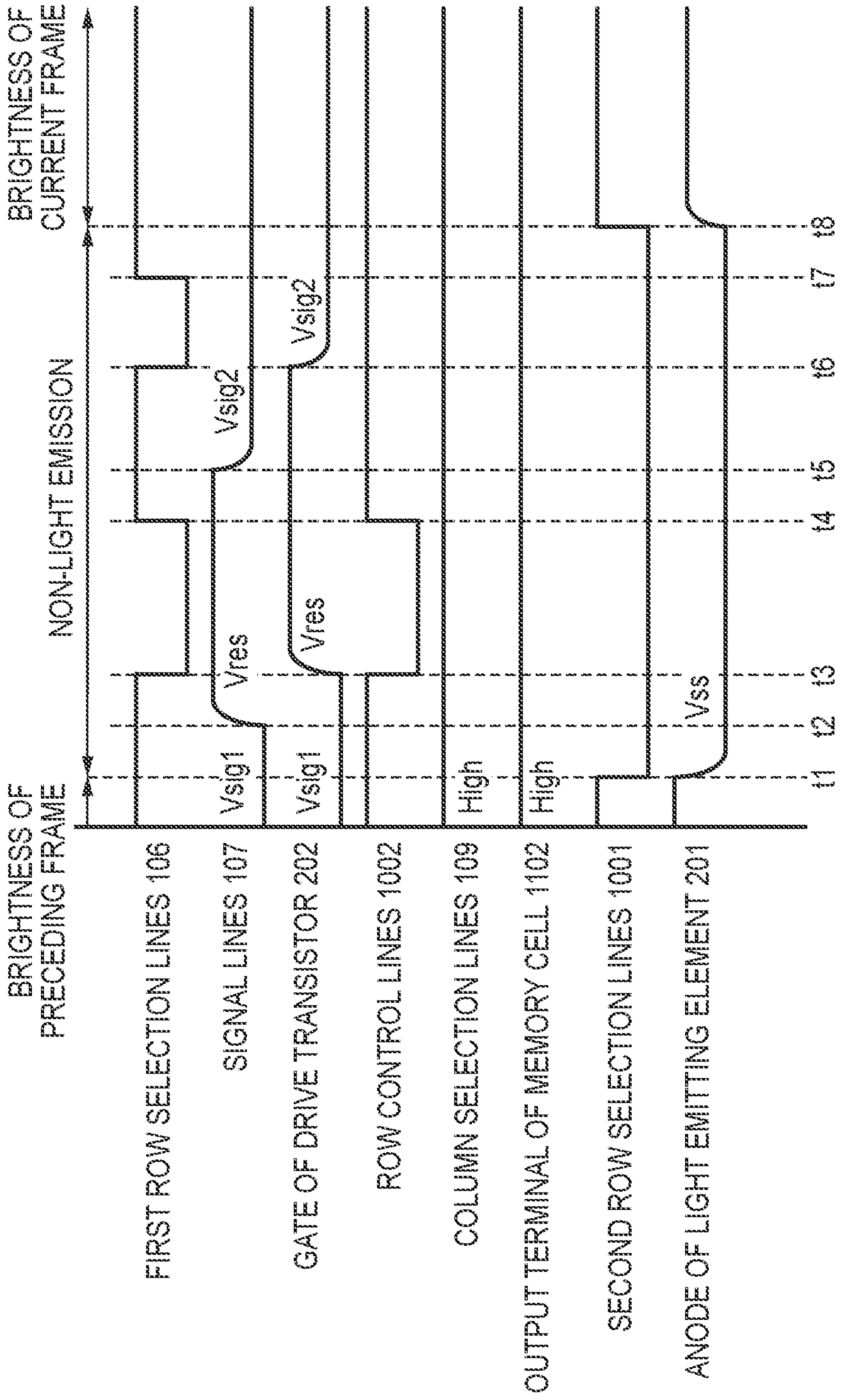
FIGS. 19A and 19B are timing charts showing an example of drive of a light emitting device according to the sixth embodiment.
Figure 19B:
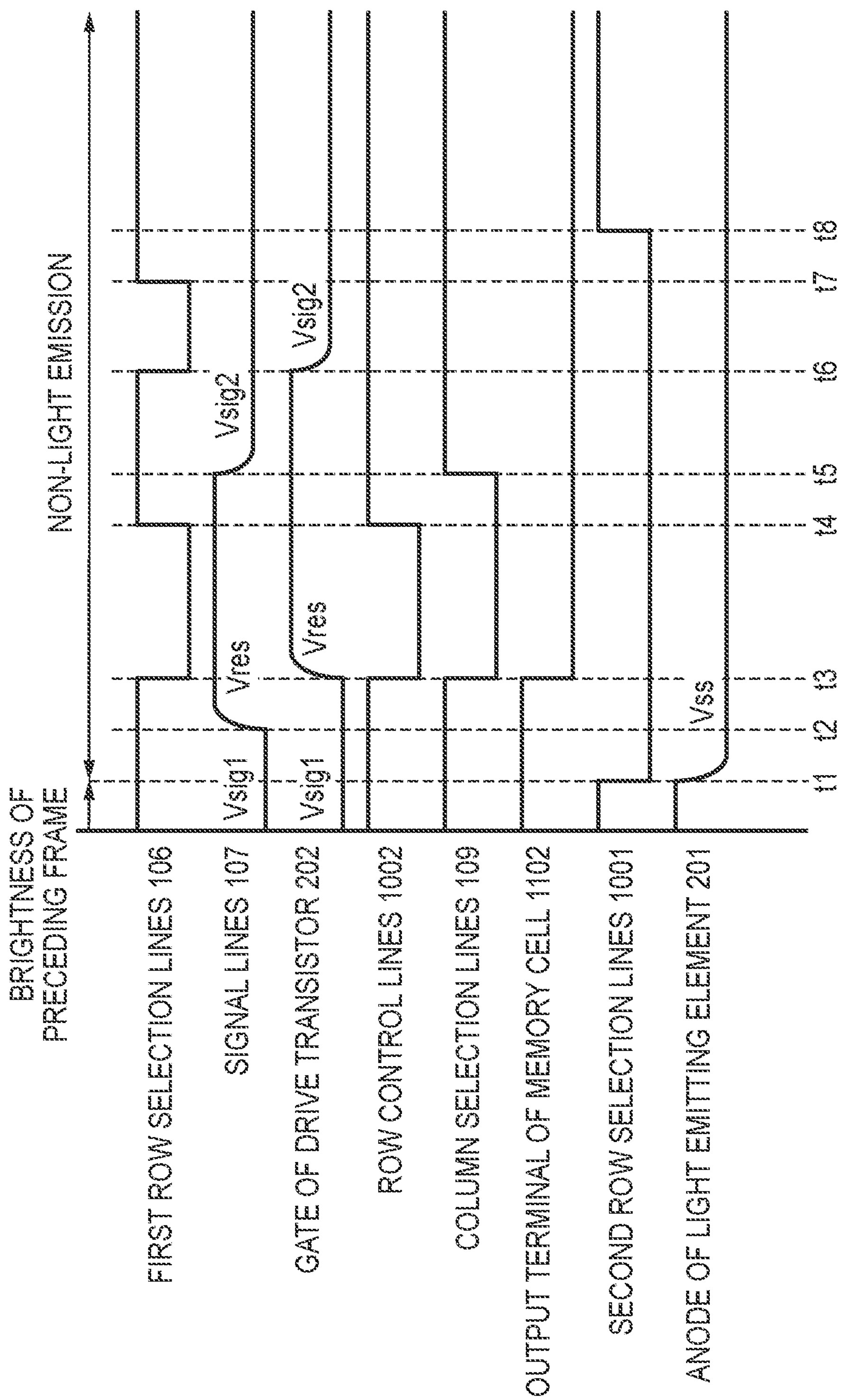

FIGS. 19A and 19B are timing charts showing an example of drive of a light emission pixel circuit and a non-light emission pixel circuit included in the same pixel row. Each waveform in FIGS. 19A and 19B shows the change of the voltage of a target wiring or terminal. FIG. 19A shows drive of the light emission pixel circuit, and FIG. 19B shows drive of the non-light emission pixel circuit.

As compared to the timing charts according to the fifth embodiment described with reference to FIGS. 17A and 17B, the polarity of the signal of a column selection line 109 is reversed, and the polarity of the first reset signal supplied by the second row selection line 1001 is reversed.

According to the sixth embodiment, it is possible to obtain the same effect as in the fifth embodiment using elements in a number smaller than the fifth embodiment.

Seventh Embodiment

A light emitting device 101*g* according to a seventh embodiment will be described with reference to FIGS. 20 and 21. The seventh embodiment is different from the first embodiment in that a pixel circuit 102*g* is provided in place of the pixel circuit 102*a*, and may be the same in the remaining points. The differences from the first embodiment will mainly be described below.

Figure 20:
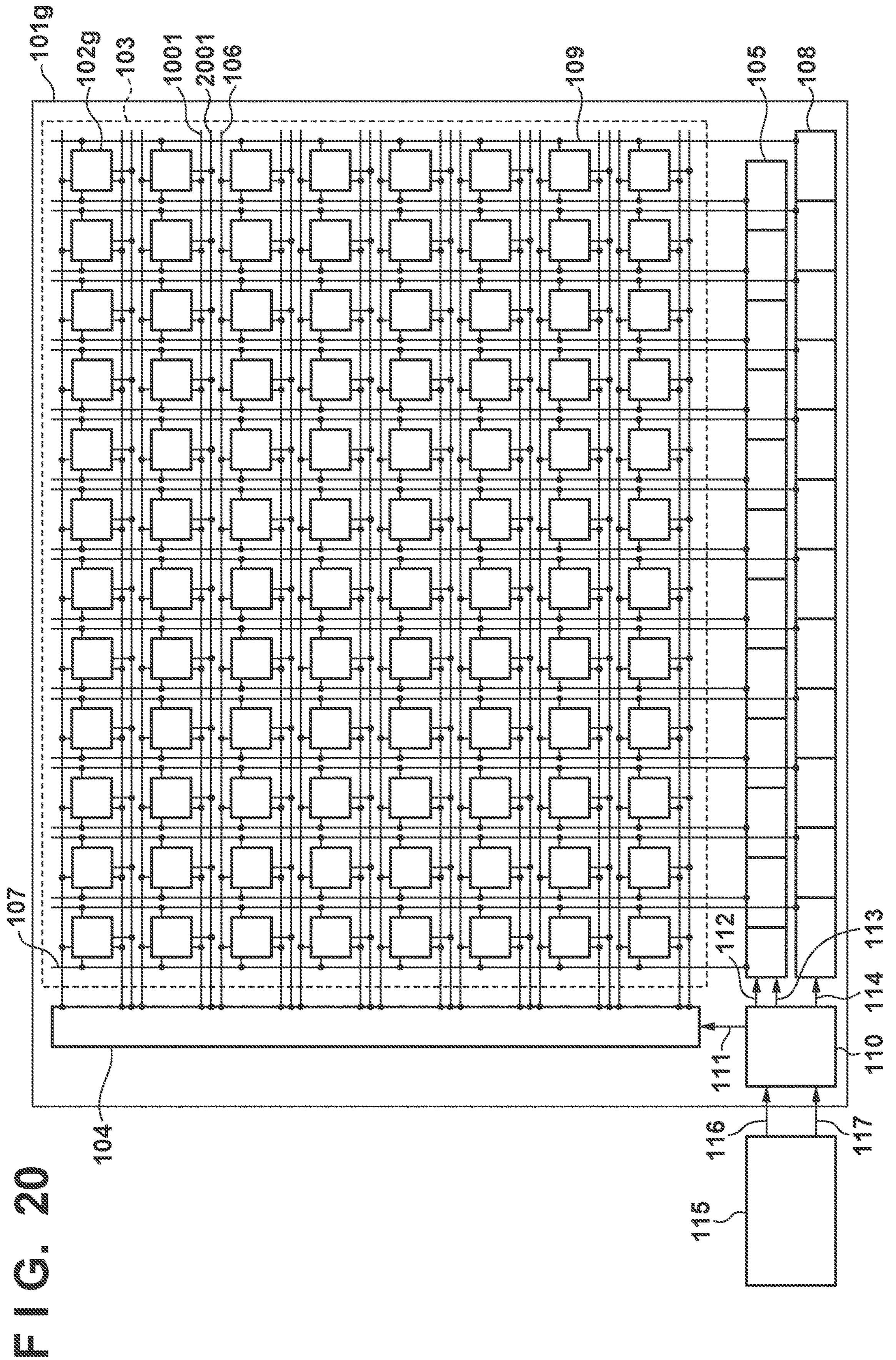
FIG. 20 is a schematic view showing an example of the configuration of a light emitting device according to a seventh embodiment.

FIG. 20 is a schematic view showing the outline of an example of the light emitting device 101*g*. The light emitting device 101*g* further includes a plurality of second row selection lines 1001 each extending in a row direction, and a plurality of third row selection lines 2001 each extending in the row direction. The plurality of second row selection lines 1001 and the plurality of third row selection lines 2001 are connected to a vertical scanning circuit 104. The vertical scanning circuit 104 supplies a first light emission control signal to each second row selection line 1001 in accordance with a vertical scanning control signal 111. Also, the vertical scanning circuit 104 supplies a first reset signal to each third row selection line 2001 in accordance with the vertical scanning control signal 111.

Figure 21:
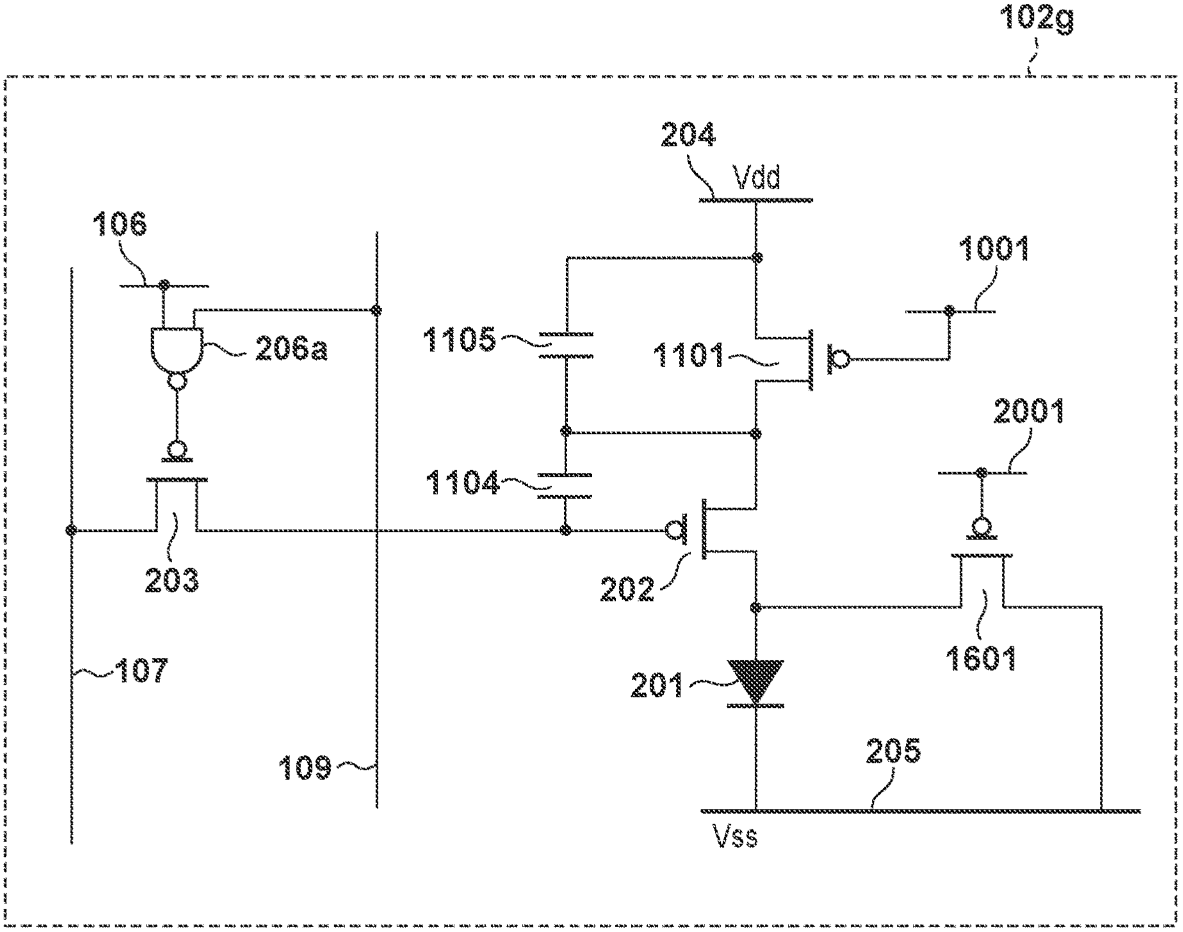
FIG. 21 is an equivalent circuit diagram showing an example of the configuration of a pixel circuit according to the seventh embodiment.

FIG. 21 is a circuit diagram showing an example of the pixel circuit 102*g*. Differences from the pixel circuit 102*a* will mainly be described below. The pixel circuit 102*g* further includes a first capacitive element 1104, a second capacitive element 1105, a light emission control transistor 1101, and a reset transistor 1601. The connection relationship of these circuit elements may be the same as described in the third and fifth embodiments. The vertical scanning circuit 104 supplies a first light emission control signal to the gate of the light emission control transistor 1101 via the second row selection line 1001. Also, the vertical scanning circuit 104 supplies the first reset signal to the gate of the reset transistor 1601 via the third row selection line 2001.

In the seventh embodiment, updating pixel circuits and non-updating pixel circuits are selected by a second write control signal, as in the first embodiment. Additionally, as described in the third and fifth embodiments, during a non-light emission period, the light emission control transistor 1101 is set in a nonconductive state, and the reset transistor 1601 is set in a conductive state, thereby setting the pixel circuit 102*g* in a non-light emission state.

According to the seventh embodiment, it is possible to select updating pixel circuits and non-updating pixel circuits, as in the first embodiment, and select the length of the non-light emission period. When the ratio of the light emission period and the non-light emission period is controlled, an afterimage blur caused by light emission of the pixel circuit 102*g* can be reduced and, particularly, image quality in moving image display can be improved.

In the pixel circuit 102*g*, a light emission control circuit 206*b* according to the second embodiment may be used in place of a light emission control circuit 206*a*. In this case, it is possible to obtain the same effect using a smaller number of elements.

Eighth Embodiment

A light emitting device 101*h* according to an eighth embodiment will be described with reference to FIGS. 22 and 23. The eighth embodiment is different from the third embodiment in that a pixel circuit 102*h* is provided in place of the pixel circuit 102*c*, and may be the same in the remaining points. The differences from the third embodiment will mainly be described below.

Figure 22:
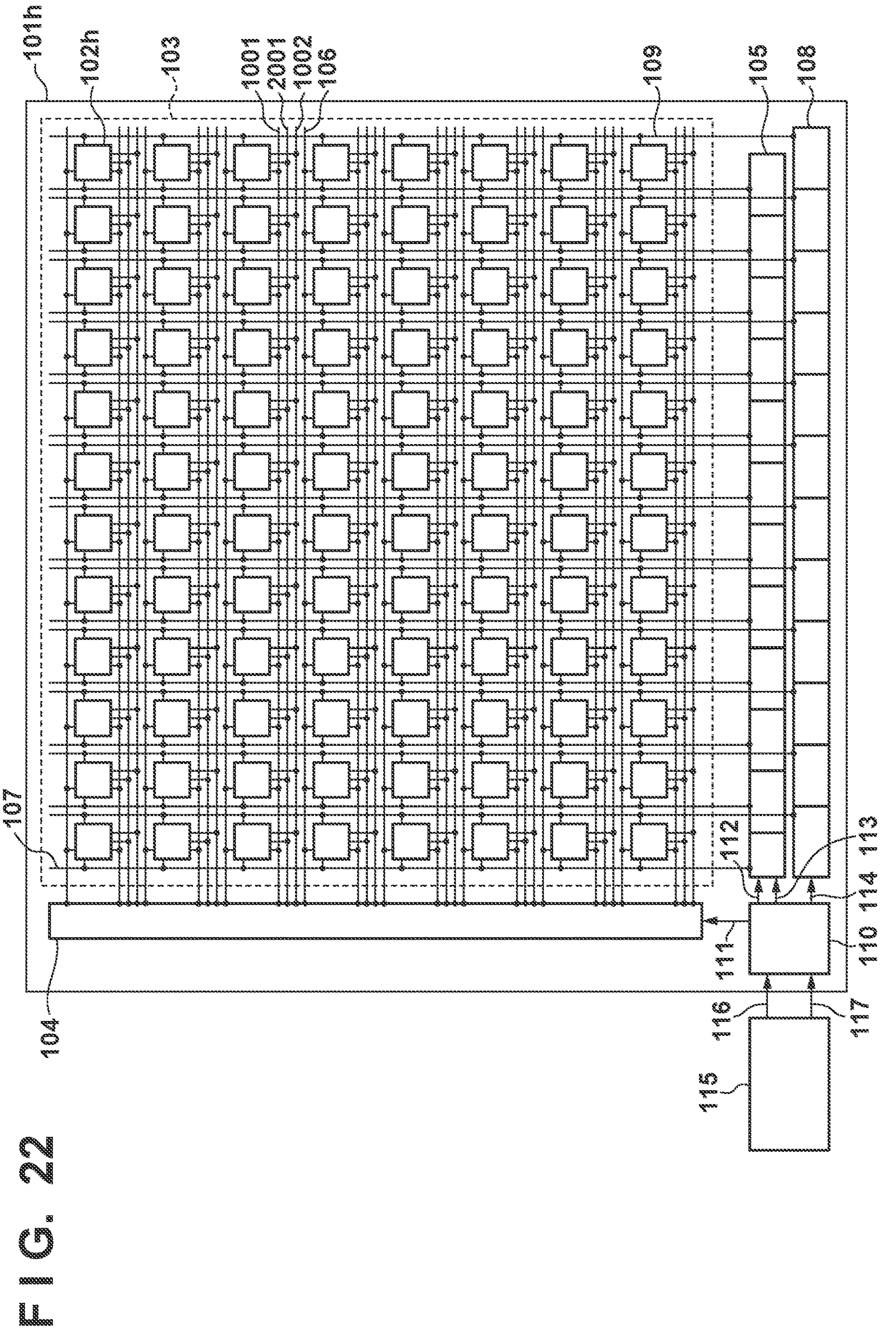
FIG. 22 is a schematic view showing an example of the configuration of a light emitting device according to an eighth embodiment.

FIG. 22 is a schematic view showing the outline of an example of the light emitting device 101*h*. The light emitting device 101*h* further includes a plurality of third row selection lines 2001 each extending in a row direction. The plurality of third row selection lines 2001 are connected to a vertical scanning circuit 104. The vertical scanning circuit 104 supplies a first reset signal to each third row selection line 2001 in accordance with a vertical scanning control signal 111.

Figure 23:
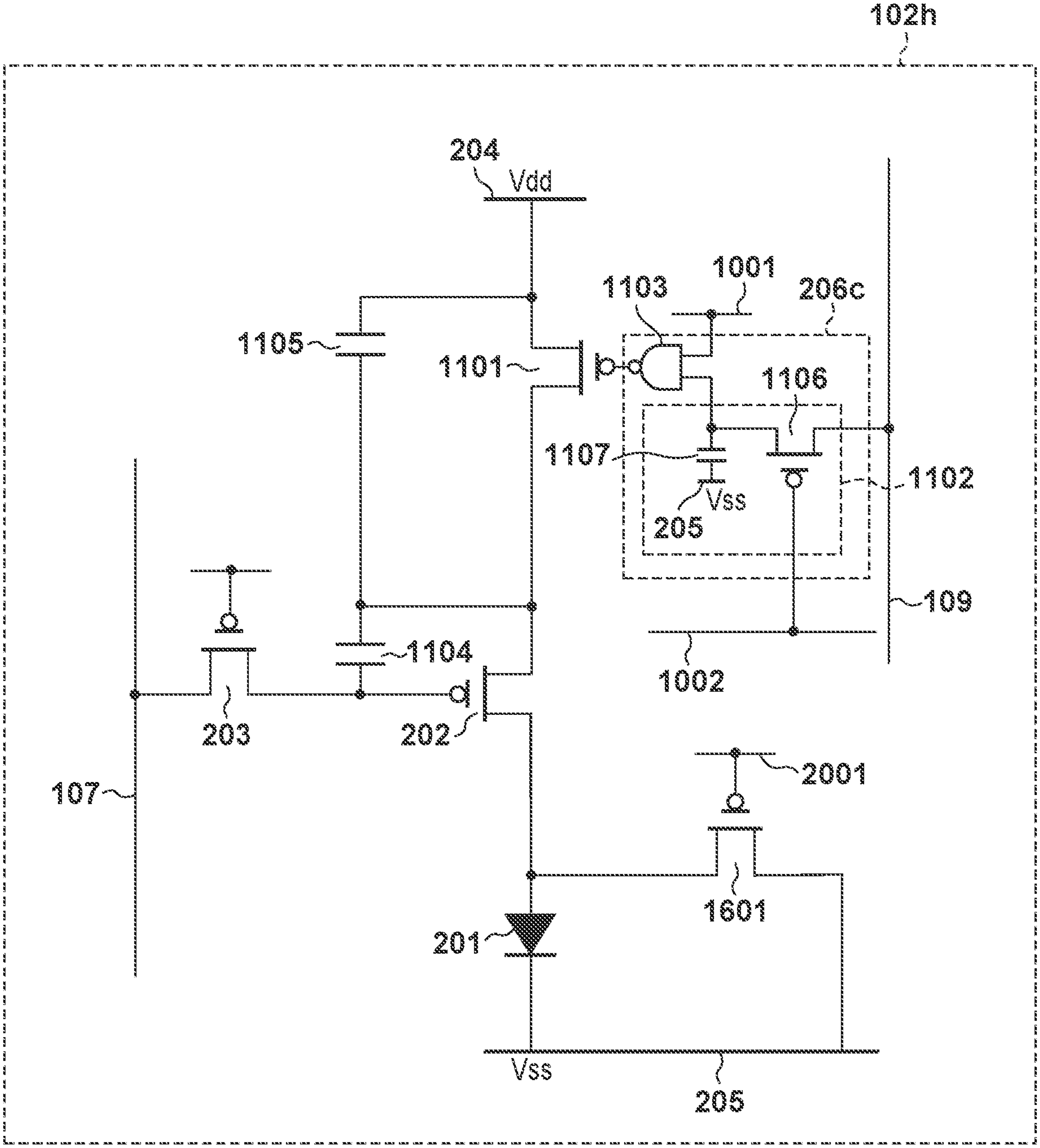
FIG. 23 is an equivalent circuit diagram showing an example of the configuration of a pixel circuit according to the eighth embodiment.

FIG. 23 is a circuit diagram showing an example of the pixel circuit 102*h*. Differences from the pixel circuit 102*c* will mainly be described below. The pixel circuit 102*h* further includes a reset transistor 1601. The connection relationship of these circuit elements may be the same as described in the seventh embodiment. The vertical scanning circuit 104 supplies the first reset signal to the gate of the reset transistor 1601 via the third row selection line 2001.

In the eighth embodiment, light emission pixel circuits and non-light emission pixel circuits are selected by a second light emission control signal, as in the third embodiment. Additionally, as described in the fifth embodiment, during a non-light emission period, the reset transistor 1601 is set in a conductive state, thereby setting the pixel circuit 102*h* in a non-light emission state.

According to the eighth embodiment, it is possible to select light emission pixel circuits and non-light emission pixel circuits, as in the third embodiment. In addition, during the non-light emission period, since the anode of a light emitting element 201 is set at the same potential as a power supply voltage Vss, the brightness in the non-light emission period can be made lower than in the third embodiment. This can implement the light emitting device 101*h* of higher contrast.

In the pixel circuit 102*h*, a light emission control circuit 206*d* according to the fourth embodiment may be used in place of a light emission control circuit 206*c*. In this case, it is possible to obtain the same effect using a smaller number of elements.

Ninth Embodiment

A light emitting device according to a ninth embodiment will be described with reference to FIG. 24. The ninth embodiment is different from the fifth embodiment in that a pixel circuit 102*i* is provided in place of the pixel circuit 102*e*, and may be the same in the remaining points. The differences from the fifth embodiment will mainly be described below. The overall configuration of the light emitting device according to this embodiment may be the same as shown in FIG. 22.

Figure 24:
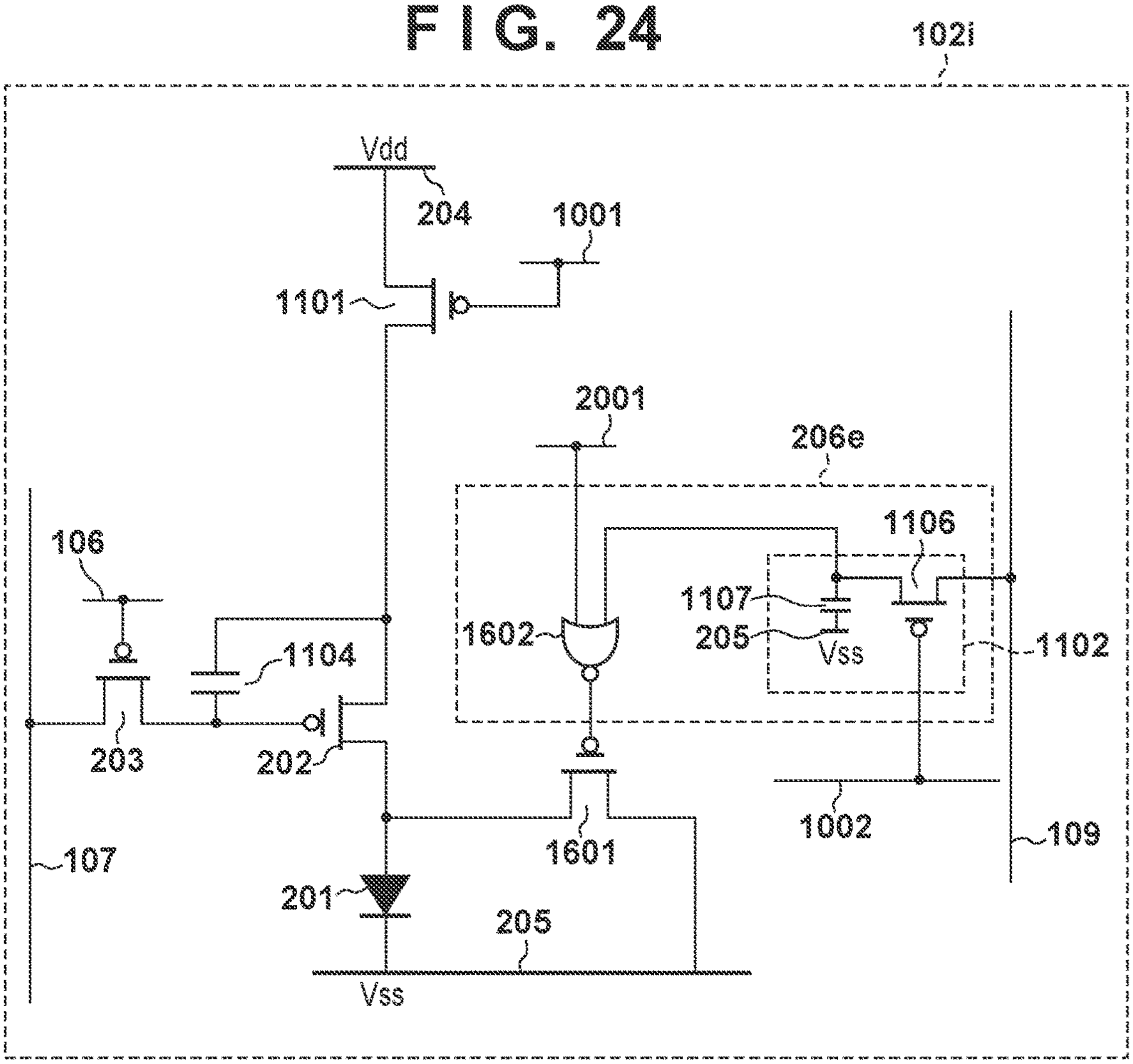
FIG. 24 is an equivalent circuit diagram showing an example of the configuration of a pixel circuit according to a ninth embodiment.

FIG. 24 is a circuit diagram showing an example of the pixel circuit 102*i*. The pixel circuit 102*i* is different from the pixel circuit 102*e* in that a light emission control transistor 1101 is further provided, and may be the same in the remaining points. A second row selection line 1001 is connected to the gate of the light emission control transistor 1101. A third row selection line 2001 is connected to the gate of a reset transistor 1601.

In the ninth embodiment, light emission pixel circuits and non-light emission pixel circuits are selected by a first reset signal, as in the fifth embodiment. Additionally, as described in the third embodiment, during a non-light emission period, the light emission control transistor 1101 is set in a nonconductive state, thereby setting the pixel circuit 102*i* in a non-light emission state.

According to the ninth embodiment, it is possible to select light emission pixel circuits and non-light emission pixel circuits, as in the fifth embodiment. In addition, the length of the non-light emission period can be controlled by the light emission control transistor 1101. Hence, as compared to the fifth embodiment, since no current flows to a drive transistor 202 during the non-light emission period, power consumption can be reduced.

10th Embodiment

A light emitting device 101*j* according to a 10th embodiment will be described with reference to FIGS. 25 to 27. The 10th embodiment is different from the first embodiment in that the light emitting device 101*j* is formed by two substrates that are stacked on each other, and may be the same in the remaining points. The differences from the first embodiment will mainly be described below.

Figure 25:
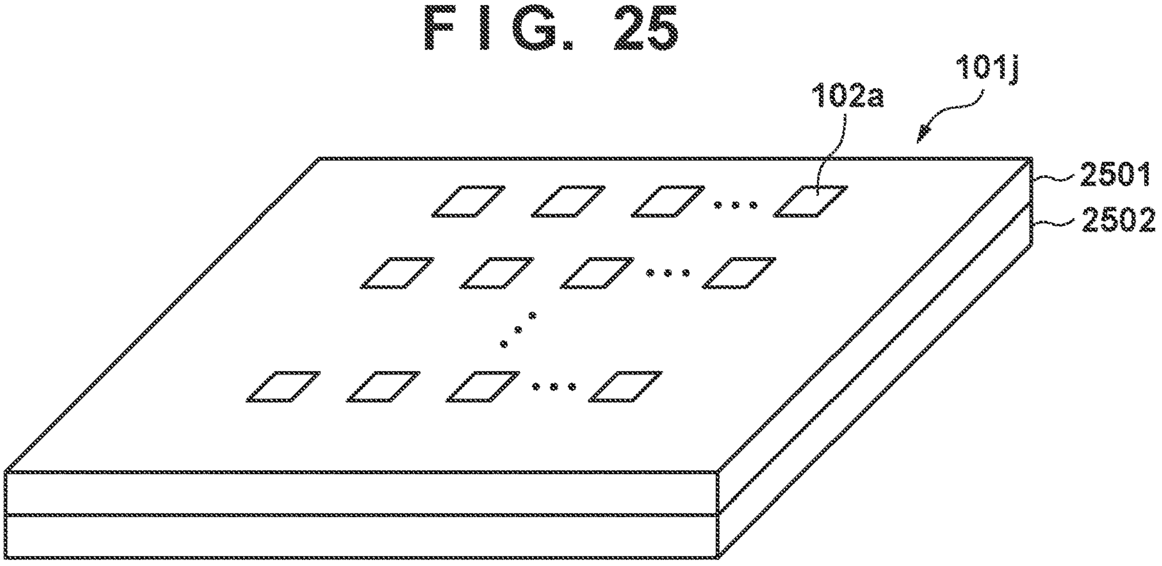
FIG. 25 is a schematic view showing an example of the outer appearance of a light emitting device according to a 10th embodiment.

FIG. 25 is a schematic view showing the outer appearance of an example of the light emitting device 101*j*. The light emitting device 101*j* is formed by a first substrate 2501 and a second substrate 2502, which are stacked on each other. The first substrate 2501 and the second substrate 2502 are electrically connected to each other. The first substrate 2501 is located on the light emitting side (the upper side in FIG. 25) of the light emitting device 101*j*.

Figure 26:
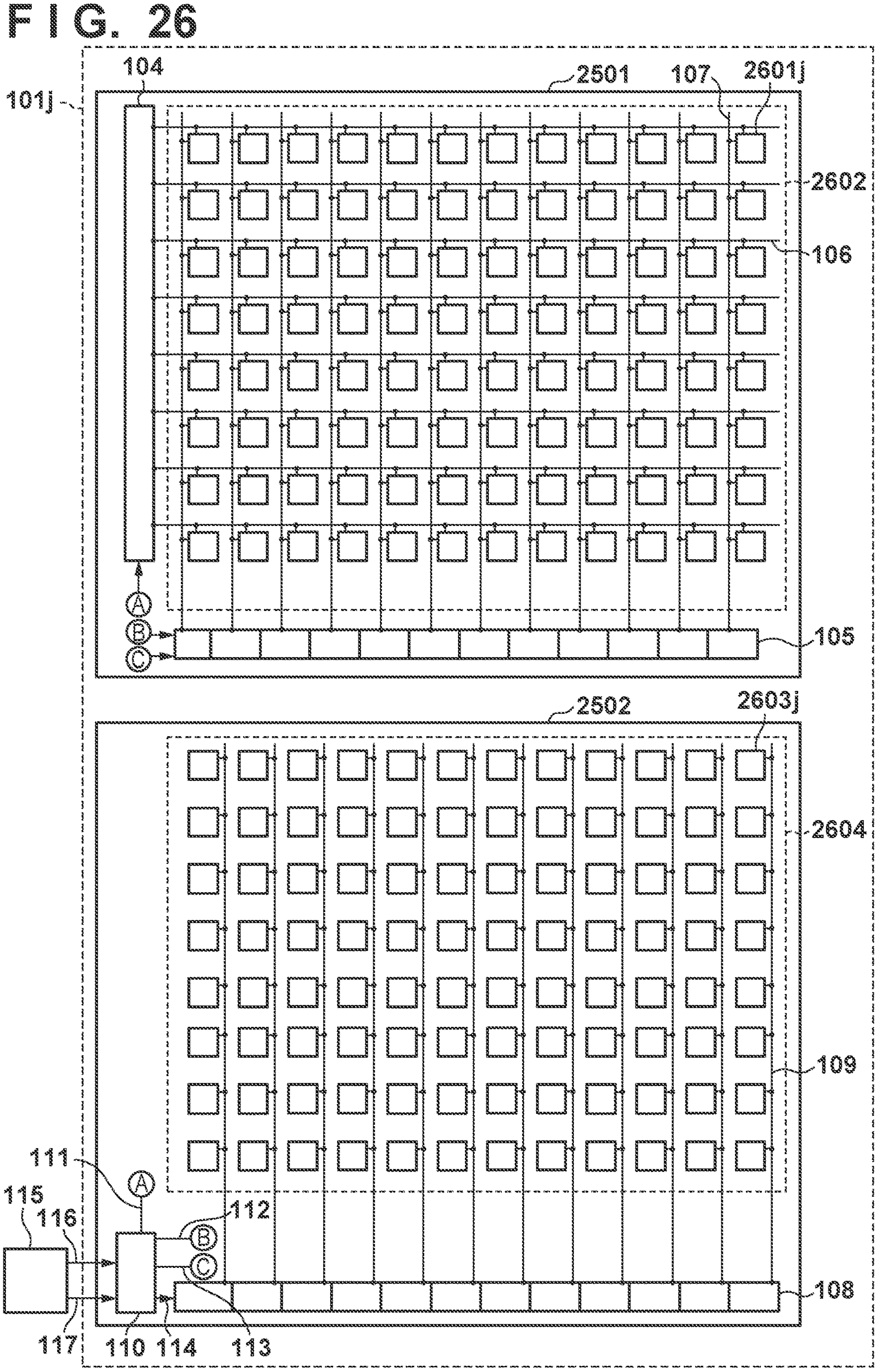
FIG. 26 is a schematic view showing an example of the configuration of the light emitting device according to the 10th embodiment.

FIG. 26 is a schematic view showing the outline of an example of the light emitting device 101*j*. As shown in FIG. 26, the light emitting device 101*j* includes constituent elements similar to the light emitting device 101*a*, and the constituent elements are distributed to the first substrate 2501 and the second substrate 2502. More specifically, a vertical scanning circuit 104, a signal output circuit 105, a plurality of first row selection lines 106, and a plurality of signal lines 107 are formed on the first substrate 2501. A column control circuit 108, a control circuit 110, and a plurality of column selection lines 109 are formed on the second substrate 2502.

A pixel circuit 102*a* is formed by a first partial pixel circuit 2601*j* formed on the first substrate 2501 and a second partial pixel circuit 2603*j* formed on the second substrate 2502. A first partial pixel array 2602 is formed by a plurality of first partial pixel circuits 2601*j*. A second partial pixel array 2604 is formed by a plurality of second partial pixel circuits 2603*j*. Also, as indicated by circled alphabets in FIG. 26, wirings of the first substrate 2501 and wirings of the second substrate 2502 are connected to each other via inter-substrate connection. In subsequent drawings as well, a circled alphabet indicates inter-substrate connection.

Figure 27:
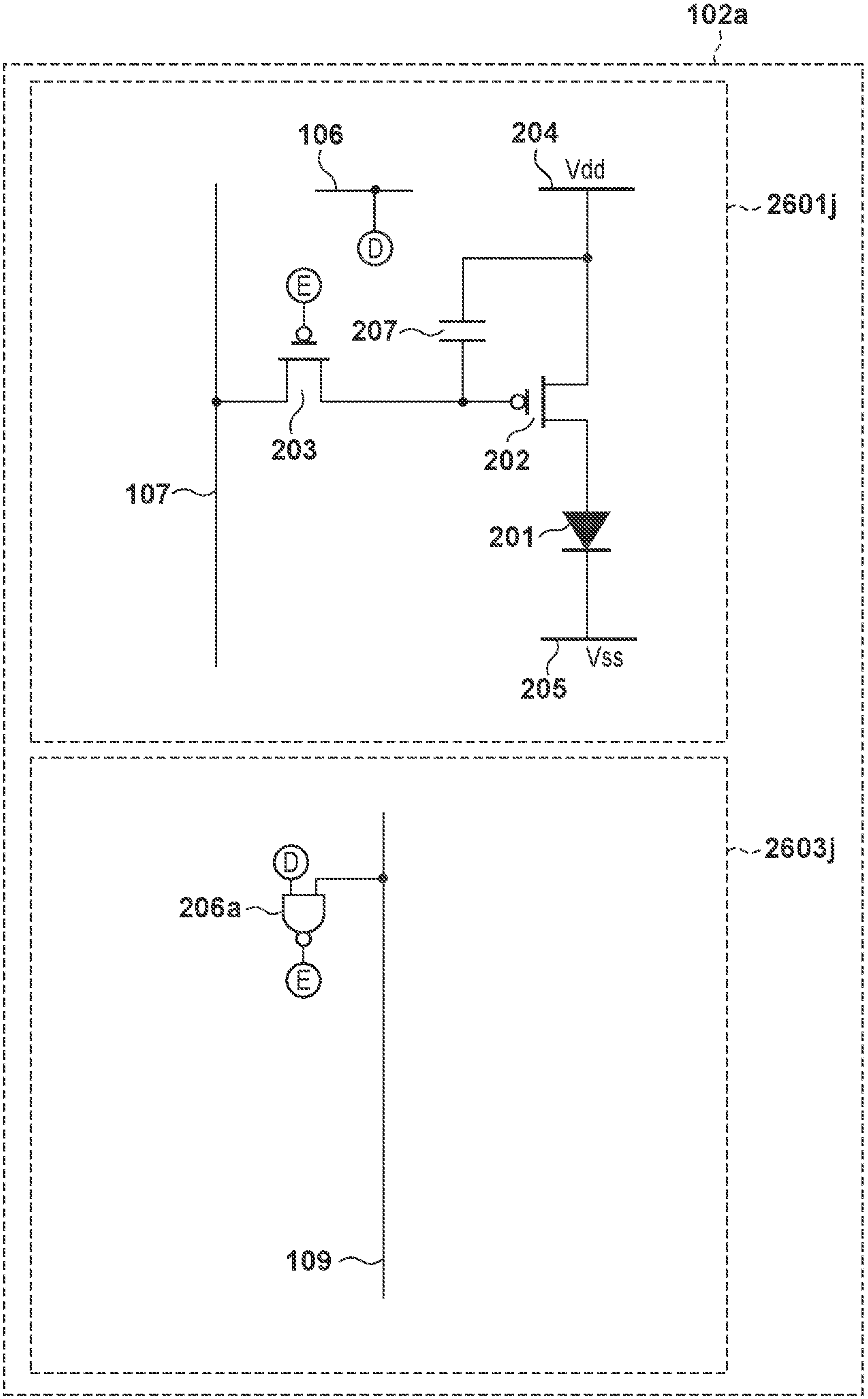
FIG. 27 is an equivalent circuit diagram showing an example of the configuration of a pixel circuit according to the 10th embodiment.

FIG. 27 shows an example of the distribution of the circuit elements of the pixel circuit 102*a*. The second partial pixel circuit 2603*j* formed on the second substrate 2502 includes a light emission control circuit 206*a*, and the first partial pixel circuit 2601*j* formed on the first substrate 2501 includes a circuit component (for example, a light emitting element 201) other than that. In this embodiment, the first row selection lines 106 and the vertical scanning circuit 104 are formed on the first substrate 2501. Instead, the first row selection lines 106 and the vertical scanning circuit 104 may be formed on the second substrate 2502.

According to the 10th embodiment, some circuit elements of the pixel circuit are formed on the second substrate 2502. For this reason, as compared to the first embodiment, the size of the pixel circuit in a planar view can be reduced, and the size of each element in the pixel circuit can be increased.

11th Embodiment

A light emitting device according to an 11th embodiment will be described with reference to FIG. 28. The 11th embodiment is different from the second embodiment in that the light emitting device is formed by two substrates that are stacked on each other, as in the 10th embodiment, and may be the same in the remaining points. The differences from the second and 10th embodiments will mainly be described below.

Figure 28:
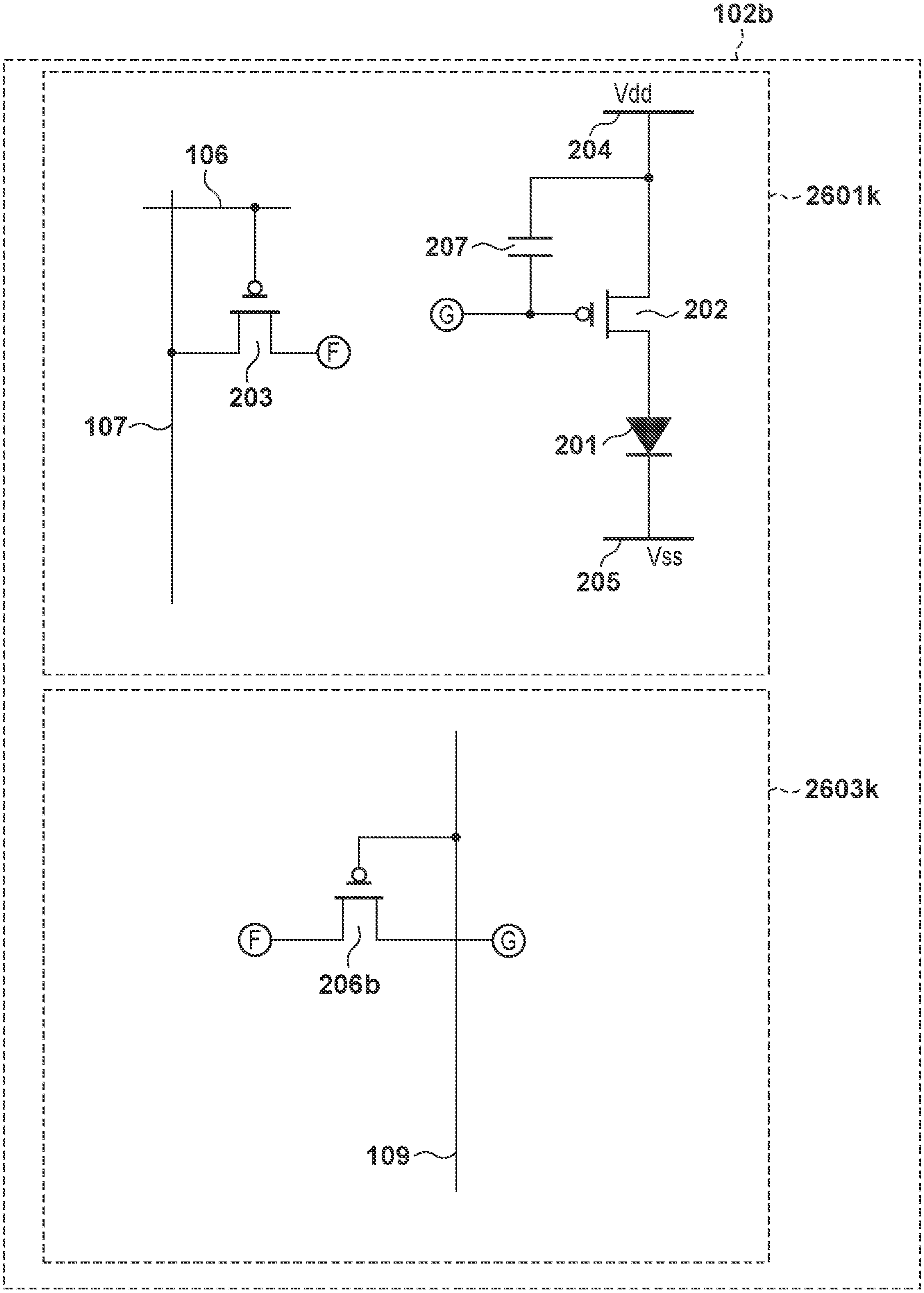
FIG. 28 is an equivalent circuit diagram showing an example of the configuration of a pixel circuit according to an 11th embodiment.

FIG. 28 shows an example of the distribution of the circuit elements of a pixel circuit 102*b*. A second partial pixel circuit 2603*k* formed on a second substrate 2502 includes a light emission control circuit 206*b*, and a first partial pixel circuit 2601*k* formed on a first substrate 2501 includes a circuit component other than that. In this embodiment, first row selection lines 106 and a vertical scanning circuit 104 are formed on the first substrate 2501. Instead, the first row selection lines 106 and the vertical scanning circuit 104 may be formed on the second substrate 2502.

According to the 11th embodiment, some circuit elements of the pixel circuit are formed on the second substrate 2502. For this reason, as compared to the second embodiment, the size of the pixel circuit in a planar view can be reduced, and the size of each element in the pixel circuit can be increased.

12th Embodiment

A light emitting device 101*l* according to the 12th embodiment will be described with reference to FIGS. 29 and 30. The 12th embodiment is different from the third embodiment in that the light emitting device is formed by two substrates that are stacked on each other, as in the 10th embodiment, and may be the same in the remaining points. The differences from the third and 10th embodiments will mainly be described below.

Figure 29:
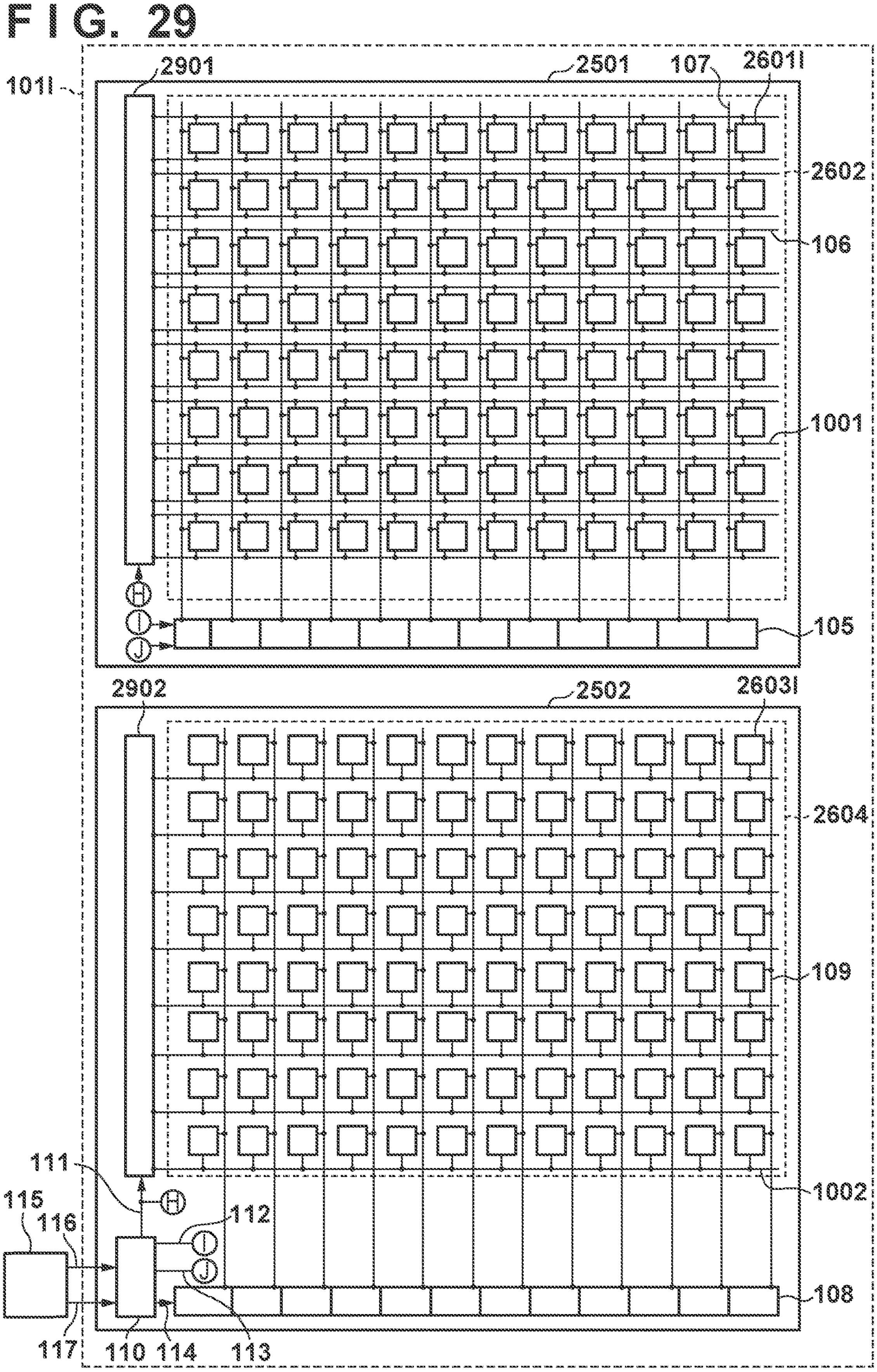
FIG. 29 is a schematic view showing an example of the configuration of a light emitting device according to a 12th embodiment.

FIG. 29 is a schematic view showing the outline of an example of the light emitting device 101*l*. As shown in FIG. 29, the light emitting device 101*l* includes constituent elements similar to the light emitting device 101*c*, and the constituent elements are distributed to a first substrate 2501 and a second substrate 2502. More specifically, a signal output circuit 105, a plurality of first row selection lines 106, a plurality of signal lines 107, and a plurality of second row selection lines 1001 are formed on the first substrate 2501. A column control circuit 108, a control circuit 110, a plurality of column selection lines 109, and a plurality of row control lines 1002 are formed on the second substrate 2502. A vertical scanning circuit 104 according to the 12th embodiment is formed by a first partial vertical scanning circuit 2901 formed on the first substrate 2501, and a second partial vertical scanning circuit 2902 formed on the second substrate 2502.

A pixel circuit 102*c* is formed by a first partial pixel circuit 2601*l* formed on the first substrate 2501 and a second partial pixel circuit 2603*l* formed on the second substrate 2502.

Figure 30:
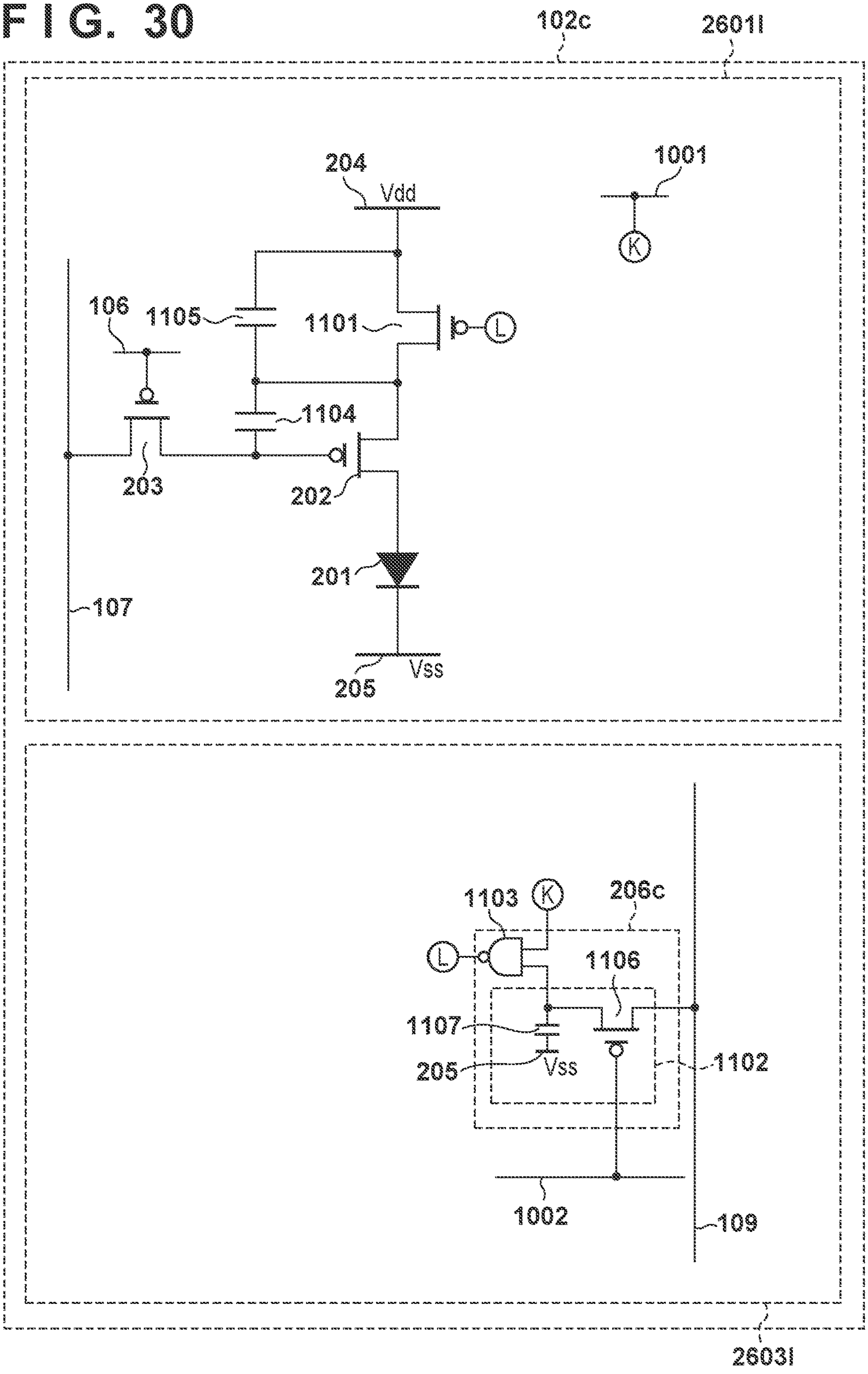
FIG. 30 is an equivalent circuit diagram showing an example of the configuration of a pixel circuit according to the 12th embodiment.

FIG. 30 shows an example of the distribution of the circuit elements of the pixel circuit 102*c*. The second partial pixel circuit 2603*l* formed on the second substrate 2502 includes a light emission control circuit 206*c*, and the first partial pixel circuit 2601*l* formed on the first substrate 2501 includes a circuit component other than that. In this embodiment, the row control lines 1002 are formed on the first substrate 2501. Instead, the row control lines 1002 may be formed on the second substrate 2502.

According to the 12th embodiment, some circuit elements of the pixel circuit are formed on the second substrate 2502. For this reason, as compared to the third embodiment, the size of the pixel circuit in a planar view can be reduced, and the size of each element in the pixel circuit can be increased.

13th Embodiment

A light emitting device according to a 13th embodiment will be described with reference to FIG. 31. The 13th embodiment is different from the fourth embodiment in that the light emitting device is formed by two substrates that are stacked on each other, as in the 10th embodiment, and may be the same in the remaining points. The differences from the fourth and 10th embodiments will mainly be described below.

Figure 31:
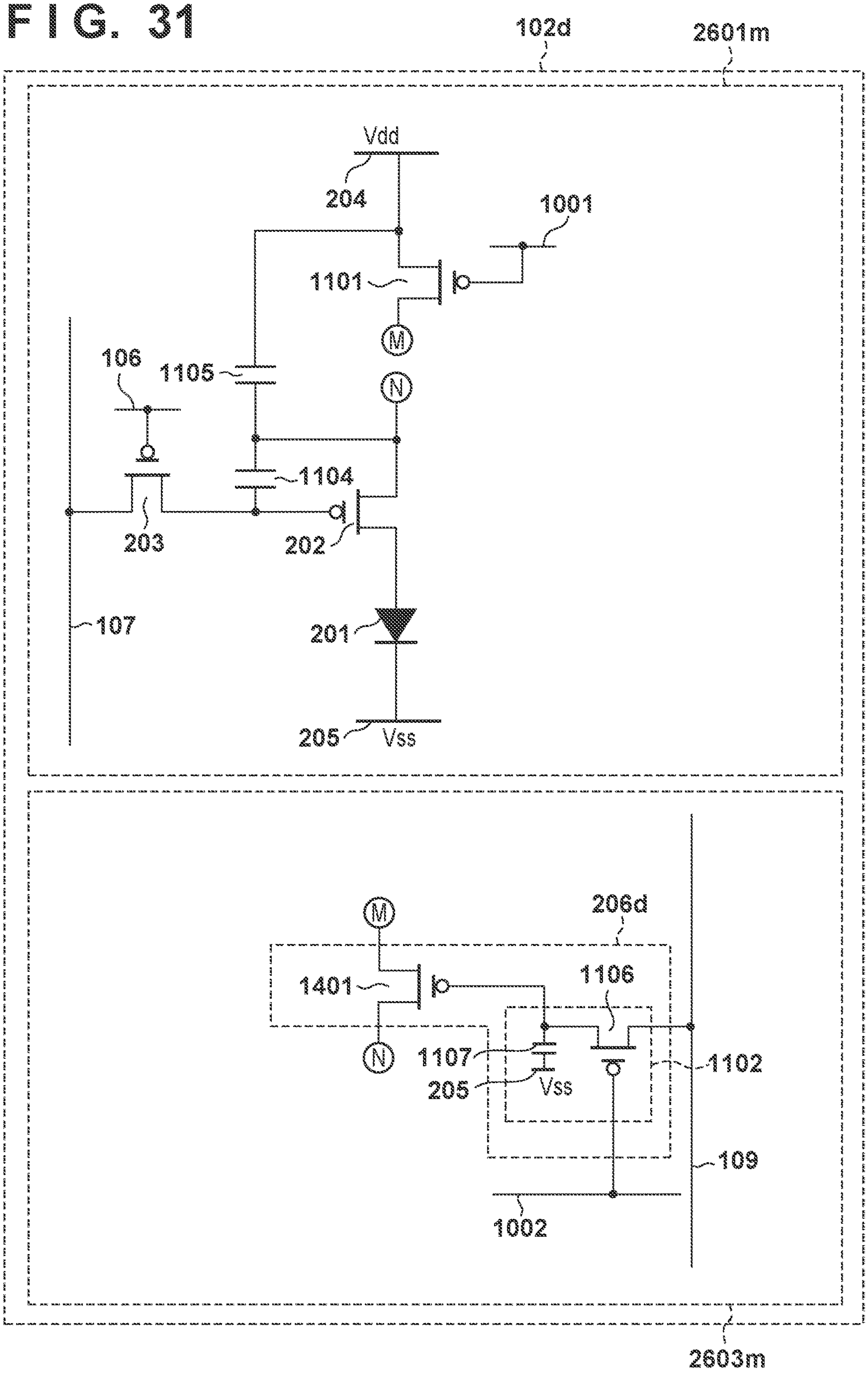
FIG. 31 is an equivalent circuit diagram showing an example of the configuration of a pixel circuit according to a 13th embodiment.

FIG. 31 shows an example of the distribution of the circuit elements of a pixel circuit 102*d*. A second partial pixel circuit 2603*m* formed on a second substrate 2502 includes a light emission control circuit 206*d*, and a first partial pixel circuit 2601*m* formed on a first substrate 2501 includes a circuit component other than that. The light emission control circuit 206*d* may be distributively formed on the first substrate 2501 and the second substrate 2502. For example, a p-type transistor 1401 of the light emission control circuit 206*d* may be formed on the first substrate 2501, and a circuit element (for example, a memory cell 1102) other than that may be formed on the second substrate 2502.

According to the 13th embodiment, some circuit elements of the pixel circuit are formed on the second substrate 2502. For this reason, as compared to the fourth embodiment, the size of the pixel circuit in a planar view can be reduced, and the size of each element in the pixel circuit can be increased.

14th Embodiment

A light emitting device according to a 14th embodiment will be described with reference to FIG. 32. The 14th embodiment is different from the fifth embodiment in that the light emitting device is formed by two substrates that are stacked on each other, as in the 10th embodiment, and may be the same in the remaining points. The differences from the fifth and 10th embodiments will mainly be described below.

Figure 32:
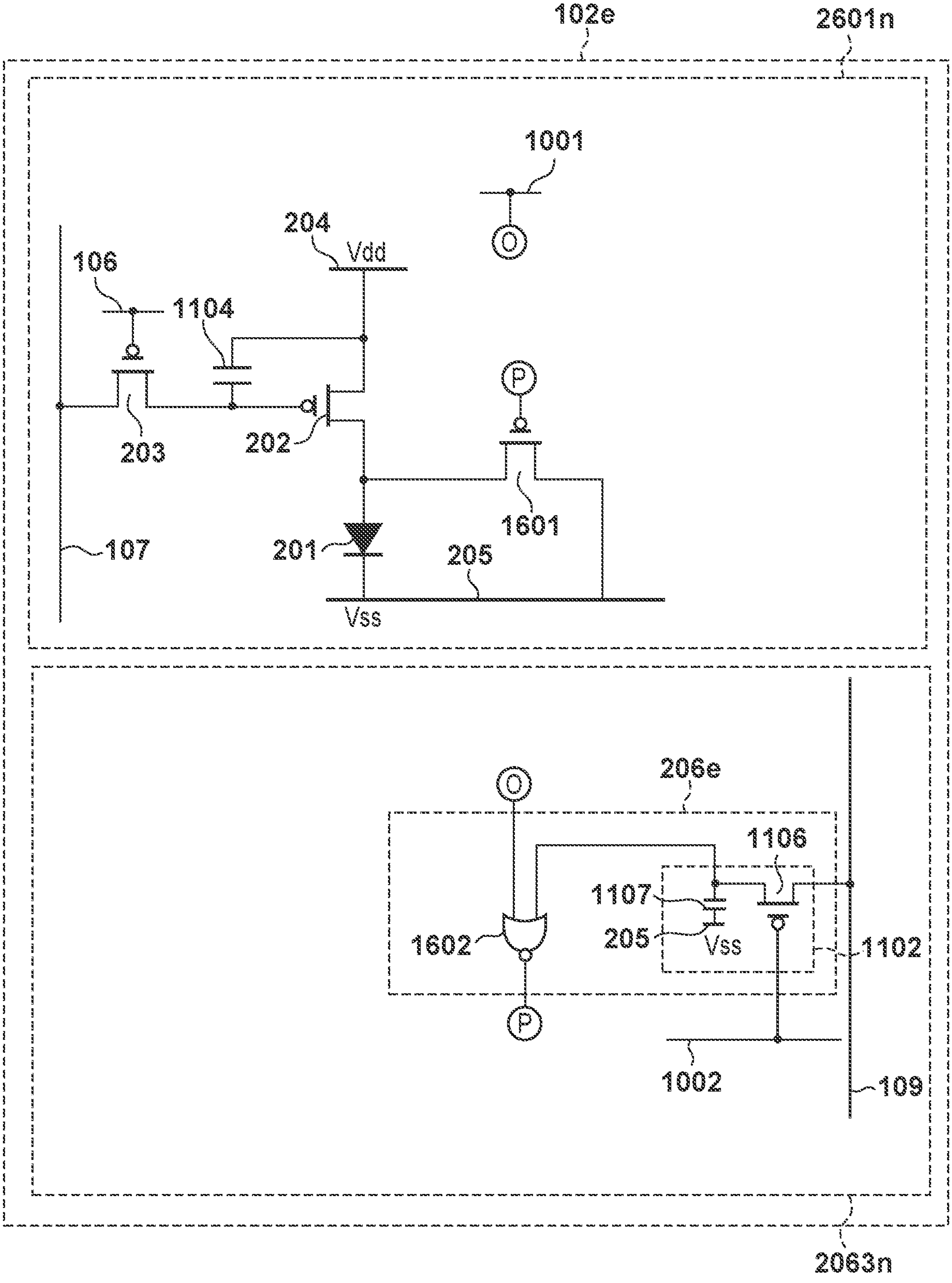
FIG. 32 is an equivalent circuit diagram showing an example of the configuration of a pixel circuit according to a 14th embodiment.

FIG. 32 shows an example of the distribution of the circuit elements of a pixel circuit 102*e*. A second partial pixel circuit 2603*n* formed on a second substrate 2502 includes a light emission control circuit 206*e*, and a first partial pixel circuit 2601*n* formed on a first substrate 2501 includes a circuit component other than that. The light emission control circuit 206*e* may be distributively formed on the first substrate 2501 and the second substrate. For example, a logic circuit 1602 of the light emission control circuit 206*e* may be formed on the first substrate 2501, and a circuit element other than that may be formed on the second substrate 2502. In this embodiment, second row selection lines 1001 are formed on the first substrate 2501. Instead, the second row selection lines 1001 may be formed on the second substrate 2502.

According to the 14th embodiment, some circuit elements of the pixel circuit are formed on the second substrate 2502. For this reason, as compared to the fifth embodiment, the size of the pixel circuit in a planar view can be reduced, and the size of each element in the pixel circuit can be increased.

15th Embodiment

A light emitting device according to a 15th embodiment will be described with reference to FIG. 33. The 15th embodiment is different from the sixth embodiment in that the light emitting device is formed by two substrates that are stacked on each other, as in the 10th embodiment, and may be the same in the remaining points. The differences from the sixth and 10th embodiments will mainly be described below.

Figure 33:
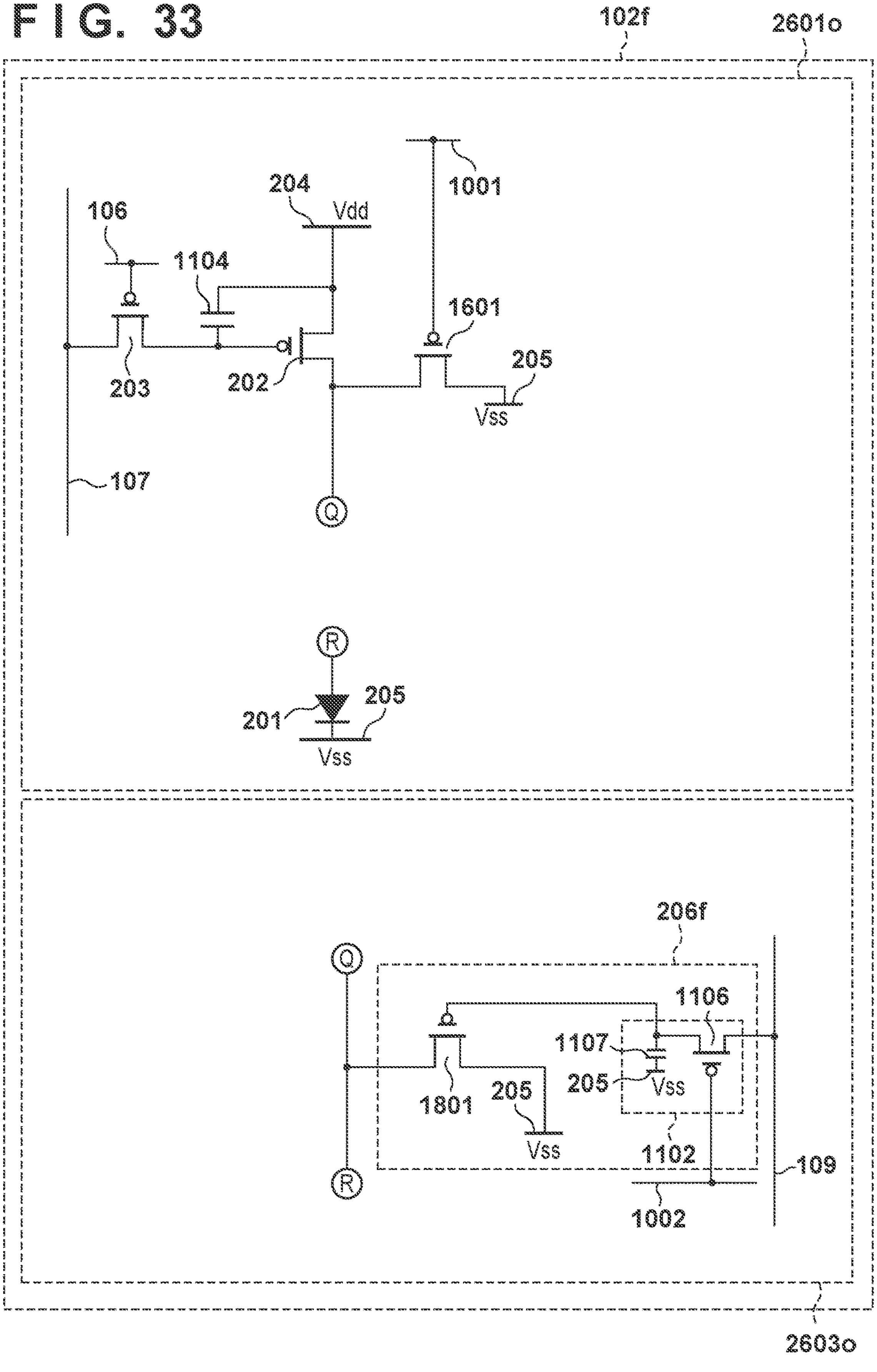
FIG. 33 is an equivalent circuit diagram showing an example of the configuration of a pixel circuit according to a 15th embodiment.

FIG. 33 shows an example of the distribution of the circuit elements of a pixel circuit 102*f*. A second partial pixel circuit 2603*o* formed on a second substrate 2502 includes a light emission control circuit 206*f*, and a first partial pixel circuit 2601*o* formed on a first substrate 2501 includes a circuit component other than that. The light emission control circuit 206*f* may be distributively formed on the first substrate 2501 and the second substrate. For example, a p-type transistor 1801 of the light emission control circuit 206*f* may be formed on the first substrate 2501, and a circuit element (for example, a memory cell 1102) other than that may be formed on the second substrate 2502. In this embodiment, second row selection lines 1001 are formed on the first substrate 2501. Instead, the second row selection lines 1001 may be formed on the second substrate 2502.

According to the 15th embodiment, some circuit elements of the pixel circuit are formed on the second substrate 2502. For this reason, as compared to the sixth embodiment, the size of the pixel circuit in a planar view can be reduced, and the size of each element in the pixel circuit can be increased.

16th Embodiment

A light emitting device 101*p* according to a 16th embodiment will be described with reference to FIG. 34. The 16th embodiment is different from the seventh embodiment in that the light emitting device is formed by two substrates that are stacked on each other, as in the 10th embodiment, and may be the same in the remaining points. The differences from the seventh and 10th embodiments will mainly be described below.

Figure 34:
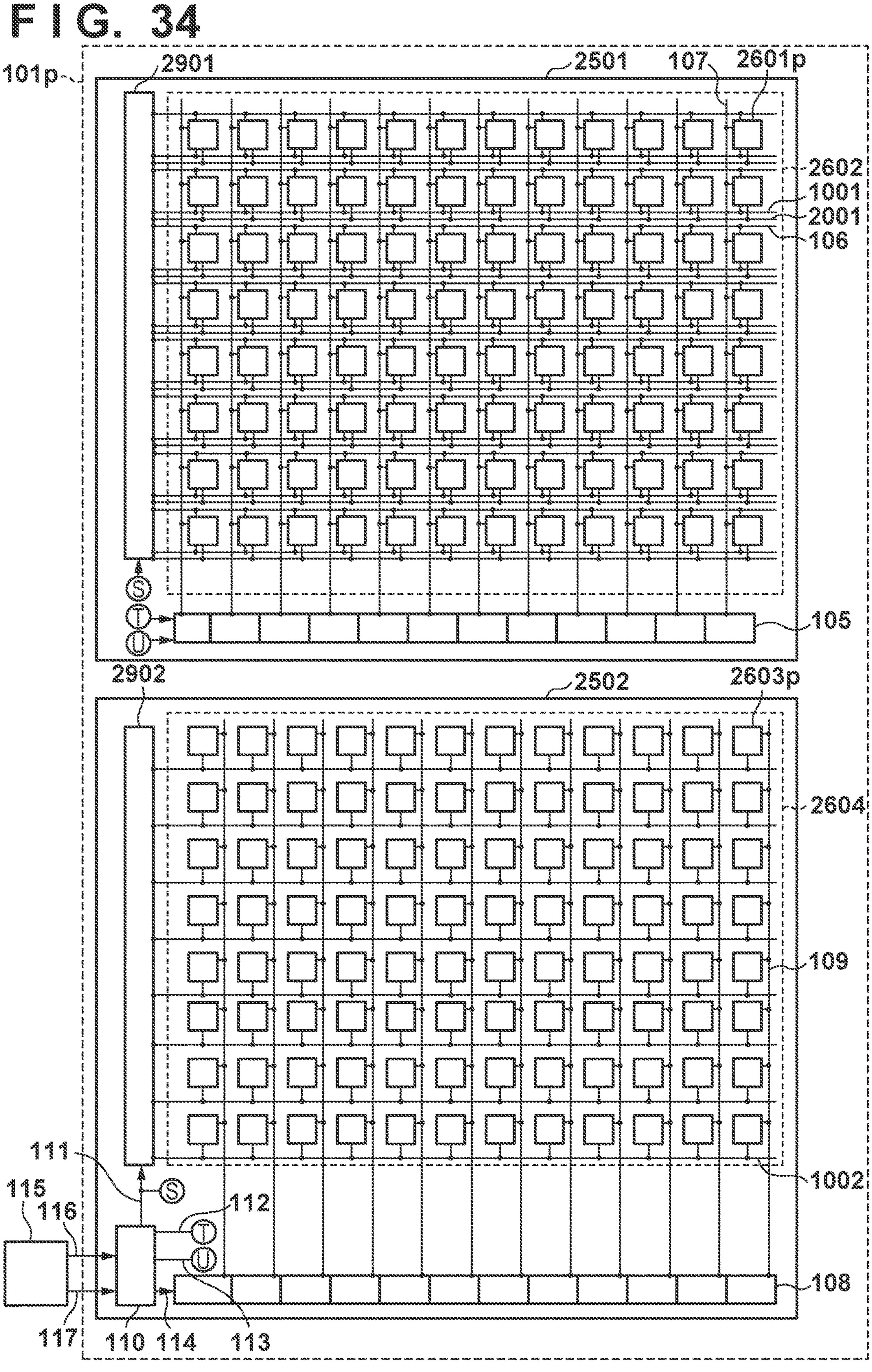
FIG. 34 is a schematic view showing an example of the configuration of a light emitting device according to a 16th embodiment.

FIG. 34 is a schematic view showing the outline of an example of the light emitting device 101*p*. As shown in FIG. 34, the light emitting device 101*p* includes constituent elements similar to the light emitting device 101*g*, and the constituent elements are distributed to a first substrate 2501 and a second substrate 2502. More specifically, a signal output circuit 105, a plurality of first row selection lines 106, a plurality of signal lines 107, a plurality of second row selection lines 1001, and a plurality of third row selection lines 2001 are formed on the first substrate 2501. A column control circuit 108, a control circuit 110, a plurality of column selection lines 109, and a plurality of row control lines 1002 are formed on the second substrate 2502. A vertical scanning circuit 104 according to the 16th embodiment is formed by a first partial vertical scanning circuit 2901 formed on the first substrate 2501, and a second partial vertical scanning circuit 2902 formed on the second substrate 2502.

A pixel circuit 102*g* is formed by a first partial pixel circuit 2601*p* formed on the first substrate 2501 and a second partial pixel circuit 2603*p* formed on the second substrate 2502. The seventh embodiment has a configuration obtained by combining the first, third, and fifth embodiments. For this reason, in the 16th embodiment as well, the circuit elements of the pixel circuit 102*g* may be distributed to the first partial pixel circuit 2601*p* and the second partial pixel circuit 2603*p*, like the combination of the 10th, 12th, and 14th embodiments.

According to the 16th embodiment, some circuit elements of the pixel circuit are formed on the second substrate 2502. For this reason, as compared to the seventh embodiment, the size of the pixel circuit in a planar view can be reduced, and the size of each element in the pixel circuit can be increased.

17th Embodiment

A light emitting device according to a 17th embodiment will be described. The 17th embodiment is different from the eighth embodiment in that the light emitting device is formed by two substrates that are stacked on each other, as in the 10th embodiment, and may be the same in the remaining points. The differences from the eighth and 10th embodiments will mainly be described below.

The eighth embodiment has a configuration obtained by combining the third and seventh embodiments. For this reason, in the 17th embodiment as well, the circuit elements of a pixel circuit may be distributed to a first partial pixel circuit and a second partial pixel circuit, like the combination of the 12th and 16th embodiments.

According to the 17th embodiment, some circuit elements of the pixel circuit are formed on a second substrate 2502. For this reason, as compared to the eighth embodiment, the size of the pixel circuit in a planar view can be reduced, and the size of each element in the pixel circuit can be increased.

18th Embodiment

A light emitting device according to an 18th embodiment will be described. The 18th embodiment is different from the ninth embodiment in that the light emitting device is formed by two substrates that are stacked on each other, as in the 10th embodiment, and may be the same in the remaining points. The differences from the ninth and 10th embodiments will mainly be described below.

The ninth embodiment has a configuration obtained by combining the third and fifth embodiments. For this reason, in the 18th embodiment as well, the circuit elements of a pixel circuit may be distributed to a first partial pixel circuit and a second partial pixel circuit, like the combination of the 12th and 14th embodiments.

According to the 18th embodiment, some circuit elements of the pixel circuit are formed on a second substrate 2502. For this reason, as compared to the ninth embodiment, the size of the pixel circuit in a planar view can be reduced, and the size of each element in the pixel circuit can be increased.

Other Embodiments

An example of application of the light emitting device according to each of the above-described embodiments will be described below. A display device or a display unit used in the following embodiment may include a light emitting device according to any of the above-described embodiments.

Figure 35:
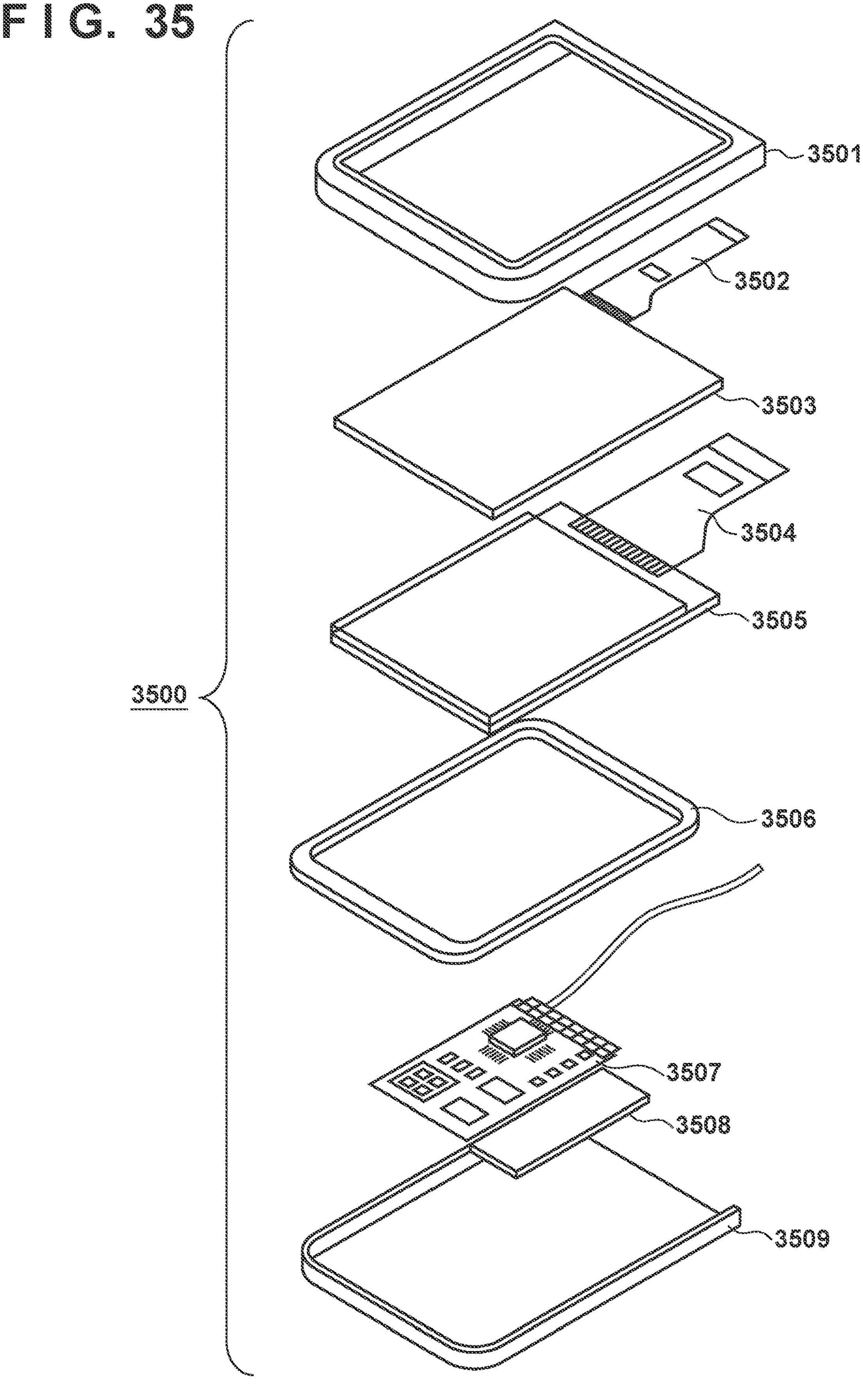
FIG. 35 is a schematic view showing an example of a display device according to an embodiment.

FIG. 35 is a schematic view showing an example of a display device according to this embodiment. A display device 3500 may include, between an upper cover 3501 and a lower cover 3509, a touch panel 3503, a display panel 3505, a frame 3506, a circuit board 3507, and a battery 3508. Flexible printed circuits FPC 3502 and 3504 are connected to the touch panel 3503 and the display panel 3505, respectively. A transistor is printed on the circuit board 3507. If the display device is not a portable device, the battery 3508 may not be provided. Even if so, the battery 3508 may be provided at another position.

The display device according to this embodiment can include color filters of red, green, and blue. The color filters of red, green, and blue can be arranged in a delta array.

The display device according to this embodiment can also be used for a display unit of a portable terminal. At this time, the display unit can have both a display function and an operation function. Examples of the portable terminal are a portable phone such as a smartphone, a tablet, and a head mounted display.

The display device according to this embodiment can be used for a display unit of an image capturing device including an optical unit having a plurality of lenses, and an image capturing element for receiving light having passed through the optical unit. The image capturing device can include a display unit for displaying information acquired by the image capturing element. In addition, the display unit can be either a display unit exposed outside the image capturing device, or a display unit arranged in the finder. The image capturing device can be a digital camera or a digital video camera.

Figure 36A:
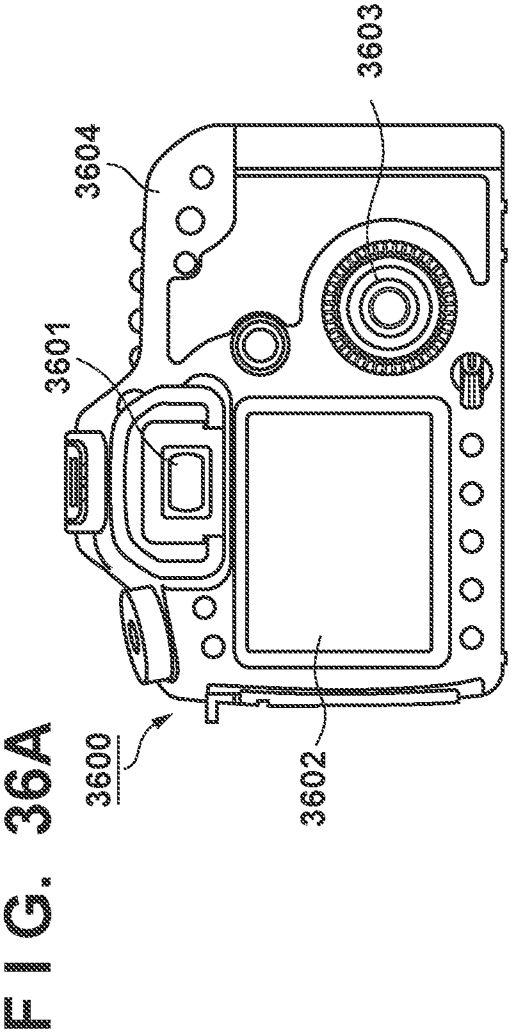
FIG. 36A is a schematic view showing an example of an image capturing device according to an embodiment.

FIG. 36A is a schematic view showing an example of the image capturing device according to this embodiment. An image capturing device 3600 can include a viewfinder 3601, a rear display 3602, an operation unit 3603, and a housing 3604. The viewfinder 3601 can include the display device. In this case, the display device can display not only an image to be captured but also environment information, image capturing instructions, and the like. Examples of the environment information are the intensity and direction of external light, the moving velocity of an object, and the possibility that an object is covered with an obstacle.

The timing suitable for image capturing is a very short time, so the information is preferably displayed as soon as possible. Therefore, the display device using an organic light emitting element may be used. This is so because the organic light emitting element has a high response speed. The display device using the organic light emitting element can be used for the apparatuses that require a high display speed more advantageously than for the liquid crystal display device.

The image capturing device 3600 includes an optical unit (not shown). This optical unit has a plurality of lenses, and forms an image on an image capturing element that is accommodated in the housing 3604. The focal points of the plurality of lenses can be adjusted by adjusting the relative positions. This operation can also automatically be performed. The image capturing device may be called a photoelectric conversion device. Instead of sequentially capturing an image, the photoelectric conversion device can include, as an image capturing method, a method of detecting the difference from a previous image, a method of extracting an image from an always recorded image, or the like.

Figure 36B:
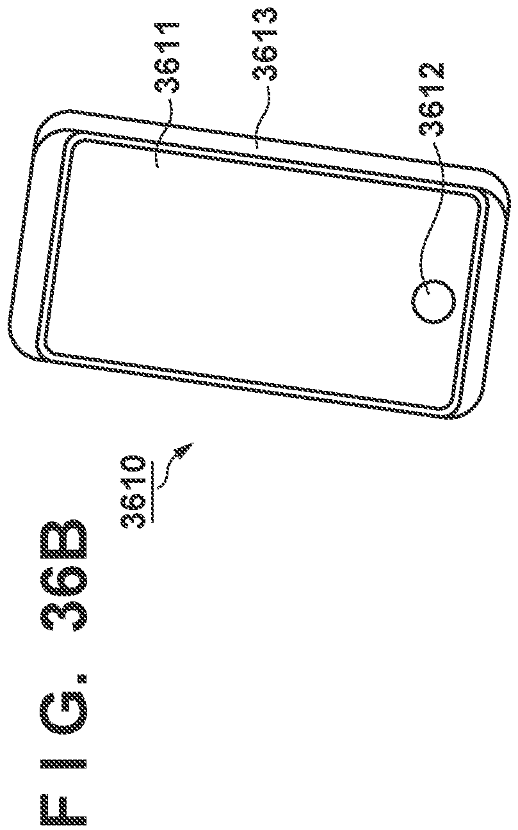
FIG. 36B is a schematic view showing an example of an electronic apparatus according to an embodiment.

FIG. 36B is a schematic view showing an example of an electronic apparatus according to this embodiment. An electronic apparatus 3610 includes a display unit 3611, an operation unit 3612, and a housing 3613. The housing 3613 can accommodate a circuit, a printed board having this circuit, a battery, and a communication unit. The operation unit 3612 can be a button or a touch-panel-type reaction unit. The operation unit can also be a biometric authentication unit that performs unlocking or the like by authenticating the fingerprint. The electronic apparatus including the communication unit can also be regarded as a communication apparatus. The electronic apparatus can further have a camera function by including a lens and an image capturing element. An image captured by the camera function is displayed on the display unit. Examples of the electronic apparatus are a smartphone and a notebook computer.

Figure 37A:
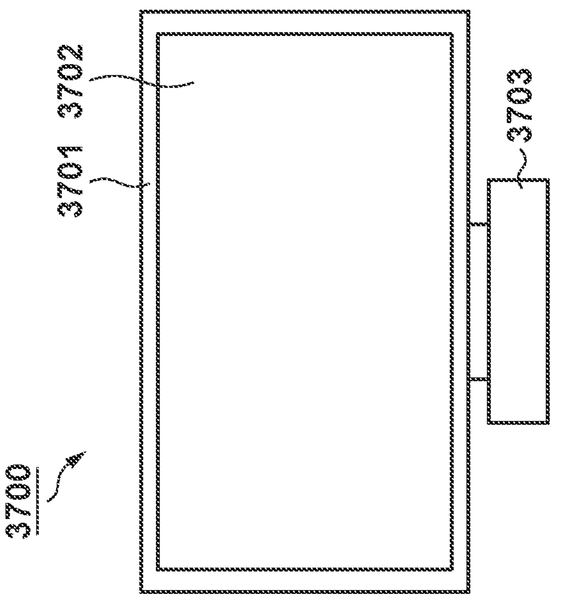
FIG. 37A is a schematic view showing an example of a display device according to an embodiment.
Figure 37B:
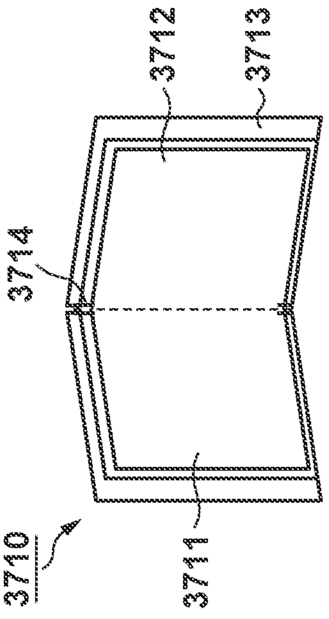
FIG. 37B is a schematic view showing an example of a foldable display device according to an embodiment.

FIGS. 37A and 37B are schematic views showing examples of the display device according to this embodiment. FIG. 37A shows a display device such as a television monitor or a PC monitor. A display device 3700 includes a frame 3701 and a display unit 3702.

The display device 3700 includes a base 3703 that supports the frame 3701 and the display unit 3702. The base 3703 is not limited to the form shown in FIG. 37A. The lower side of the frame 3701 may also function as the base.

In addition, the frame 3701 and the display unit 3702 can be bent. The radius of curvature in this case can be 5,000 (inclusive) mm to 6,000 (inclusive) mm.

FIG. 37B is a schematic view showing another example of the display device according to this embodiment. A display device 3710 shown in FIG. 37B can be folded, that is, the display device 3710 is a so-called foldable display device. The display device 3710 includes a first display unit 3711, a second display unit 3712, a housing 3713, and a bending point 3714. The first display unit 3711 and the second display unit 3712 can also be one seamless display device. The first display unit 3711 and the second display unit 3712 can be divided by the bending point. The first display unit 3711 and the second display unit 3712 can display different images, and can also display one image together.

Figure 38A:
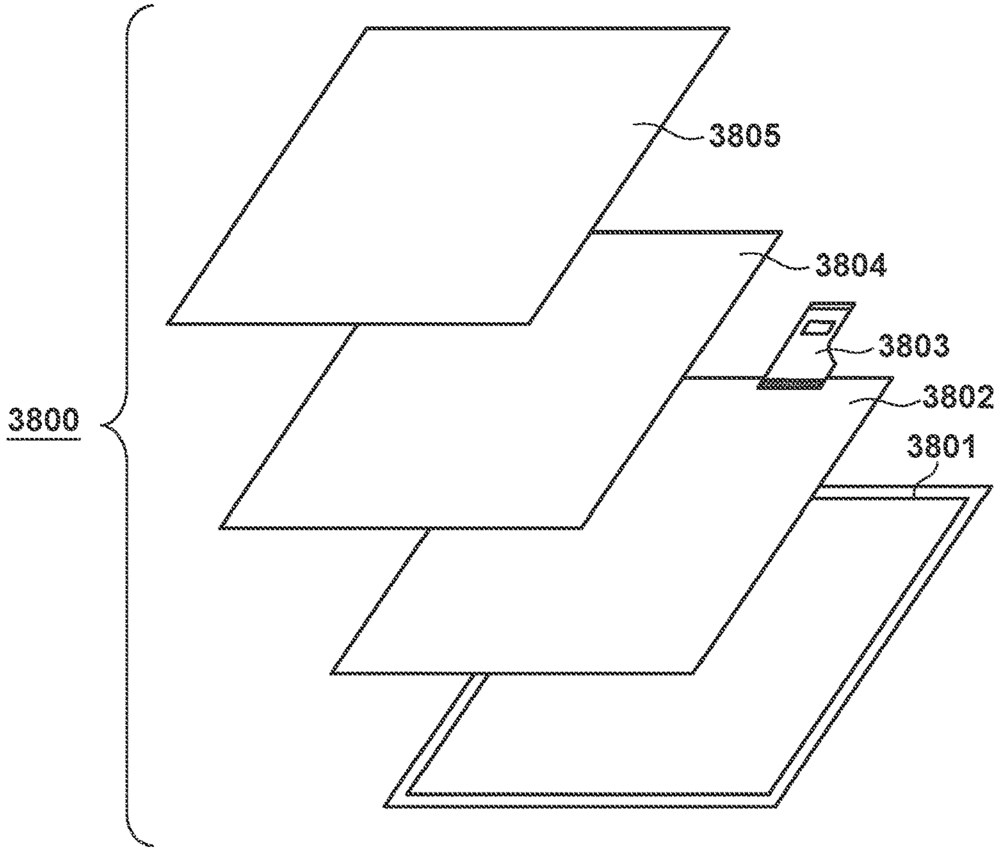
FIG. 38A is a schematic view showing an example of an illumination device according to an embodiment.

FIG. 38A is a schematic view showing an example of an illumination device according to this embodiment. An illumination device 3800 can include a housing 3801, a light source 3802, a circuit board 3803, an optical film 3804, and a light-diffusing unit 3805. The light source can include the organic light emitting element according to this embodiment. The optical film can be a filter that improves the color rendering of the light source. When performing lighting-up or the like, the light-diffusing unit can throw the light of the light source over a broad range by effectively diffusing the light. Both the optical film and the light-diffusing unit pass light. The optical film and the light-diffusing unit can be provided on the illumination light emission side. The illumination device can also include a cover on the outermost portion, as needed.

The illumination device is, for example, a device for illuminating the interior of the room. The illumination device can emit white light, natural white light, or light of any color from blue to red. The illumination device can also include a light control circuit for controlling these light components.

The illumination device can also include the organic light emitting element according to the present disclosure and a power supply circuit connected to the organic light emitting element. The power supply circuit is a circuit for converting an AC voltage into a DC voltage. White has a color temperature of 4,200 K, and natural white has a color temperature of 5,000 K. The illumination device may also include a color filter.

In addition, the illumination device according to this embodiment can include a heat radiation unit. The heat radiation unit radiates the internal heat of the device to the outside of the device, and examples are a metal having a high specific heat and liquid silicon.

Figure 38B:
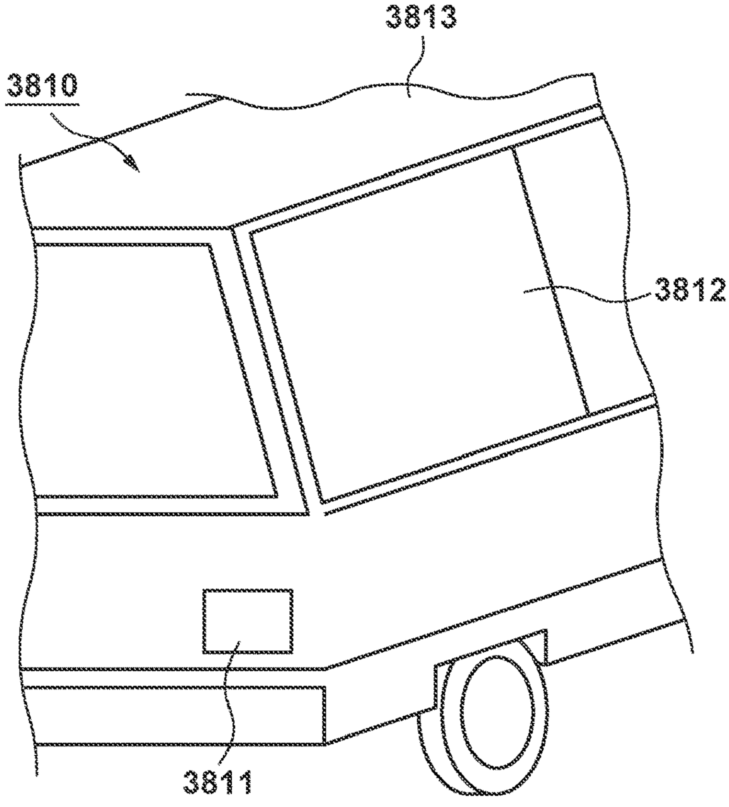
FIG. 38B is a schematic view showing an example of an automobile including a vehicle lighting appliance according to an embodiment.

FIG. 38B is a schematic view of an automobile as an example of a moving body according to this embodiment. The automobile has a taillight as an example of the lighting appliance. An automobile 3810 has a taillight 3811, and can have a form in which the taillight is turned on when performing a braking operation or the like.

The taillight 3811 can include the organic light emitting element according to this embodiment. The taillight can include a protection member for protecting the organic EL element. The material of the protection member is not limited as long as the material is a transparent material with a strength that is high to some extent, and is preferably polycarbonate. A furandicarboxylic acid derivative, an acrylonitrile derivative, or the like may be mixed in polycarbonate.

The automobile 3810 can include a vehicle body 3813, and a window 3812 attached to the vehicle body 3813. This window can be a window for checking the front and back of the automobile, and can also be a transparent display. This transparent display can include the organic light emitting element. In this case, the constituent materials of the electrodes and the like of the organic light emitting element are preferably formed by transparent members.

The moving body according to this embodiment can be a ship, an airplane, a drone, or the like. The moving body can include a main body and a lighting appliance installed in the main body. The lighting appliance can emit light for making a notification of the position of the main body. The lighting appliance includes the organic light emitting element according to this embodiment.

Figure 39A:
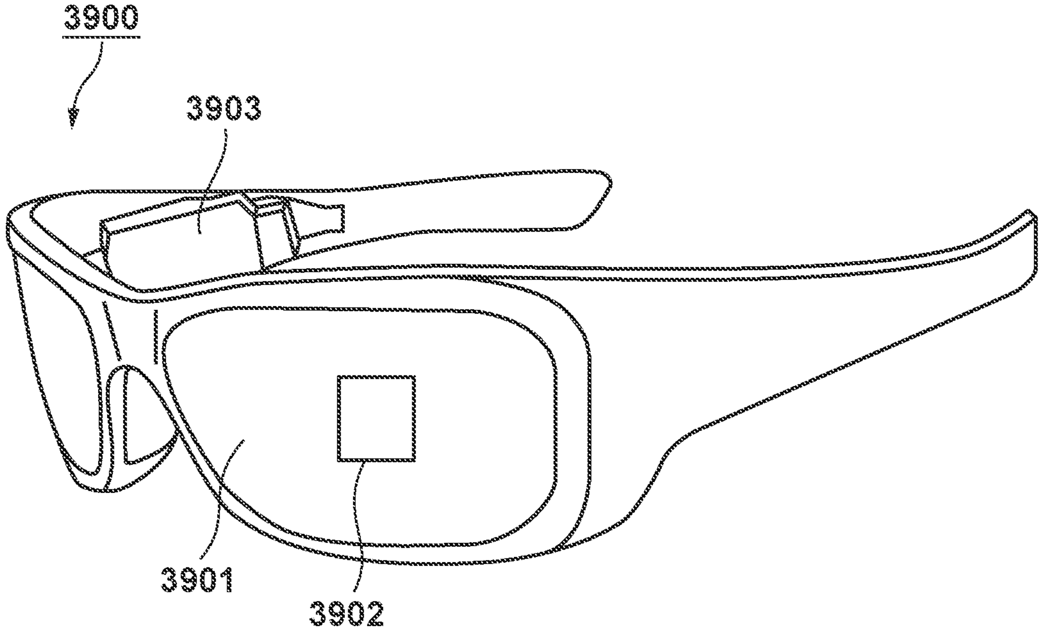
FIG. 39A is a schematic view showing an example of a wearable device according to an embodiment.
Figure 39B:
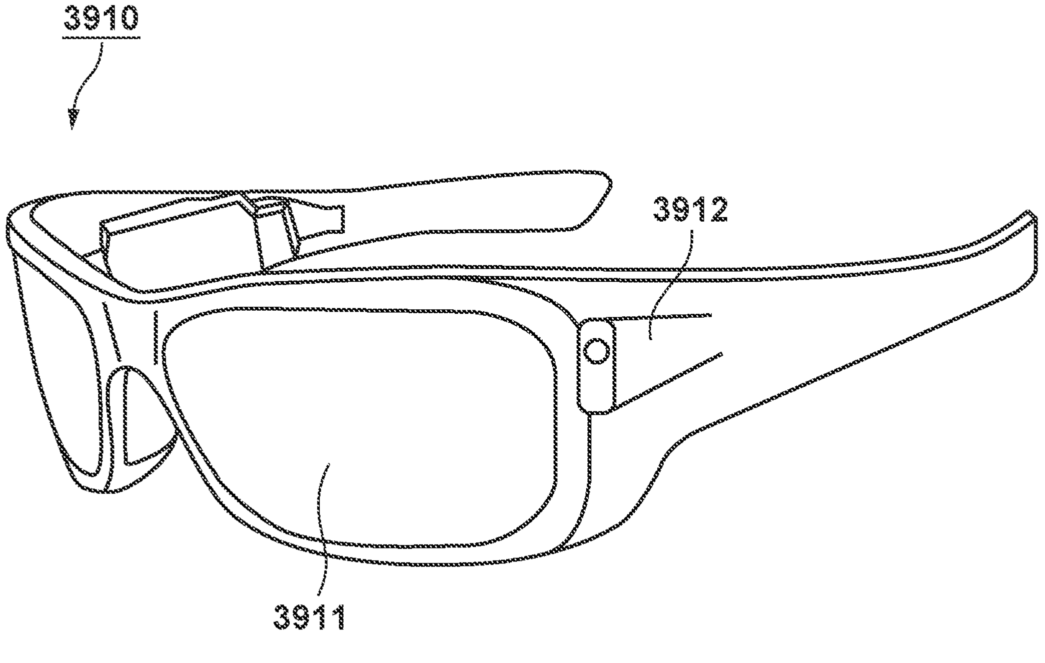
FIG. 39B is a schematic view showing an example of a wearable device according to an embodiment and showing a form including an image capturing device.

An example of application of the display device according to each of the above-described embodiments will be described with reference to FIGS. 39A and 39B. The display device can be applied to a system that can be worn as a wearable device such as smartglasses, an HMD, or a smart contact lens. An image capturing display device used for such applications can include an image capturing device capable of photoelectrically converting visible light and a display device capable of emitting visible light.

Glasses 3900 (smartglasses) according to one application will be described with reference to FIG. 39A. An image capturing device 3902 such as a CMOS sensor or an SPAD is provided on the surface side of a lens 3901 of the glasses 3900. In addition, the display device of each of the above-described embodiments is provided on the back surface side of the lens 3901.

The glasses 3900 can further include a control device 3903. The control device 3903 functions as a power supply that supplies power to the image capturing device 3902 and the display device according to each embodiment. In addition, the control device 3903 controls the operations of the image capturing device 3902 and the display device. An optical system configured to condense light to the image capturing device 3902 is formed on the lens 3901.

Glasses 3910 (smartglasses) according to one application will be described with reference to FIG. 39B. The glasses 3910 includes a control device 3912, and an image capturing device corresponding to the image capturing device 3902 and a display device are mounted on the control device 3912. The image capturing device in the control device 3912 and an optical system configured to project light emitted from the display device are formed in a lens 3911, and an image is projected to the lens 3911. The control device 3912 functions as a power supply that supplies power to the image capturing device and the display device, and controls the operations of the image capturing device and the display device. The control device may include a line-of-sight detection unit that detects the line of sight of a wearer. The detection of a line of sight may be done using infrared rays. An infrared ray emitting unit emits infrared rays to an eyeball of the user who is gazing at a displayed image. An image capturing unit including a light receiving element detects reflected light of the emitted infrared rays from the eyeball, thereby obtaining a captured image of the eyeball. A reduction unit for reducing light from the infrared ray emitting unit to the display unit in a planar view is provided, thereby reducing deterioration of image quality.

The line of sight of the user to the displayed image is detected from the captured image of the eyeball obtained by capturing the infrared rays. An arbitrary known method can be applied to the line-of-sight detection using the captured image of the eyeball. As an example, a line-of-sight detection method based on a Purkinje image obtained by reflection of irradiation light by a cornea can be used.

More specifically, line-of-sight detection processing based on pupil center corneal reflection is performed. Using pupil center corneal reflection, a line-of-sight vector representing the direction (rotation angle) of the eyeball is calculated based on the image of the pupil and the Purkinje image included in the captured image of the eyeball, thereby detecting the line-of-sight of the user.

The display device according to the embodiment of the present disclosure can include an image capturing device including a light receiving element, and a displayed image on the display device can be controlled based on the line-of-sight information of the user from the image capturing device.

More specifically, the display device can decide a first visual field region at which the user is gazing and a second visual field region other than the first visual field region based on the line-of-sight information. The first visual field region and the second visual field region may be decided by the control device of the display device, or those decided by an external control device may be received. In the display region of the display device, the display resolution of the first visual field region may be controlled to be higher than the display resolution of the second visual field region. That is, the resolution of the second visual field region may be lower than that of the first visual field region.

In addition, the display region includes a first display region and a second display region different from the first display region, and a region of higher priority is decided from the first display region and the second display region based on line-of-sight information. The first visual field region and the second visual field region may be decided by the control device of the display device, or those decided by an external control device may be received. The resolution of the region of higher priority may be controlled to be higher than the resolution of the region other than the region of higher priority. That is, the resolution of the region of relatively low priority may be low.

Note that AI may be used to decide the first visual field region or the region of higher priority. The AI may be a model configured to estimate the angle of the line of sight and the distance to a target ahead the line of sight from the image of the eyeball using the image of the eyeball and the direction of actual viewing of the eyeball in the image as supervised data. The AI program may be held by the display device, the image capturing device, or an external device. If the external device holds the AI program, it is transmitted to the display device via communication.

When performing display control based on line-of-sight detection, smartglasses further including an image capturing device configured to capture the outside can advantageously be applied. The smartglasses can display captured outside information in real time.

The present invention is not limited to the above embodiments and various changes and modifications can be made within the spirit and scope of the present invention. Therefore, to apprise the public of the scope of the present invention, the following claims are made.

According to the above-described embodiments, it is possible to control the light emission states of a plurality of pixel circuits of a light emitting device at a fine granularity.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-127730, filed Aug. 3, 2021, which is hereby incorporated by reference herein in its entirety.

What is claimed is:

1. A light emitting device comprising:

a plurality of pixel circuits arranged to form a plurality of rows and a plurality of columns and each including a light emitting element;

a plurality of signal lines each extending in a column direction and configured to supply a pixel signal to a corresponding pixel circuit among the plurality of pixel circuits;

a plurality of row selection lines each extending in a row direction and configured to supply a row selection signal to a corresponding pixel circuit among the plurality of pixel circuits, the row selection signal indicating a row selected from the plurality of rows; and a plurality of column selection lines each extending in the column direction and configured to supply a column selection signal to a corresponding pixel circuit among the plurality of pixel circuits, the column selection signal indicating a column selected from the plurality of columns, wherein at least one of the plurality of pixel circuits includes a light emission control circuit configured to allow the light emitting element of a pixel circuit, among the plurality of pixel circuits, located on the row indicated by the row selection signal and on the column indicated by the column selection signal to emit light in a brightness according to the pixel signal that is being supplied to the pixel circuit, and wherein the light emission control circuit allows the light emitting element of a pixel circuit, among the plurality of pixel circuits, located on the row indicated by the row selection signal and on a column that is not indicated by the column selection signal to emit light in a brightness according to the pixel signal supplied before the pixel signal that is being supplied to the pixel circuit.

2. The device according to claim 1, wherein each of the plurality of pixel circuits includes the light emission control circuit.

3. The device according to claim 1, wherein each of the plurality of pixel circuits further includes a first transistor configured to control a conductive state of a signal path for supplying the pixel signal to the light emitting element, wherein the light emission control circuit includes a logic circuit configured to generate an output based on a logic operation on the row selection signal and the column selection signal, and wherein the output of the logic circuit is supplied to a control terminal of the first transistor.

4. The device according to claim 1, wherein each of the plurality of pixel circuits further includes a first transistor configured to control a conductive state of a signal path for supplying the pixel signal to the light emitting element, wherein the light emission control circuit includes a second transistor arranged in the signal path, wherein the row selection signal is supplied to a control terminal of the first transistor, and wherein the column selection signal is supplied to a control terminal of the second transistor.

5. The device according to claim 1, wherein the light emitting device is formed by a first substrate and a second substrate, which are stacked on each other, wherein the light emitting element is formed on the first substrate, and wherein at least a part of the light emission control circuit is formed on the second substrate.

6. The device according to claim 5, wherein the light emission control circuit includes a memory cell, and wherein the memory cell is formed on the second substrate.

7. A photoelectric conversion device comprising an optical unit including a plurality of lenses, an image capturing element configured to receive light having passed through the optical unit, and a display unit configured to display an image captured by the image capturing element, wherein the display unit includes the light emitting device according to claim 1.

8. An electronic apparatus comprising a display unit including the light emitting device according to claim 1, a housing provided with the display unit, and a communication unit provided in the housing and configured to communicate with an outside device.

9. An illumination device comprising a light source including the light emitting device according to claim 1, and one of a light-diffusing unit and an optical film, which is configured to pass light emitted by the light source.

10. A moving body comprising a lighting appliance including the light emitting device according to claim 1, and a main body provided with the lighting appliance.

11. A light emitting device comprising:

a plurality of pixel circuits arranged to form a plurality of rows and a plurality of columns and each including a light emitting element;

a plurality of signal lines each extending in a column direction and configured to supply a pixel signal to a corresponding pixel circuit among the plurality of pixel circuits;

a plurality of row selection lines each extending in a row direction and configured to supply a row selection signal to a corresponding pixel circuit among the plurality of pixel circuits, the row selection signal indicating a row selected from the plurality of rows; and a plurality of column selection lines each extending in the column direction and configured to supply a column selection signal to a corresponding pixel circuit among the plurality of pixel circuits, the column selection signal indicating a column selected from the plurality of columns, wherein at least one of the plurality of pixel circuits includes a light emission control circuit configured to allow the light emitting element of a pixel circuit, among the plurality of pixel circuits, located on the row indicated by the row selection signal and on the column indicated by the column selection signal to emit light in a brightness according to the pixel signal that is being supplied to the pixel circuit, and wherein the light emission control circuit inhibits the light emitting element of a pixel circuit, among the plurality of pixel circuits, located on the row indicated by the row selection signal and on a column that is not indicated by the column selection signal from emitting light.

12. The device according to claim 11, wherein each of the plurality of pixel circuits further includes a third transistor configured to control a conductive state of a power feed path for supplying operating power to the light emitting element, wherein the light emission control circuit includes a logic circuit configured to generate an output based on a logic operation on the row selection signal and the column selection signal, and wherein the output of the logic circuit is supplied to a control terminal of the third transistor.

13. The device according to claim 11, wherein each of the plurality of pixel circuits further includes a third transistor configured to control a conductive state of a power feed path for supplying operating power to the light emitting element, wherein the light emission control circuit includes a fourth transistor arranged in the power feed path, wherein the row selection signal is supplied to a control terminal of the third transistor, and wherein the column selection signal is supplied to a control terminal of the fourth transistor.

14. The device according to claim 11, wherein each of the plurality of pixel circuits further includes a fifth transistor configured to reset a voltage applied to the light emitting element, wherein the light emission control circuit includes a logic circuit configured to generate an output based on a logic operation on the row selection signal and the column selection signal, and wherein the output of the logic circuit is supplied to a control terminal of the fifth transistor.

15. The device according to claim 11, wherein the light emission control circuit includes a sixth transistor configured to reset a voltage applied to the light emitting element, and wherein a signal based on the row selection signal and the column selection signal is supplied to a control terminal of the sixth transistor.

16. The device according to claim 11, wherein the light emission control circuit further includes a memory cell configured to store a level of the column selection signal.

17. The device according to claim 11, wherein the light emitting device is formed by a first substrate and a second substrate, which are stacked on each other, wherein the light emitting element is formed on the first substrate, and wherein at least a part of the light emission control circuit is formed on the second substrate.

18. The device according to claim 17, wherein the light emission control circuit includes a memory cell, and wherein the memory cell is formed on the second substrate.

19. A method of controlling a light emitting device including a plurality of pixel circuits arranged to form a plurality of rows and a plurality of columns and each including a light emitting element, the method comprising:

supplying a pixel signal to a corresponding pixel circuit among the plurality of pixel circuits via a plurality of signal lines each extending in a column direction;

supplying a row selection signal to a corresponding pixel circuit among the plurality of pixel circuits via a plurality of row selection lines each extending in a row direction, the row selection signal indicating a row selected from the plurality of rows; and supplying a column selection signal to a corresponding pixel circuit among the plurality of pixel circuits via a plurality of column selection lines each extending in the column direction, the column selection signal indicating a column selected from the plurality of columns, the column selection signal being supplied to indicate, in the pixel circuits located on the row indicated by the row selection signal, a pixel circuit caused to emit light in a brightness according to the pixel signal that is being supplied to the pixel circuit, wherein the light emitting element of a pixel circuit, among the plurality of pixel circuits, located on the row indicated by the row selection signal and on a column that is not indicated by the column selection signal is allowed to emit light in a brightness according to the pixel signal supplied before the pixel signal that is being supplied to the pixel circuit.

* * * * *